US010309812B1

(12) United States Patent
Zhang et al.

(10) Patent No.: US 10,309,812 B1
(45) Date of Patent: Jun. 4, 2019

(54) SYSTEM AND METHOD OF USING THE SAME

(71) Applicant: University of Wyoming, Laramie, WY (US)

(72) Inventors: Ye Zhang, Laramie, WY (US); Jianying Jiao, Laramie, WY (US); Juraj Irsa, Tomball, TX (US)

( * ) Notice: Subject to any disclaimer, the term of this patent is extended or adjusted under 35 U.S.C. 154(b) by 599 days.

(21) Appl. No.: 14/288,141

(22) Filed: May 27, 2014

Related U.S. Application Data

(60) Provisional application No. 61/855,823, filed on May 24, 2013.

(51) Int. Cl.
| G01F 1/00 | (2006.01) |
| G01F 1/64 | (2006.01) |
| G01F 1/74 | (2006.01) |
| G01F 1/86 | (2006.01) |
| G01F 1/84 | (2006.01) |

(52) U.S. Cl.
CPC .............. G01F 1/64 (2013.01); G01F 1/74 (2013.01); G01F 1/8436 (2013.01); G01F 1/86 (2013.01)

(58) Field of Classification Search
CPC ...... G01F 25/0007; G01F 1/74; G01F 1/8436; G01F 1/8431; G01F 1/704; G01F 1/86; E21B 47/1015
USPC ..................................................... 702/33, 45
See application file for complete search history.

(56) References Cited

U.S. PATENT DOCUMENTS

| 7,334,486 | B1 * | 2/2008 | Klammler | ........... E21B 47/1015 73/861.07 |
| 9,404,783 | B2 * | 8/2016 | Klammler | ................ G01F 1/76 |
| 2011/0022368 | A1 * | 1/2011 | Huang | .................... E21B 43/00 703/10 |
| 2013/0151215 | A1 * | 6/2013 | Mustapha | ............... G06F 17/17 703/2 |

OTHER PUBLICATIONS

Anderman et al., (1996), "Two-Dimensional Advective Transport in Ground-Water Flow Parameter Estimation", Ground Water, 34(6). 1001-1009.
Anderson, M. P. (2005) "Heat as a groundwater racer"Ground Water, 43(6), 951-968.
Anderson, M.P.; Woessner, W.W, Applied Groundwater Modeling; San Diego, California, Academic Press, 1992, 67 pages.
Asefa. et al., (2004), "Support vectors—based groundwater head observation networks design", Water Resour, Res., 40, W 11509.
Bayless et al., "Accuracy of Flowmeters Measuring Horizontal Groundwater Flow in an Unconsolidated Aquifer Simulator", Ground Water, 2011: 15 pages.
Bohling et al., "Geostatistical analysis of centimeter-scale hydraulic conductivity variations at the Made site", Water Resources Research 48: W02525, doi:10.1029/2011WR010791, 15 pages.

(Continued)

*Primary Examiner* — An Do
(74) *Attorney, Agent, or Firm* — Aspire IP, LLC; Scott J. Hawranek

(57) ABSTRACT

A system and method for parameter estimation of steady state flow in heterogeneous aquifers, and more particularly to a method and system for reducing uncertainty in calibrating aquifer flow and estimating aquifer hydraulic conductivities.

20 Claims, 41 Drawing Sheets

(56) References Cited

OTHER PUBLICATIONS

Bohling et al., "Inherent Limitatioma Tomography", Ground Water 2010, 48, 809-824.

Bouwer et al., A Slug Test for Determining Hydraulic Conductivity of Unconfined Aquifers With Completely or Partially Penetrating Wells, Water Resources Research (1976), 12 (3):423-428.

Brauchler et al., (2012), "Derivation of site-specific relationships between hydraulic parameters and p-wave velocities based on hydraulic and seismic tomography", Water Resour Res 48: W03531, doi:10.1029/2011WR010868, 14 pages.

Bravo et al., (2002), "Using groundwater temperature data to constrain parameter estimation in a groundwater flow model of a wetland system", Water Resour, Res., 38(8) 1153, doi: 10.1029/200WR000172, 15 pages.

Butler et al., (1990), "Variable-Rate Pumping Tests for Radially Symmetric Nonuniforrn Aquifers", Water Resources Research, vol. 26, No. 2, p. 291-306.

Butler J.J. Jr., (2005), "Hydrogeological methods for estimation of spatial variations in hydraulic conductivity", Water Science and Technology Library, Hydrogeophysics, Springer, p. 23-58.

Camporese et al., (2011), "Assessment of local hydraulic properties from electrical resistivity tomography monitoring of a three-dimensional synthetic tracer test experiment", Water Resour, Res., doi:10,1029/2011WR010528, 15 pages.

Gomez-Hernanez et al., (1997) "Stochastic simulation of transmissivity fields conditional to both transmissivity and piezometric data - I. Theory", Journal of Hydrology, 203, 162-174.

Cardiff et al., "A Potential-based Inversion of Unconfirmed Steady-State Hydraulic Tomography,"Ground Water (2009), 47 (2), 259-270.

Carrera et al,, (2005), "Inverse problem in hydrogeology", Hydrogeology Journal, 13, 206-222, 17 pages.

Carrera et at, (1986)a, "Estimation of Aquifer Parameters Under Transient and Steady State Conditions: 1. Maximum Likelihood Method Incorporating Prior information", Water Resour. Res., 22(2), 199-210.

Carrera et al., (1986)b, "Estimation of Aquifer Parameters Under Transient and Steady State Conditions: 2. Uniqueness, Stability, and Solution Algorithms", Water Resour. Res., 22(2), 211-227.

Carrera, J.; Neuman, S,P., "Estimation of Aquifer Parameters Under Transient and Steady State Conditions: 3. Application to Synthetic and Field Data", Water Resources Research 1986, 22 (2), 228-242.

Chen, Y., and D. Zhang (2006), Data assimilation for transient flow in geologic formations via ensemble Kalman filter, Advances in Water Resources, 29, 1107-1122.

Cooley, R. L. (1982), "Incorporation of Prior Information on Parameters into Nonlinear Regression of Groundwater Flow Models, 1 Theory", Water Resour. Res 18(4), 965-976.

Cooley, R. L. (1983), "Incorporation of Prior Information on Parameters Into Nonlinear Regression Groundwater Flow Models, 2, Applications", Water Resour. Res., 19(3), 662-676.

Crisman et al., Application Procedures for the Electromagnetic Borehole Flowmeter in Shallow Unconfined Aquifers, Groundwater Monitoring and Remediation (2001),96-100.

Darnet et al., "Estimating aquifer hydraulic properties from the inversion of surface Streaming Potential (SP) anomalies", Geophysical Research Letters (2003), 30 (13): 1679, doi:10,1029/2003GL017,631, 4 pages.

Day-Lewis, F., J. W. Lane, and S. M. Gorelick (2006), "Combined. interpretation of radar, hydraulic, and tracer data from a fractured-rock aquifer near Mirror Lake, New Hampshire, USA", Hydrogeology Journal, 141-14, 14 pages.

Delhomme, J. P. (1978), "Kriging in the Hydrosciences", Advances in Water Resources, 1(5), 251-266.

Dettinger, "Reconnaissance estimates of natural recharge to desert basins in Nevada, U.S.A. by using chloride balance calculations", Journal of Hydrology (1989), 106: 55-78.

Doherty et al., (2010), "A short exploration of structial noise ", Water Resour. Res., 46, W05525, doi:10.1029/2009WR008377, 14 pages.

Eppstein, M. J., and D. E. Dougherty (1996), "Simultaneous estimation of transmissivity value and zonation", Water Resour. Res., 32(11), 3321-3336.

Feyen, L., P.J. Ribeiro Jr., J.J. Gomez-Hernandez, K. J. Beven, and F. De Smedt (2003), "Bayesian methodology for stochastic capture zone delineation incorporating transmissivity measurements and hydraulic head observations", Journal of Hydrology, 271, 156-170.

Fienen, M.; Hunt, R.; Krabbenhoft, D.; Clemo, T., "Obtaining parsimonious hydraulic conductivity fields using head and transport observations: A Bayesian goestatistical parameter estimation approach", Water Resources Research 2009, 45, W08408, doi;10.1029/2008WR007431, 23 pages.

Firmani et al., (2006) "Three-dimensional numerical analysis of steady state pumping tests in heterogeneous confined aquifers", Water Resources Research, vol. 42, W03422, doi:10.1029/2005WR0043822, 10 pages.

Fitts, C. R. (2010), "Modeling aquifer systems with analytic dements and subdomains", Water Resources Research, 46, W07520, doi:10.1029/2009WR008331, 10 pages.

Frind, E. O., and G. F. Pinder (1973), "Galerkin Solution of the Inverse Problem for Aquifer Transmissivity", Water Resour. Res., 9 (5), 1397-1410.

Gailey, R. M., A. S. Crowe, and S. M. Gorelick (199), "Coupled process parameter estimation and prediction uncertainty using hydraulic head and concentration data", Advances in Water Resources, 40(5), 301-3 14.

Galybin, A.N., and J. Irsa (2010), "On reconstruction of three-dimensional harmonic functions from discrete data", Proceedings of the Royal Society A, 466, 23 pages.

Galybin, A.N., and Sh. A. Mukhamediev (2004), "Determination of elastic stresses from discrete data on stress orientations", International Journal of Solids and Structures, 41, 5125-5142.

Gellasch, C.A., Bradbury, K.R., Hart, D.J., and J.M. Bahr (2013), "Characterization of fracture connectivity in a siliciclastic bedrock aquifer near a public supply well (Wisconsin, USA)", Hydrogeology Journal, vol. 21, p. 383-399.

Ginn, T. R., and J. H. Cushman (1990), "Inverse methods for subsurface flow: a critical review of stochastic techniques", Stochastic Hydrology and Hydraulics, 4, 1-26.

Haitjema et al., "Are Water Tables a Subdued Replica of the Topography?, "Ground Water, 43 (6). 781-786, 2005.

Hansen, P.C. (1990), "Truncated singular value decomposition solutions to discrete ill-posed problems with ill-determined numerical rank", SIAM J. Sci. Stat. Comput., vol. 11 No. 3, 503-518.

Hantush et al., "Non-steady radial flow in an infinite leaky aquifer", Transactions, American Geophysical Union (1955), 36 (1), 6 pages.

Harbaugh, A.W., Banta, E.R., Hill, M.C., and McDonald, M.G., 2000 "Modflow-2000, the U.S. Geological Survey modular ground-water model—User guide to modularization concepts and the Ground-Water Flow Process". U.S. Geological Survey Open-Files Report 00-92 130 pages.

Healy, and P. Cook, "Using groundwater levels to estimate recharge", Hydrogeology Journal (2002), 10:91-109, 19 pages.

Heidari, M., and R. Ranjithan (1998), "A hybrid optimization approach to the estimation of distributed parameters in two-dimensional confined aquifers", Journal of the American Water Resources Association, 34(4), 909-920.

Herrera, I. (2000), "Trefftz method: A General Theory", Instituto de Investigaciones en Matematicas Aplicadas y en Sistemas (IIMAS), 16(6), 561-580.

Hunt, R. J., J. Doherty, and M. J. Tonkin (2007), "Are Models Too Simple? Arguments for Increased Parameterization", Ground Water, 45 (3), 254-262.

Hunt, R.; Anderson, M.; Kelson, V.A., "Improving a Complex Finite-Difference Ground Water Flow Model Through the Use of an Analytical Element Screening Model", Ground Water 1998, 36, 1011-1017.

Hunt, R.; Zheng, C., "Debating complexity in Modeling", Eos, vol. 80, No. 3., 1999, 1 page.

(56) References Cited

OTHER PUBLICATIONS

Hunt, et al., "Taking Account of Unknown Unknowns", Ground Water, vol.48, No. 4, Jul.-Aug. 2010, 1 page.
Hyman, D. W., J. M. Harris, and S. M. Gorelick (1994), "Coupled seismic and tracer test inversion for aquifer property characterization", Water Resour. Res., 30(7), 1965-1977.
Hyndman D. W., J. M, Harris, and S.M. Gorelick (2000) "Inferring the relation between seismic slowness and hydraulic conductivity in heterogeneous aquifers,"Water Resources Research 36: 2121-2132.
Hyndman, D. W., J.M. Harris, and S.M. Gorelick (1994), "Coupled seismic and tracer test inversion for aquifer property characterization", Water Resour. Res., 30(7), 1965-1977.
Irsa et al., "A new direct method of parameter estimation for steady state flow in heterogeneous aquifers with unknown boundary conditions", Water Resources Research (2012), 48: W09526, doi:10,1029/2011WR011, 756, 15 pages.
Irsa, J., "Stress trajectories element method for stress determination from discrete data on principal directions", Engineering Analysis with Boundary Elements 34 (,2010) 423-432.
Irsa, J., and A. N. Galybin (2009), "Heat flux reconstruction in the grinding process from temperature data", WIT Transactions on Modeling and Simulation, Vol, 48, 11 pages.
lrsa, J.,and A. N. Galybin (2010), "Stress trajectories element method for stress determination from discrete data on principal directions", Engineering Analysis with Boundary Elements 34, 423-432.
Irsa, J., and A. N. Galybin (2011a), "Numerical reconstruction of 2D potential fields from discrete measurements", International Journal of Numerical Methods for Heat & Fluid Flow, 21(7), 20 pages.
Irsa, J. and A. N. Galybin (2011 b), "On Stem modeling of tectonic stress field in tsunami regions", Boundary Elements and Other Mesh Reduction Methods XXXIII, WIT Transactions on Modelling and Simulation (52), 203-214.
Irsa J., and Y, Zhang (2012), A direct method of parameter estimation for steady state flow in heterogeneous aquifers with unknown boundary conditions, Water Resources Research, 48, W09526, doi:10.1029/2011 WR011756.
Janssen, G. M. C. M., J. R. Valstar, and A. E. A. T. M. van der Zee (2008), "Measurement network design including traveltime determinations to minimize model predictionuncertainty", Water Resour. Res., 44, W02405, 17 pages.
Jirousek, J., and A. P. Zielinski (1995), "Survey of Trefftz-Type Element Formulations", Computers & Structures, 63(2), 225-242.
Jyrkama et al., "Recharge Estimation for Transient Ground Water Modeling", Ground Water (2002), 40 (6), 638-648.
Kalbus et al., (2006), "Measuring methods for groundwater — surface water interactions: a review", Hydrology and Earth System Sciences, vol. 10, p. 873-887.
Keating, E. H., J. Doherty, J. A. Vrugt, and Q. Kang (2010), "Optimization and uncertainty assessment of strongly nonlinear groundwater models with high parameter dimensionality", Water Resour. Res., 46, W10517, doi:10.1029/2009WR008584, 18 pages.
Kita, E. And N. Kamiya (1995), "Trefflz method: an overview", Advances in Engineering Software, 24, 3-12, 10 pages.
Kitanidis, P. K. (2012), "Generalized priors in Bayesian inversion problems", Advances in Water Resources 36, 8 pages.
Kleinecke, D. (1971), "Use of Linear Programing for Estimating Geohydrologic Parameters of Groundwater Basins", Water Resour, Res., 7(2), 367-374.
Kobr, M., S, Mares, F. Paillet (2005), "Geophysical well togging, borehole geophysics for hydrogeologicaI studies: principles and applications", in Hydrogeophysics Chapter 10 Springer, p. 291-331.
Kupradze, V. D., and M. A. Aleksidze (1964), "The method of functional equations for the approximate solution of certain boundary value problems", USSR Comput. Methods Math. Phys., 4, 45 pages.
Labaky, W., J. F. Devlin, and R. W. Gilliam (2009), "Field comparison of the point velocity probe with other groundwater velocity measurement method", Water Resources Research 45: W00D30, doi:10.1029/2008WR007066, 9 pages.

Leap, D. I. And P. G. Kaplan (1988), A Single-Well Tracing Method for Estimating Regional Advective Velocity in a Confined Aquifer: Theory and Preliminary Labor Cory Verification, Water Resources Research, 24(7), 993-998.
Lee, En-Jui, He Huang, John M. Dennis Po Chen and Liqiang Wang (2013), An optimized parallel LSQR algorithm for seismic tomography, Computers and Geosciences, vol. 61, pp. 184-197.
Li, A. Englert, O. A. Cirpka, and H. Vereecken, "Three-Dimensional Geostatistical Inversion of Flowmeter and Pumping Test Data", Ground Water (2008) 46 (2), 193-201.
Li, Z.C., T. T. Lu, H. Y. Hu, and A. H. D. Cheng (2008), "Trefftz and Collocation Methods", Wit Press. Southampton, 14 pages.
Li, Z-C. Li, L-J. Young, H-T Huang, Y-P. Liu, and A. H. D. Cheng (2010) "Comparisons of fundamental solutions and particular solutions for Trefftz methods", Engineering Analysis with Boundary Elements, 34, 248-258.doi:10.1016/j.enganabound.2009.10.001.
Lin et al, "PRO-GRADE: GIS Toolkits for Ground Water Recharge and Discharge Estimation", Ground Water (2009), 47 (1), 122-128, doi: 10.1111/j.1745-6584.2008.00,503.x.
Liu, G., Y. Chen, and D. Zbang. (2008), "Investigation of flow and transport processes at the Made site using ensemble Kalman filter", Advances in Water Resources, 31, 975-986.
Liu, X., and P. K. Kitanidis (2011), "Large-scale inverse modeling with an application in hydraulic tomography", Water Resour. Res., 47, W02502, doi:10.1029/2010WR009144; 9 pages.
Marsily, G, de, J. P. Delhomme and A. M. Lavenue (2000), "Four decades of inverse problems in hydrogeology", Geological Society of America Special Paper, 348, 1-17.
McKenna, S A, and E. P. Poeter (1995), "Field example of data fusion in site characterization", Water Resour. Res., 31(12), 3229-3240.
McLaughlin, D, and L. R. Townley (1996), "A reassessment of the groundwater inverse problem", Water Resour. Res., 32(5), 1131-1161.
Medina, A., and J. Carrera (1996), "Coupled estimation of flow and solute transport parameters", Water Resour. Res., 32(10), 3063-3076.
Meier et al., (1998), "An evaluation of Jacob's method for the interpretation of pumping tests in heterogeneous formations", Water Resources Research, vol. 34, No. 5, p. 1011-1025.
Molz et al., (1994), "Borehole flowmeters: field application and data analysis", Journal of Hydrology, vol. 163. p. 347-371.
Bayless, et al., "Accuracy of Flowmeters Measuring Horizontal Grounwater flow in an Unconsolidated Aquifer Simulator", Monitoring & Remediation, 31 (2), 40-62, doi:10.1111/j.1745-6592.2010.0132.x
Moore, C. And J. Doherty (2006) The cost of unigueness in groundwater model calibration, Advances in Water Resources, vol.29, p. 605-623.
Morshed, J/, and J.J. Kaliarachchi (1998), "Parameter estimation using artificial neural network and genetic algorithm for freeproducts migration and recovery", Water Resour, Res., 34(5), 1101-1113, doi:10.1029/98WR00006.
Nelson, R. W. (1961), "In-Place Measurement of Permeability in Heterogeneous Media, 1. Experimental and Computational Considerations", Journal of geophysical Research, vol 66, No. 8, 2469-2478.
Neumaier, A. (1998), "Solving ill-conditioned and singular linear systems: A tutorial on regularization", Siam M Rev., vol. 40 , No.3 636-666.
Neuman, "Generalized Scaling of Permeabilities: Validation and Effect of Support Scale", Geophysical Research Letters (1994) vol. 21, No.5, pp. 349-352.
Neuman, S. P. (1973), "Calibration of Distributed Parameter Groundwater Flow Models Viewed as a Multiple-Objective Decision Process nder Uncertainty", Water Resour. Res., 9(4), 1006-1021.
Neuman, SP, Yakowitz, S., (1979), "A Statistical Approach to the Inverse Problem of Aquifer Hydrology: 1. Theory", Water Resources Research, vol, 15, No. 4, 16 pages.
Neumann et al., (2007), "Type curve interpretation of late-time pumping test data in randomly heterogeneous aquifers", Water Resources Research, vol. 43, W10421 doi:10.1029/2007WR.00587L, 15 pages.

(56) References Cited

OTHER PUBLICATIONS

Paige. C. C., and M. A. Saunders (1982), "LSQR Algorithm for Sparse Linear Equations and Sparse Least Squares", ACM Transactions on Mathematical Software, 8(1), 43-71.

Pan, et al., "Downward water flow through sloping layers in the vadose zone: time-dependence and effect of slope length", Journal of Hydrology 199 (1997), 36-52.

Poeter, et al, "Multimodal Ranking and Inference in Ground Water Modeling", Ground Water, vol, 43 No, 4, Jul.-Aug. 2005, pp. 597-605.

Poeter, E..; Hill, M. C., "Inverse Methods: A Necessary Next Step in Groundwater Modeling", Ground Water 1997, vol. 35, No. 2, 250-260.

Poeter, :E.P., et al., "UCODE _2005 and Six Other Computer Codes for Universal Sensitivity Analysis, Calibration, and Uncertainty Evaluation", USGS science for a changing world, U.S. Geological Survey, Virginia 2005, 299 pages.

Portniaguine et al., "Parameter estimation using groundwater age and head data, Cape Cod, Massachusetts", Water Resources Research (1998), 34 (4), 637-645.

Post, V.E.A. and J. R. von Asmuth (2013), "Review; Hydraulic head measurments-new technologies, classic pitfalls", Hydrogeology Journal, vol. 21, p. 737-750.

Ronayne, M. J., S. M. Gorelick, and J. Caers (2008), "Identifying discrete geologic structures that produce anomalous hydraulic response: An inverse modeling approach", Water Resour, Res., 44, W08426, doi:10.1029/2007WR006635, 16 pages.

Russo et al., "Numerical analysis of flow and transport in a combined heterogeneous vadose zone-groundwater system,"Advances in Water Resources (2001), 24: pp. 49-62.

Sagar, B., S. Yakowitz, and L. Duchstein (1975), "A Direct Method for the Identification of the Parameters of Dynamic Nonhomogeneous Aquifers", Water Resour. Res., vol. 11, No. 4, pp. 563-570.

Saiers, J.E.; Genereux, D.P.; Bolster, C.H., "Influence of Calibration Methodology on Ground Water Flow Predictions", Ground Water 2004, vol. 42, No. 1 pp. 32-44.

Saltelli, A, M. Rano, T. Andres, F. Campolongo, J. Carboni, D. Gatelli, M. Saisana, and S. Tarantola (2008), "Global Sensitivity Analysis: the Primer"John Wiley & Sons, Ltd., 305 pages.

Sanchez-Vila et al., (1999), "Pumping tests in heterogeneous aquifers: An analytical study of what can be obtained from their interpretation using Jacob's method", Water Resources Research, vol. 35, No. 4, p. 943-952.

Sanchez-Vila et al., "Scale effects w transmissivity", Journal of Hydrology (1996) 183. pp. 1-22.

Scalon, R. W. Healy, and P. G. Cook., "Choosing appropriate techniques for quantifying groundwater recharge", Journal of Hydrogeology (2002), 10: 18-39.

Schudmeister M. K., Butler J.J., Healey J.M., Zheng L., Wysocki D.A., McCal G.W. (2003) "Direct-Push Electrical Conductivity Logging for High-Resolution Hydrostratigraphic Characterization", Ground Water Monit Remediat. 23(3), pp. 52-62.

Schulze-Makuch et al., "Scale Dependency of Hydraulic Conductivity in Heterogeneous Media", Ground Water (1999), 37 (6), pp. 904-919.

Shapiro S.A., Audigane :P., Royer J.J. (1999) "Large-scale in situ permeability tensor of rocks from induced microseismicity",Geophysical Journal International 137,pp. 207-213.

Sun, N- Z, (1994), "Inverse Problems in Groundwater Modeling, Theory and Application of Transport in Porous Media", Springer-Science+ Business Media, B.V., 12 pages.

Sun, N- Z., and W. W-G. Yeh (1985), "Identification of Parameter Structure in Groundwater Inverse Problem", Water Resour, Res., 21(6),pp. 869-883.

Sun, N-Z., M. C. Jeng, and W. W-G. Yeh (1995) "A proposed geological parameterization method for parameter identification in three-dimensional groundwater modeling", Water Resour. Res., 31(1) pp. 89-102.

Tan et al., "Regression method for estimating rainfall recharge at unconfined sandy aquifers with an equatorial climate,", Hydrogeological Processes (2007) 21, pp. 3514-3526.

Tang X. M., Cheng C.H. (1996), "Fast inversion of formation permeability from Stoneley wave logs using a simplified Biot-Rosenbaum model", Geophysics vol. 61, No. 3, pp 639-645.

Tiedeman, C. R.; Hill, M, C,; D'Agnese, F. A.; Faunt, C. C., "Methods for using ground-water model predictions to guide hydrogeologic data collection, with. application to the Death Valley regional groundwater flow system", Water Resources Research 2003, vol. 39, No. 1, 1010, doi:10.1029/2001WR001255, 17 pages.

Tonkin, M., and J. Doherty (2009), "Calibration-constrained Monte Carlo analysis of highly parameterized models using subspace techniques", Water Resour. Res., vol.45, W00B10, doi:10.1029/2007WR006678, 17 pages.

Devlin et al., (2012), "Applications and implications of direct groundwater velocity measurement at the centimetre scale", Journal of Contaminant Hydrology 127, pp. 3-14.

Tsou M-S., S. P. Perkins, X. Zhan, D. O. Whittemore, and L. Zheng (2006), "Inverse approaches with lithologic information for a regional groundwater system in southwest Kansas"Journal of Hydrology 318 pp 292-300

Tumlinson et al., (2006), "Numerical evaluation of pumping well transmissivity estimates in lateral heterogeneous formations", Hydrogeology Journal vol. 14, p. 21-30.

Vogel, C.R. (1996), "Non-convergence of the L-curve regularization parameter selection method",Inverse Problems 12, pp. 535-547.

Vrugt, J. A., C. J. F. ter Barak, M. P. Clark, J. M. Hyman, and B. A. Robinson (2008b), "Treatment of input uncertainty m hydrologic modeling: Doing hydrology backward with Markov chain Monte Carlo simulation", Water Resour. Res., vol. 44 W00B09, doi:10.1029/2007WR006720, 15 pages.

Vrugt, J. A., P. H, Stauffer, T. Wohling, B. A. Robinson, and V. V, Vesselinov (2008a), "Inverse Modeling of Subsurface Flow and Transport Properties: A Review with New Developments",Vadose Zone Journal, vol. 7, No. 2, 843-864.

Wagner, B. J. (1995), "Samping design methods for groundwater modeling under uncertainty", Water Resour, Res., 31(10), pp. 2581-2591.

Wang et al., (2013), "Dynamic data integration and stochastic inversion of a two-deminsional confined aquifer", Proceedings, Hydrology Days, http://hydrologydays.colostate.edu/Papers 13/Dongdong paper.pdf, 5 pages.

Wang, M., and C. Zheng (1996), "Aquifer parameters estimation under transient and steadt-state conditions using genetic algorithms", Calibration and Realiability in Grounwater Modeling, Proceedings of the ModelCARE 96 COnference, Golden, Colorado, Sep. 1996, IAHS Publication, No. 237, pp 21-30.

Weir, G. J. (1989), "The Direct Inverse Problem in Aquifers". Water Resources Research, 25(4), pp. 749-753.

Weiss, R. And L. Smith (1998a), "Parameter space methods in joint parameter estimation for groundwater flow models", Water Resour. Res., 34(4), pp. 647-661.

Weiss, R., and L. Smith (1998b), "Efficient and responsible Use of Prior Information in Inverse Methods", Ground Water, 36(1), pp. 151-163.

Wen, X.-H; Deutschb C.V.; Cullickc, A. S., "Construction of geostatistical aquifer models integrating dynamic flow and tracer data using inverse technique", Journal of Hydrology 255 (2002), pp. 151-168.

Woodbury A. D., and L. Smith (1988), Simultaneous :Inversion of Hydrogeologic and Thermal Data, 2. Incorporation Of Thermal Data, Water Resour. Res., 24(3) pp. 356-372.

Wu et al., (2005), "Traditional analysis of aquifer tests: Comparing apples to oranges?", Water Resources Research, vol. 41, W09402, doi: 10.1029/2004WR003717, 12 pages.

Yeh et al., (2000), "Hydraulic tomography: Development of a new aquifer test method"Water Resources Research, vol. 36, No. 8, pp. 2095-2106.

Yeh, W. W-G. (1986), "Review of Parameter Identification Procedures in Groundwater Hydrology: The Inverse Problem", Water Resour. Res., 22(2), pp. 95-108.

(56) References Cited

OTHER PUBLICATIONS

Yeh, W.W-G., Y. S, Yoon., and K. S, Lee (1983), "Aquifer Parameter Identification With Kriging and Optimum Parametrization", Water Resour, Res., 19(1 )225-233.
Zhang et al., "Equivalent hydraulic conductivity of an experimental stratigraphy: Implications for basin-scale flow simulations,"Water Resources Research 2006, 42, W05404 doi:10.1029/2005WR004720, 19 pages.
Zhang et al., "Homogenization of Hydraulic Conductivity for Hierarchical Sedimentary Deposits at Multiple Scales,"Transport in Porous Media 2011, 87. doi: 10.1007/s11242-010-9711-8, pp. 717-737.
Zhang et al., "Two-scale modeling of solute transport in an experimental stratigraphy,"Journal of Hydrology 2008, 348, doi 10.1016/j.hydrol.2007,10.017, pp 395-411.
Zhang, Y., "Nonlinear Inversion of an Unconfined Aquifer: Simultaneous Estimation of Heterogeneous Hydraulic Conductivities, Recharge Rates, and Boundary Conditions"Transport in Porous Media 2013, under review, 25 pages.
Zhu et al., "Analysis of hydraulic tomography using temporal moments of drawdown recovery data,"Water Resources Research 2006 Vol, 42, W02403, doi:10.1029/2005WR004309, 11 pages.
Zimmerman et al., "A comparison of seven geostatistically based inverse approaches to estimate transmissivities for modeling advective transport by groundwater flow", Water Resour. Res., 1998, 34(6) pp. 1373-1413.
Zlotnik et al., and B. R. Zurbuchen, "Estimation of hydraulic conductivity from borehole flowmeter tests considering head losses", Journal of Hydrology (2003), 281: pp. 115-128.
Zhang, et al., "Three-dimensional aquifer inversion conditions"Journal of Hydrology, 2014, 15 pages.
Jiao, et al., "Two-dimensional physical-based inversion of confined and unconfined aquifers under unknown boundary conditions,"Advances in Water Resources, 2014, 15 pages.
Zhang, "Reducing Uncertainty in Calibrating Aquifer Flow Model with Multiple Scales of Heterogeneity"Groundwater, 2014, 9 pages.
Jiao, et al., "A method based on local approximate solutions (LAS) for inverting transient flow in heterogeneous aquifers", Journal of Hydrology, 2014, 5 pages.
Jiao, et al., "Tensor Hydraulic Conductivity Estimation for Heterogeneous Aquifers under Unknown Boundary Conditions", Groundwater, 2014, 12 pages.
G. Dagan, "A Method of Determining the Permeability and Effective Porosity of Unconfined Anisotropic Aquifers", Water Resources Research 3(4), pp. 1059-1071, (1967).
S.P. Neuman, "Thoery of Flow in Unconfined Aquifers Considering Delayed Response of the Water Table", Water Resources Research 8(4), pp. 1031-1045(1972).
H.H. Cooper, J.D. Bredehoeft, I.S. Papadopulos, "Response of a Finite-Diameter Well to an Instantaneous Charge of Water ", Water Resources Research 3(1), pp. 263-269 (1967).
G. Dagan, "A Note on Packer, Slug, and Recovery Tests in Unconfined. Aquifers", Water Resources Research 14(5), pp. 929-934 (1978).
A. Moench, S. Garabedian, D. LeBlanc, "Estimation of:Hydraulic Parameters from an Unconfined Aquifer Test Conducted in a Glacial Outwash Deposit, Cape Cod, Massachusetts", US 41 Geological Survey Professional Paper 1629 US Geological Survey, Reston, Virginia (2001), 82 pages.
C.F. Harvey, S.M. Gorelick, "Mapping hydraulic conductivity; Sequential conditioning with measurements of solute arrival time, hydraulic head, and local conductivity", Water Resourses Research 31(7), pp. 1615-1626 (1995).
D.A. Reynolds, S. Marimuthu, "Deuterium composition and flow path analysis as additional calibration targets to calibrate groundwater flow simulation in a coastal wetlands system", Hydrogeology Journal 15, pp. 515-535 (2007).
T, Sakaki, C.C. Frippiat, M, Komatsu, T.H. Illangasekare, "Drying of a partially saturated rock matrix by fracture ventilation: Experiments and modeling in a single fracture-matrix system", Water Resources Research 45, W11404, doi:10.1029/2008WR007229 (2009), 17 pages.
R.L. Cooley S. Christensen, ".Bias and uncertainty in regression-calibrated models of groundwater flow in heterogeneous media", Advances in Water Resources 29, pp. 639-656 (2006)
P. Gaganis, L. Smith, "Accounting for model error in risk assessments: Alternatives to adopting a bias towards conservative risk estimates in decision models", Advances in Water Resources 31, pp. 1074-1086 (2008).
A.F. Moench, "Importance of the Vadose Zone in Analyses of Unconfined Aquifer Tests", Ground Water 42(2), pp. 223-233, doi:10,1111/j.745 (2004).
P.K. Mishra, S.P. Neuman, "Saturated-unsaturated flow to a well with storage in a compressible unconfined aquifer", Water Resources Research 47, W05553, doi:10.1029/2010WR010177 (2011), 15 pages.
D. Mao, T.C.J. Yeh, L. Wan, J.C, Wen, W, Lu, C.H, Lee, K.C. Hsu "Joint interpretation of sequential pumping tests in unconfined aquifers", Water 'Resources Research 49, pp. 1782-1796 (2013).
D. Mao, T.C.J. Yeh, L. Wan, K.C. Hsu, C.H Lee, J.C. Wen, "Necessary conditions for inverse modeling of flow through variable saturated porous media", Advances in Water Resources 52, pp. 50-61 (2013).
Coleman, T.F., and Y. Li. 1996, "An Interior Trust Region Approach for Nonlinear Minimization Subject to Bounds", SIAM J. Optimization vol, 6, No, 2, pp 418-445.
Davis, S. N., G. M. Thompson, H.W. Bentley, and G. Stiles 1980, "Ground-Water Tracers - A Short Review", Ground Water, vol. 18, No. 1, pp. 14-23.
Grisak, G., W.F. Merritt, and D.W. Williams. 1977, "A fluoride borehole dilution apparatus for groundwater velocity measurements", Canadian Geotechnical Journal 14, pp. 554-561.
Jiao, J. and Y. Zhang. 201.4, "Two-Dimensional Inversion of Confined and Unconfined Aquifers under Unknown Boundary Conditions", Advances in Water Resources, 65, pp. 43-57.
Novakowski, K., G. Bickerton, P. Lapcevic, J. Voralek, and N. Ross. 2006, "Measurements of groundwater velocity in discrete rock fractures"Journal of Contaminant Hydrology 82., pp. 44-60.
Ptak, T., M. Piepenbrink, and E. Martac. 2004, "Tracer tests fbr the investigation of heterogeneous porous media and stochastic modelling of flow and transport —a review of some recent developments", Journal of Hydrology 294, pp. 122-163.
Pitrak, M., S. Mares, and M. Kobr. 2007, "A Simple Borehole Dilution Technique in measuring Horizontal Ground Water Flow", Ground Water vol. 45, No. 1, pp. 89-92.
Rojas, R., L. Feyen, and A. Dassargues, 2008, "Conceptual model uncertainty in groundwater modeling; Combining generalized likelihood uncertainty estimation and bayesian model averaging", Water Resources Research 44: W12414,doi:10.1029/2008WR006908, 16 pages.
Zhou, H., J. J. Gomez-Hernandez, and L. Li (2014), "Inverse methods in hydrogeology: Evolution and recent trends ", Advances in Water Resources, vol. 63, pp. 22-37.
Jianying Jiao, Ye Zhang (2015), "Functional parameterization for hydraulic conductivity inversion with uncertainty quantification", Hydrogeology Journal; 23, 15 pages.
Kowalsky M.B., Chen ,1., Hubbard S.S. (2006), "Joint Inversion of Geophysical and Hydrological Data for improved Subsurface Characterization", The Leading Edge. 4 pages.
Maunder, E. A. W. (2003), "Trefftz in translation", Comput. Assist. Mech. Eng. Sci., 10, 24 pages.
de Vries, et al., "Groundwater recharge: an overview of processes and challenges", pp. 107-115, Hydrogeologvy Journal, 10:5-17, 2002.
Williams D.M., Zemanek J., Angona F.A.., Denis C.L., Caldwell R. L. (1984), "The Long Space Acoustic Logging Tool", Trans, SPWLA 25th Ann. Log. Symp., 16 pages.
I. The Mathworks, Optimization ToolboxTM Users Guide. Mathworks, Inc., Natick, Massachusetts: (2012).

(56) References Cited

OTHER PUBLICATIONS

P.K. Mishra, S.P. Neuman; "Improved forward and inverse analyses of saturated-unsaturated flow toward a well in a compressibl eunconfined aquifer", Water Resources Research 46, W07508, doi:10.1029/2009WR008899 (2010).

Domzalski, S., J. J. Pop, W. G. Boydell, and A. Hadbi. 2003. "Multilayer Modelling to Define a Fluvial Sandstone Confined aquifer's Dynamic Structure Using Multistation Multiprobe Formation Tester Measurements"; paper SPE 84094, presented at the SPE Annual Technical Conference and Exhibition, Denver, Co, Oct. 5-8.

Liu, et al., "Parameter estimation in nonlinear enviromental problems", Stoch Environ Res risk Assess (2010), 24: 1003-1022;

Maunder, "Hybrid equilibrium plate elements of high degree", Department of Engineering, School of Engineering and Computer Science, 2003, 17 pages.

Bramley, R.; Wang, X. "SPLIB: A Library of Iterative Methods for Sparse Linear Systems", 1995, 25 pages.

Doherty J., Pest documentation, http://www.pesthomepage.org/Home.php, retrieved from URL PESThomePage.org on Dec. 13, 2018, 2 pages.

Nelson, R, W. (1968), in place determination of permeability distribution of heterogeneous porous media through analysis of energy dissipation, Society of Petroleum Engineers Journal, 3, 33-42.

Trefftz, E. (1926), Ein Gegenstüek zum Ritzschen Verfahren, .Pratt. 2nd Int. Cong. Appl. Mech.,. Zurüch, 131-137.

D.S. Oliver, A.C. Reynolds, N. Liu, "Inverse Theory for Petroleum Reservoir Characterization and History Matching"vol, 380 pages, 1st edn. (Cambridge Unviersity Press, 2008).

\* cited by examiner

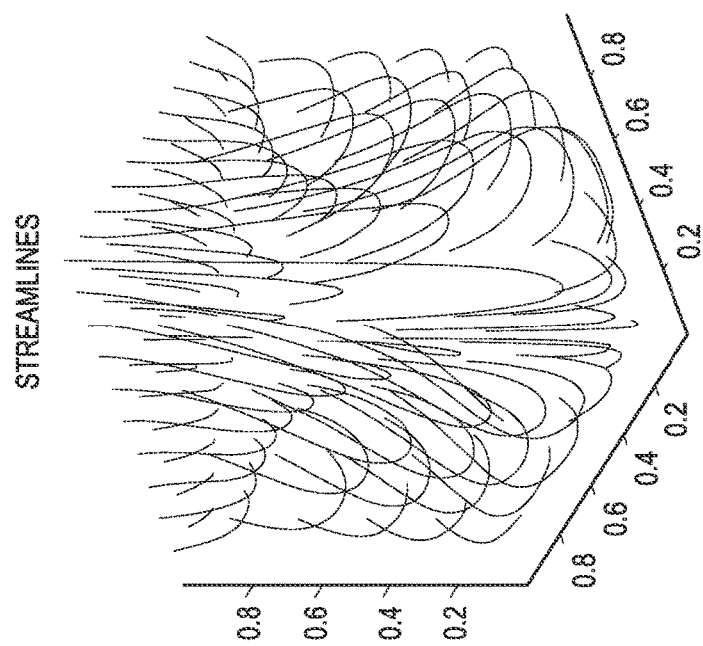
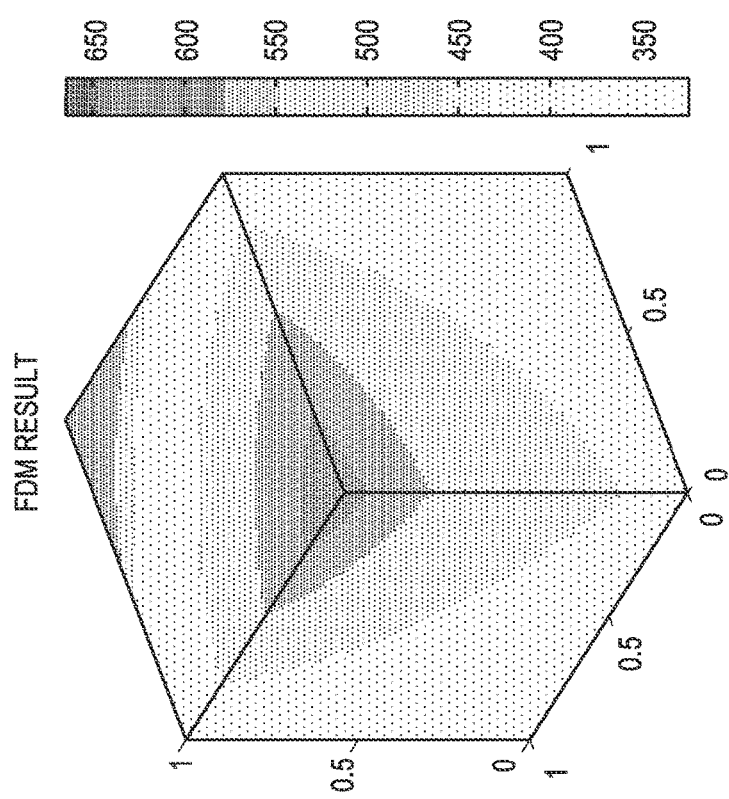
FIG. 16A
FIG. 16B

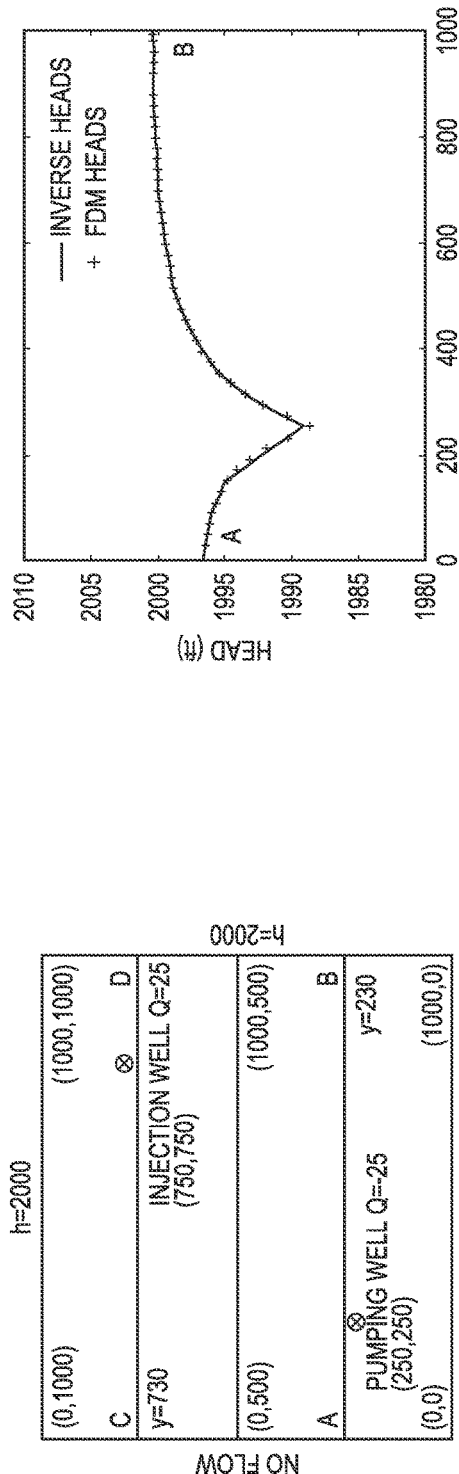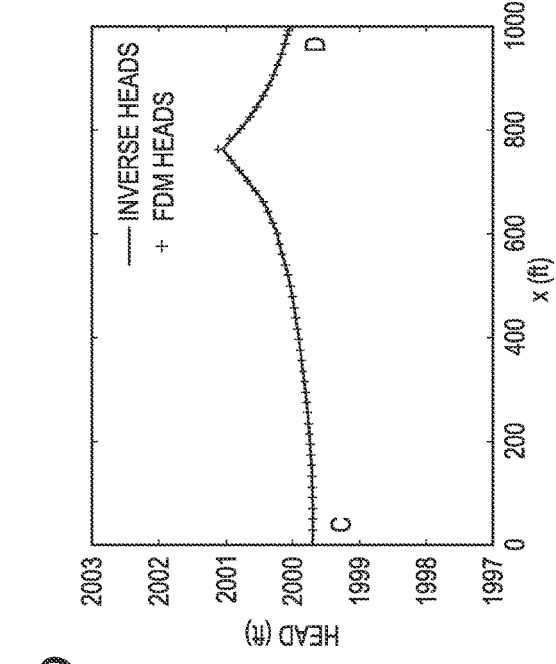
FIG. 26E
FIG. 26F
FIG. 26D

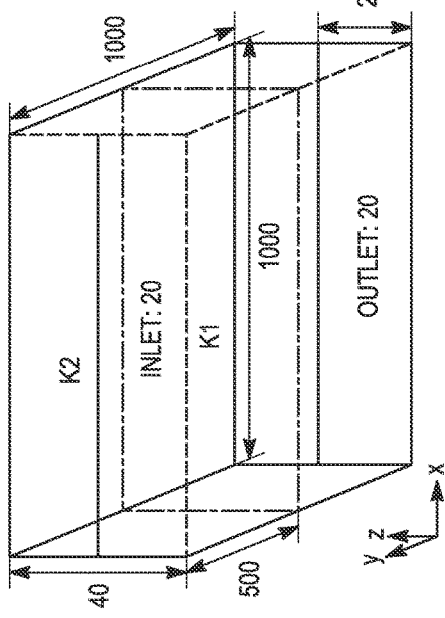
FIG. 27
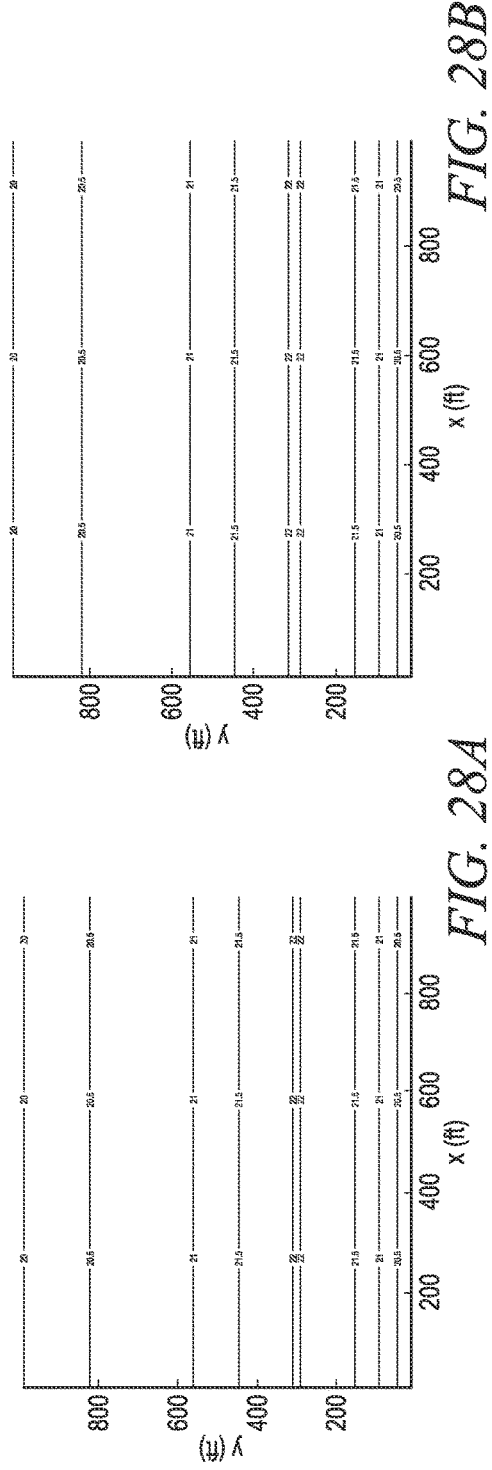
FIG. 28A
FIG. 28B

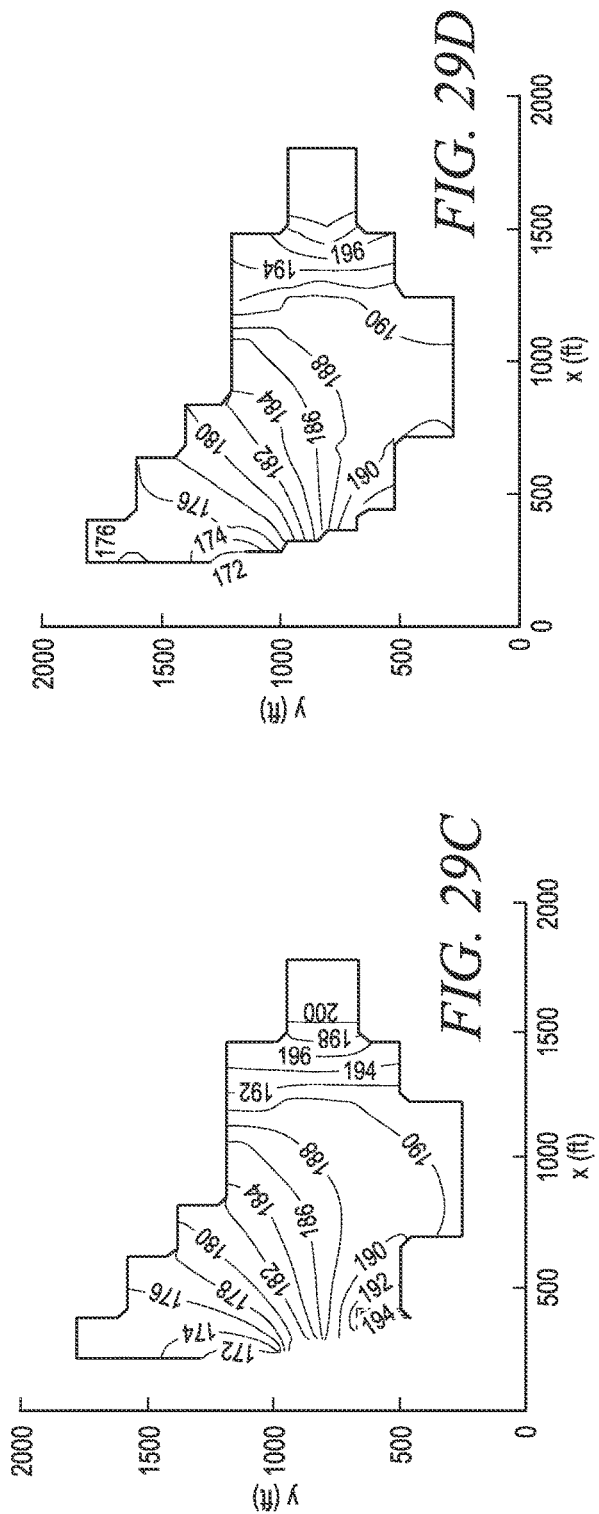
FIG. 29C
FIG. 29D
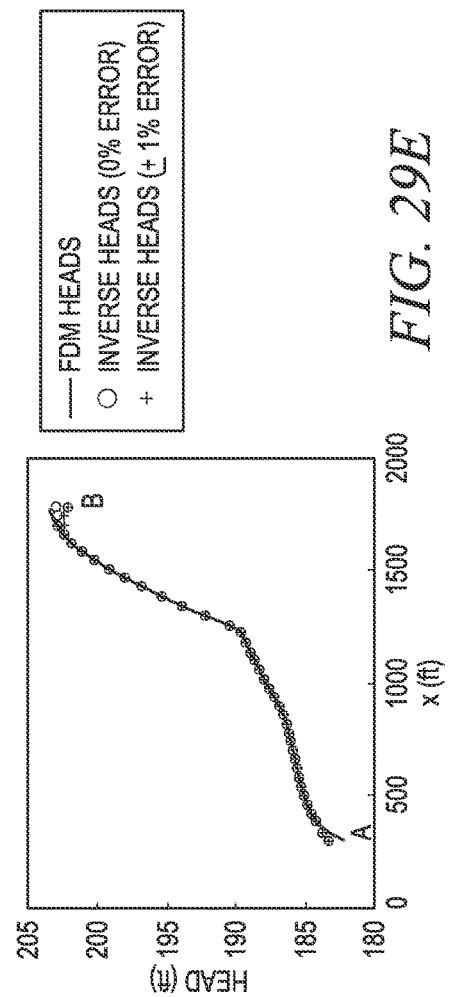
FIG. 29E

FWD

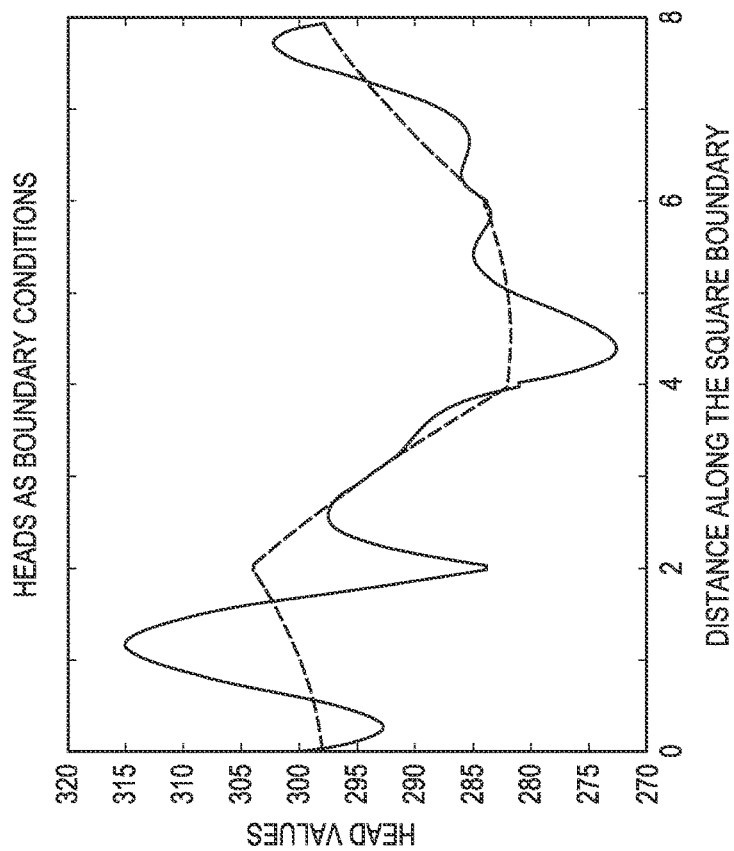
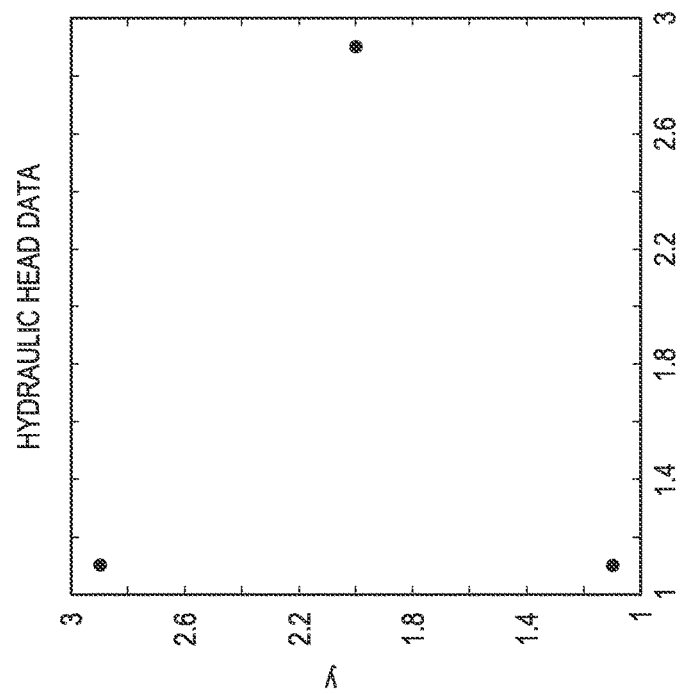
FIG. 34B
FIG. 34A

SYSTEM AND METHOD OF USING THE SAME

The present application claims the benefit of U.S. Provisional Patent Application No. 61/855,823 filed May 24, 2013 the above-identified provisional patent applications being fully incorporated herein by reference.

BACKGROUND OF THE INVENTION

Field of the Invention

The present invention generally relates to a system and method for parameter estimation of steady state flow in heterogeneous aquifers, and more particularly to a method and system for reducing uncertainty in calibrating aquifer flow and estimating aquifer hydraulic conductivities.

SUMMARY OF THE INVENTION

Accordingly, the invention is directed to system and method of using the same that substantially obviates one or more of the problems due to limitations and disadvantages of the related art.

An advantage of an embodiment of the invention is to provide a system and method configured to provide simultaneous estimation of parameters and boundary condition for two-dimensional confined or unconfined aquifers.

Yet another advantage of an embodiment of the invention is to provide a system and method configured to increase accuracy of the inversion increases with grid refinement and increasing amount of measured data.

Still yet another advantage of an embodiment of the invention is a system and method to provide inversion results are stable when error of the measurement data is increasing.

Yet still another advantage of an embodiment of the invention is a system and method configured to provide equivalent conductivities and average recharge rate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system and method for obtaining a best fit to the observed data with stable convergence, without the need for iterations. It is not based on solving a BVP, thus a priori knowledge of the BCs is not necessary. Nor does it attempt to fit BCs to observations, obviating the nonuniqueness issue.

This Summary section is neither intended to be, nor should be, construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 16A-B illustrate a nonlinear flow model, or Model2. FDM true solution of heads (a) and streamlines (b).

FIGS. 23a-c illustrate a computational domain for confined aquifer inversion: (a) case 1, (b) case 2 and case 3, and (c) case 4. (See text for the description of case 5.) The dashed grey line in the middle of (c) indicates the new parameterization adopted by case 6 (upper zone: $K2_{eq}$, Ñ2; lower zone: $K1_{eq}$, Ñ1). For all cases, the Dirichlet boundary condition is shown as "Inlet" head and "Outlet" head. All length units are in ft.

FIGS. 26a-26f illustrate a confined problem (case 7) with pumping and injection wells. (a) location of the wells and true model BC; (b) true FDM heads and recovered heads along profile AB; (c) true FDM heads and recovered heads along profile CD. (e), (f) and (g) describe a similar problem except the left-hand-side boundary is no-flow.

FIG. 27 illustrates a computational domain for an unconfined aquifer. Boundary condition of this problem is shown: no-flow on the left, right, and bottom boundaries; a fixed head of 20 ft is specified to the front and back faces (red lines). A uniform recharge rate is specified to the model top. Conductivity of case 1 is uniform. case 2 has two conductivity zones: K1 in the front half of the model domain; K2 in the back half.

FIGS. 28a-28d illustrate a head contour map of the unconfined aquifer (case 2): (a) FDM true model; (b) inversion result with error-free measured heads; (c) inversion result with ±1% head measurement errors; (d) inversion result with ±5% errors.

FIGS. 29a-29e illustrates a (a) FDM true model with four conductivities (K1=5, K2=50, K3=100, K4=150) and N=0.0005. Location of a profile, AB, is shown at y=860 ft. (b) inverse grid (31 cells) and the measurement location (* denote 62 sampled heads; x denote 4 sampled $q_x$). (c) head contours predicted by the true model; (d) head contours predicted by inversion with 31 cells when head measurement error is ±1%. The same contour levels as those of the true model are used. (e) head profiles predicted along AB by the true model and using inversion (31 cells) when measurement errors are increased.

FIGS. 34a-34d illustrate a non-uniqueness in fitting model BC in a homogeneous and isotropic aquifer within a square region [1,1]-[3,3] (reprinted from Irsa and Zhang, 2012). (a) Observation data: 3 heads and one integrated flow rate along the right boundary, (b) Two different Dirichlet BC, (c) & (d) Streamlines driven by each BC.

DETAILED DESCRIPTION OF THE ILLUSTRATED EMBODIMENTS

Figure 1:
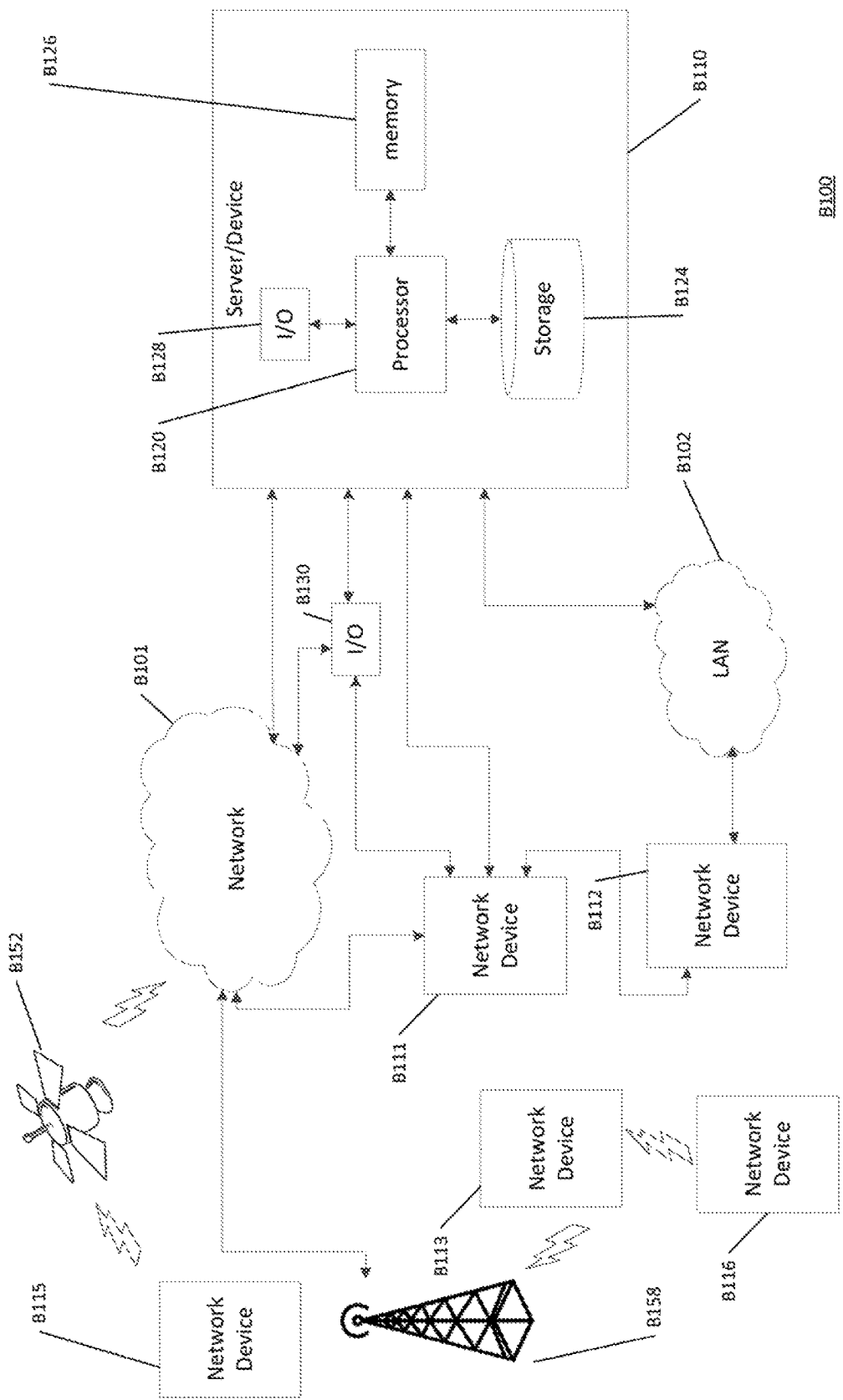
Fig. 1 illustrates an exemplary block diagram of a communication network for a pump system according to an embodiment.

Functional units described in this specification and figures may be labeled as modules, or outputs in order to more particularly emphasize their structural features. A module and/or output may be implemented as hardware, e.g., comprising circuits, gate arrays, off-the-shelf semiconductors such as logic chips, transistors, or other discrete components. They may be fabricated with Very-large-scale integration (VLSI) techniques. A module and/or output may also be implemented in programmable hardware such as field programmable gate arrays, programmable array logic, programmable logic devices or the like. Modules may also be implemented in software for execution by various types of processors. In addition, the modules may be implemented as a combination of hardware and software in one embodiment.

An identified module of programmable or executable code may, for instance, include one or more physical or logical blocks of computer instructions which may, for instance, be organized as an object, procedure, or function. Components of a module need not necessarily be physically located together but may include disparate instructions stored in different locations which, when joined logically together, include the module and achieve the stated function for the module. The different locations may be performed on a network, patient device, provider device, server and combinations of one or more of the same. A module and/or a program of executable code may be a single instruction, or many instructions, and may even be distributed over several different code segments, among different programs, and across several memory devices. Similarly, data or input for the execution of such modules may be identified and illustrated herein as being an encoding of the modules, or being within modules, and may be embodied in any suitable form and organized within any suitable type of data structure.

In one embodiment, the system, components and/or modules discussed herein may include one or more of the following: a server or other computing system including a processor for processing digital data, memory coupled to the processor for storing digital data, an input digitizer coupled to the processor for inputting digital data, an application program stored in one or more machine data memories and accessible by the processor for directing processing of digital data by the processor, a display device coupled to the processor and memory for displaying information derived from digital data processed by the processor, and a plurality of databases or data management systems.

In one embodiment, functional block components, screen shots, user interaction descriptions, optional selections, various processing steps, and the like are implemented with the system. It should be appreciated that such descriptions may be realized by any number of hardware and/or software components configured to perform the functions described. Accordingly, to implement such descriptions, various integrated circuit components, e.g., memory elements, processing elements, logic elements, look-up tables, input-output devices, displays and the like may be used, which may carry out a variety of functions under the control of one or more microprocessors or other control devices.

In one embodiment, software elements may be implemented with any programming, scripting language, and/or software development environment, e.g., Fortran, C, C++, C#, COBOL, Apache Tomcat, Spring Roo, Web Logic, Web Sphere, assembler, PERL, Visual Basic, SQL, SQL Stored Procedures, AJAX, extensible markup language (XML), Flex, Flash, Java, .Net and the like. Moreover, the various algorithms in the embodiments may be implemented with any combination of data structures, objects, processes, routines or other programming elements.

In one embodiment, any number of conventional techniques for data transmission, signaling, data processing, network control, and the like as one skilled in the art will understand may be used. Further, detection or prevention of security issues using various techniques known in the art, e.g., encryption, may be also be used in embodiments of the invention. Additionally, many of the functional units and/or modules, e.g., shown in the figures, may be described as being "in communication" with other functional units and/or modules. Being "in communication" refers to any manner and/or way in which functional units and/or modules, such as, but not limited to, input/output devices, computers, laptop computers, PDAs, mobile devices, smart phones, modules, and other types of hardware and/or software may be in communication with each other. Some non-limiting examples include communicating, sending and/or receiving data via a network, a wireless network, software, instructions, circuitry, phone lines, Internet lines, fiber optic lines, satellite signals, electric signals, electrical and magnetic fields and/or pulses, and/or the like and combinations of the same.

By way of example, communication among the users, subscribers and/or server in accordance with embodiments of the invention may be accomplished through any suitable communication channels, such as, for example, a telephone network, an extranet, an intranet, the Internet, cloud based communication, point of interaction devices (point of sale device, personal digital assistant, cellular phone, kiosk, and the like), online communications, off-line communications, wireless communications, RF communications, cellular communications, Wi-Fi communications, transponder communications, local area network (LAN) communications, wide area network (WAN) communications, networked or linked devices and/or the like. Moreover, although embodiments of the invention may be implemented with TCP/IP communications protocols, other techniques of communication may also be implemented using IEEE protocols, IPX, Appletalk, IP-6, NetBIOS, OSI or any number of existing or future protocols. Specific information related to the protocols, standards, and application software utilized in connection with the Internet is generally known to those skilled in the art and, as such, need not be detailed herein.

In embodiments of the invention, the system provides and/or receives a communication or notification via the communication system to or from an end user. The communication is typically sent over a network, e.g., a communication network. The network may utilize one or more of a plurality of wireless communication standards, protocols or wireless interfaces (including LTE, CDMA, WCDMA, TDMA, UMTS, GSM, GPRS, OFDMA, WiMAX, FLO TV, Mobile DTV, WLAN, and Bluetooth technologies), and may be provided across multiple wireless network service providers. The system may be used with any mobile communication device service (e.g., texting, voice calls, games, videos, Internet access, online books, etc.), SMS, MMS, email, mobile, land phone, tablet, smartphone, television, vibrotactile glove, voice carry over, video phone, pager, relay service, teletypewriter, and/or GPS and combinations of the same.

FIG. 1 illustrates an exemplary block diagram of a communication network for a system according to an embodiment.

Referring to FIG. 1, communication network B100 includes one or more networks, including wide-area network B101, e.g., the Internet, company or organization Intranet, and/or sections of the Internet (e.g., virtual private networks, Clouds, and the Dark Web), and local-area network B102, e.g., interconnected computers localized at a geographical and/or organization location and ad-hoc networks connected using various wired means, e.g., Ethernet, coaxial, fiber optic, and other wired connections, and wireless means, e.g., Wi-Fi, Bluetooth, and other wireless connections. Communication network 100 includes a number of network devices B110-B116 that are in communication with the other devices through the various networks B101 and B102 and through other means, i.e., direct connection through an input/output port of a network device B128, direct connection through a wired or wireless means, and indirect connection through an input-output box, e.g., a switch.

Network devices B110-B116 may also connect through the networks B101 and B102 using various routers, access points, and other means. For example, network device B113 wireless connects to a base station B158, which acts as an access point to the wide area network B101. Base station B158 may be a cellular phone tower, a Wi-Fi router or access point, or other devices that allow a wireless device B113 to connect to a network, e.g., wide area network B101, through the base station B158. Base station B158 may be connected directly to network B101 through a wired or wireless connection or may be routed through additional intermediate service providers or exchanges. Wireless device B113 connecting through base station B158 may also act as a mobile access point in an ad-hoc or other wireless network, providing access for network device B116 through network device B113 and base station B158 to network B101.

In some scenarios, there may be multiple base stations, each connected to the network B101, within the range of network device B113. Network device B113 may be travelling and moving in and out of the range of each of the multiple base stations. In such case, the base stations may perform handoff procedures with the network device B113 and other base stations to ensure minimal interruption to the network device B113's connection to network B101 when the network device B113 is moved out of the range of the handling base station. In performing the handoff procedure, the network device B113 and/or the multiple base stations may continuously measure the signal strength of the network device B113 with respect to each base station and handing off the network device B113 to another base station with a high signal strength to the network device B113 when the signal strength of the handling base station is below a certain threshold.

In another example, network device B115 may wirelessly connect with an orbital satellite B152, i.e., when the network device B115 is outside of the range of terrestrial base stations. The orbital satellite B152 may be wirelessly connected to a terrestrial base station that provides access to network B101.

In other cases, orbital satellite B152 or other satellites may provide other functions such as global positioning and providing the network device B115 with location information of the network device B115 directly without needing to pass information to the network B101. Network device B113 may also use geolocation methods, e.g., measuring and analyzing signal strength, using the multiple base stations to determine location without needing to pass information to the network B101.

In one scenario, network device B112 may connect to wide area network B101 through the local area network B102 and network device B110. Here, the network device B110 may be a server, router, gateway, or other devices that provide access to wide area network B101 for devices connected with local area network B102.

In one or more embodiments, the computations described herein may be performed by software, hardware, combinations of the same on devices connected to the network. Various sensors may be utilized to enable real-time analysis. Moreover, the system may be offered as software as a services.

In one embodiment, a method for estimating steady-state hydrogeological model parameters and model state variables in an aquifer where boundary conditions are unknown. The method is adapted from a recently developed potential theory technique for solving general inverse/reconstruction problems. Unlike many inverse techniques used for groundwater model calibration, the new method is not based on fitting and optimizing an objective function, which usually requires forward simulation and iterative parameter updates. Instead, it directly incorporates noisy observed data (hydraulic heads and flow rates) at the measurement points in a single step, without solving a boundary value problem. The new method is computationally efficient and is robust to the presence of observation errors. It has been tested on two-dimensional groundwater flow problems with regular and irregular geometries, different heterogeneity patterns, variances of heterogeneity, and error magnitudes. In all cases, parameters (hydraulic conductivities) converge to the correct or expected values and are thus unique, based on which heads and flow fields are constructed directly via a set of analytical expressions. Accurate boundary conditions are then inferred from these fields. Accuracy of the direct method also improves with increasing amounts of observed data, lower measurement errors, and grid refinement. Under natural flow (i.e., no pumping), the direct method yields an equivalent conductivity of the aquifer, suggesting that the method can be used as an inexpensive characterization tool with which both aquifer parameters and boundary conditions can be inferred.

Introduction

In many physical sciences we've surveyed, parameter estimation studies have focused on the indirect inverse method solving a Boundary Value Problem (BVP) to optimize an objective function, e.g., measurement-to-model misfits. Such approaches satisfy the known physical and mathematical constraints, are easily adaptable, and have proven to be robust and efficient in many applications.

However, solution of the BVP requires the prescription of boundary conditions (BCs) which are often unknown. In nonlinear problems, parameter estimation via the indirect method is often an iterative procedure involving repeated simulations of the BVP—a computationally demanding task when the model size is large. Though both model parameters and model BC can be modified/updated during iterations, the inverse problem can be ill-posed, e.g., instability, non-uniqueness, and failure to converge. These issues can be addressed by providing additional (independent) constraints in the form of supplemental or prior information on parameters. However, BVP domain is often a cut-out region where the BC can be highly discontinuous, causing convergence issues. Furthermore, an infinite number of BC may provide the same solution at the same observation points, thus the inferred BCs are generally non-unique.

The indirect inverse method is extensively investigated in hydrogeology, see reviews, e.g. [Yeh, 1986; Ginn & Cushman, 1990; McLaughlin & Townley, 1996; Marsily et al., 2000, Carrera et al., 2005; Vrugt et al., 2008a]. To address ill-posedness, a variety of approaches have been proposed, e.g., imposing parameter bounds or parameter lumping [Hill & Tiedeman, 2007], regularization [Cooley, 1982, 1983; Carrera & Neuman, 1986a; Kitanidis, 2011], sample network design [Delhomme, 1978; Wagner, 1995; Asefa et al, 2004; Janssen et al., 2008], reducing model structure error [Doherty & Welter, 2010], adopting a highly parameterized or geostatistical formulation [Zimmerman et al., 1998; Hunt et al., 2007; Tonkin & Doherty, 2009; Liu & Kitanidis, 2011], incorporating static geologic data [McKenna & Poeter, 1995; Sun et al., 1995; Tsou et al., 2006], and utilizing auxiliary data such as solute concentration [Gailey et al., 1991; Medina et al., 1996, Anderman et al., 1996; Weiss & Smith, 1998a], geophysical measurements [Hyman et al., 1994; Day-Lewis et al., 2006; Ronayne et al., 2008; Camporese et al., 2011], and temperature [Woodbury & Smith, 1988; Bravo et al., 2002; Anderson, 2005]. Moreover, to enhance computational efficiency in calculating sensitivities for the gradient-based (local) methods, adjoint state techniques are developed [Sun & Yeh, 1985; Carrera & Neuman, 1986b; Liu & Kitanidis, 2010]. To enhance robustness in optimizing the objective function, different search algorithms are proposed, including global methods that are not gradient based [Wang & Zheng, 1996; Morshed & Kaluarachchi, 1998; Vrugt et al., 2008b; Keating et al., 2010]. Instability due to over-parameterization is usually addressed by regularization (e.g., parameter bounds, prior information, smoothing, zonation) [Sun & Yeh, 1985; Eppstein & Dougherty, 1996; McLaughlin & Townley, 1996; Capilla et al., 1997; Weiss & Smith, 1998b]. In transient or strongly nonlinear cases, a variety of data assimilation techniques have also been developed [Eppstein & Dougherty, 1996; Zhu & Yeh, 2005; Chen & Zhang, 2006; Liu et al., 2008].

A direct method can also be used to solve the inverse problem. The direct method is computationally efficient, though its use has not been widely adopted due to instability in the estimated parameters when the observed data are corrupted by noise. In hydrogeology, initial attempts were made to directly determine transmissibility from streamlines by inverting the flow equation along these lines, though the method was found sensitive to measurement errors [Nelson, 1960, 1961, 1968]. Though parameter oscillations can be controlled by imposing bounds on the observation errors [Kleinecke, 1971], solutions are often unreliable. Other direct formulations, for example, the Direct Matrix Method, create a set of superdeterminate algebraic equations from discretizing the BVP [Neuman, 1973; Sagar et al., 1975]. In a two-dimensional problem, when random noise was added to the observed data, this method was found accurate when the parameter dimension was small [Yeh et al., 1983]. Sun [1994] further stated that the necessary condition for parameter identifiability is that the number of parameters is smaller than the number of the observation data. Many direct formulations require that state variables at measurement points be interpolated to all grid nodes, thus inversion results are influenced by not only the measurement error but also the interpolation error. Another means of controlling instability is to assume that transmissibility satisfies a Cauchy criterion [Friend & Pinder, 1973], although the solution can be sensitive to the degree of approximation in the finite element shape functions.

Recently, a new potential theory technique is being developed for solving general inverse/reconstruction problems with an efficient direct method, where errors in measurements do not generally cause stability issues even in certain cases when the systems are ill-posed. The method, referred to as Stress Trajectories Element Method, has been applied to solid mechanics and geophysics problems with excellent convergence behaviors. Modifications of this method were also proposed for other applications, yielding unique and stable parameters that are also robust to the presence of observation errors [Irsa & Galybin, 2010; Galybin & Irsa, 2010; Irsa, 2011]. The new method consists of discretizing the problem domain into elements where a state variable is approximated with a function satisfying the governing equation a priori, i.e., the Trefftz method [Trefftz, 1926; an English translation is found in Maunder, 2003]. It does not rely on formulating superdeterminate equations, thus the number of parameters is not constrained by the number of state variables. It directly incorporates the state variables at the observation points without the need for interpolation or iterations. Using smooth Laplace's solution with unknown coefficients, the method in effect imposes a form of regularization: the coefficients are estimated by "bending" the approximate solution towards the true solution, following the observations with its weights. Unlike the existing indirect and direct methods, the new method does not discretize a BVP, thus a priori knowledge of the BC is not required. Nor does it attempt to fit BC to observations during inversion, obviating the non-uniqueness issue. In a single step (i.e., single matrix solve), model parameters and model state variables are simultaneously estimated from which BC of the modeled region can be inferred. The method is thus computationally efficient.

In one embodiment, a steady-state groundwater flow in a homogeneous and isotropic aquifer is investigated. Hydraulic head of each element is approximated by a function satisfying the Laplace's equation, and Darcy flux is obtained from differentiating the head. The unknown hydraulic conductivity (K) is estimated together with parameters of the head and flux functions. The method is then extended to the study of a heterogeneous isotropic aquifer characterized by different hydrofacies zones. To ensure head and flux continuity at element boundaries, a collocation technique is used: elements within one hydrofacies assume continuous heads and fluxes in all directions, where elements separated by a material interface assume continuity in head and continuity of the normal fluxes. The inversion problem is thus stated with correct physical constraints, with advantages derived from the direct formulation: (1) model fits the data directly and there is no need to fit an objective function; (2) besides measurement error, numerical discretization is the only source of error, convergence is assured when collocation error decreases with increasing number of elements; (3) element shape is flexible, since nodal connection is not needed in evaluating the fluxes. Given observed hydraulic head data, the direct method can uniquely determine the head and flow fields as well as the BCs. However, to also obtain the parameters (hydraulic conductivity), at least one flow rate measurement is necessary. Although direct flow rate measurement is not as frequently available as the head data, recent development in the field techniques have made such measurements more readily available [Leap & Kaplan, 1988, Bayless et al., 2011; Devlin et al., 2012]. In the following sections, non-uniqueness in fitting BC for general inversion is discussed first. Then the new direct method is described and demonstrated with several groundwater reconstruction problems. Later on, strength and limitation of the method are discussed, before future research is indicated.

Non-Uniqueness in Fitting Boundary Conditions to a Steady State Problem

Most existing methods utilize the solution of a BVP with prescribed BCs which, along with the parameters of the model, can be modified and updated during inversion. However, BCs fitted by such procedure can suffer non-uniqueness, the severity of which depends on the quantity and quality of the observed data. When data quantity/quality is high, the non-uniqueness is less pronounced, although there still exists an infinite number of BCs providing solutions that satisfy the observed data and prior information. Here, we illustrate this problem by a two-dimensional (2D) example of steady-state groundwater flow in a homogeneous isotropic aquifer for which hydraulic head satisfies the Laplace's equation: $\nabla^2 h=0$. Solution of this equation is a harmonic function, which is related to a complex valued holomorphic function: $W(z)$; $z=x+iy$; $z \in C$.

$W(z)$ has real and imaginary parts, both of which are harmonic functions. In some applications the imaginary part (complex conjugate harmonic function to the real part) has physical meanings which can be useful to recover. However, at this point we are only interested in the real part. Let the solution of the Laplace's equation be expressed as $$h(x,y) = Re[W(z)], \quad (1)$$

where Re stands for the real part. $W(z)$ can be, for instance, a polynomial:

$$W(z) = \sum_{k=0}^{n} a_k z^k \quad (2)$$

where $\alpha_k$ is a complex parameter and z is a complex variable. Next, we assume that there exist N observed heads at locations $z_j = x_j + i y_j$, $j=1, \ldots, N$, which can be directly sampled from the solution. Given the solution, we can substitute any boundary points into (1) to obtain a set of Dirichlet BC. Now, let's introduce an arbitrary holomorphic function $W^*(z-z_j)$ with its roots placed at the observation points (for the sake of simplicity it is also assumed a polynomial):

$$W*(z-z_j) = \prod_{k=1}^{r} b_k(z-z_j)^k, \begin{cases} r = N, j = k \\ r > N, j \in \{1, \ldots N\} \end{cases}, \quad (3)$$

where $b_k$ is a complex parameter. The real part of $W^*$ is:

$$h*(x,y) = Re[W*(z-z_j)], \quad (4)$$

h* satisfies the Laplace's equation, and its roots are placed exactly at the observed points thus h* is a solution of the same problem. Let us introduce an additional arbitrary parameter m. Due to linearity of the Laplace's equation, h+mh*(x, y) is also a solution. Substitution of the observed data coordinates $z_j$ into the superposition does not affect the observed data (h) since mh*(x,y) vanishes at these points. For any r≥N and any m, h*(x,y) always vanishes at the data locations. For any $b_k$, r, and m, there exist an infinite number of solutions satisfying the observed heads and each of the infinite solutions has a different set of BC that can be obtained by substituting z at the boundary. In other words, there exists an infinite number of BCs satisfying the observed heads, with associated infinite solutions describing different flow fields.

One may assume, as it is commonly assumed, that by adding flow rate data, the non-uniqueness in fitting the heads can be reduced, and perhaps a unique solution is possible. For example, a flow rate measured along any distance/contour in the aquifer would impose an additional constraint on the solution. Here however, we demonstrate using a 2D square model with a constant K that adding flow rate data cannot ensure uniqueness of the solution. In this case, a flow rate $Q_x$ [$L^2$/T] along the y-axis (−1 to 1) can be used to modify the arbitrary function h*:

$$Q_x|_y = \int_{-1}^{1} -K \frac{\partial h*(x,y)}{\partial x} dy = -K \int_{-1}^{1} Re \frac{\partial W*(z-z_j)}{\partial z} dy, \quad (5)$$

Eqn. (5) provides an additional constraint equation leading to one less coefficients, i.e., $b_k$, k=1, ..., r−1. However, an infinite number of $b_k$ satisfies the head solutions. The addition of flow rate does not guarantee a unique solution, but allows for the determination of K, which would remain a free undetermined parameter without the flow rate. To reduce the number of possible solutions, an infinite number of flow rate measurements are needed. With respect to eqn. (3), this would be r flow rates. With each additional observation, be it head or flow rate, the class of functions (eqn. (3)) converges towards a unique solution.

Figure 1B:
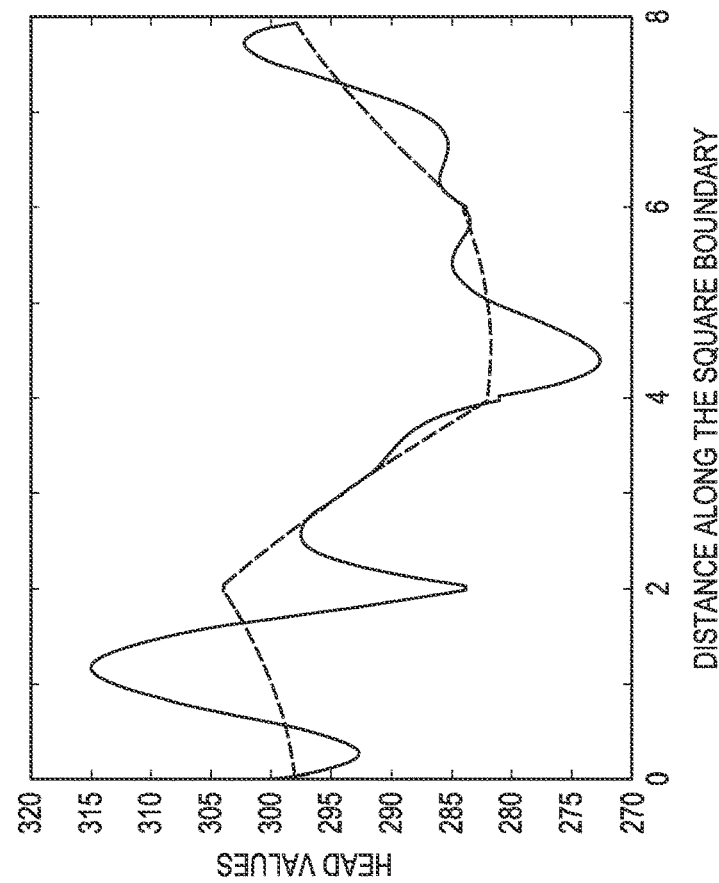
FIG. 1b illustrates non-uniqueness in fitting BC in a 2D homogeneous and isotropic aquifer within a square region [1,1]-[3,3] and two different Dirichlet BCs.
Figure 1A:
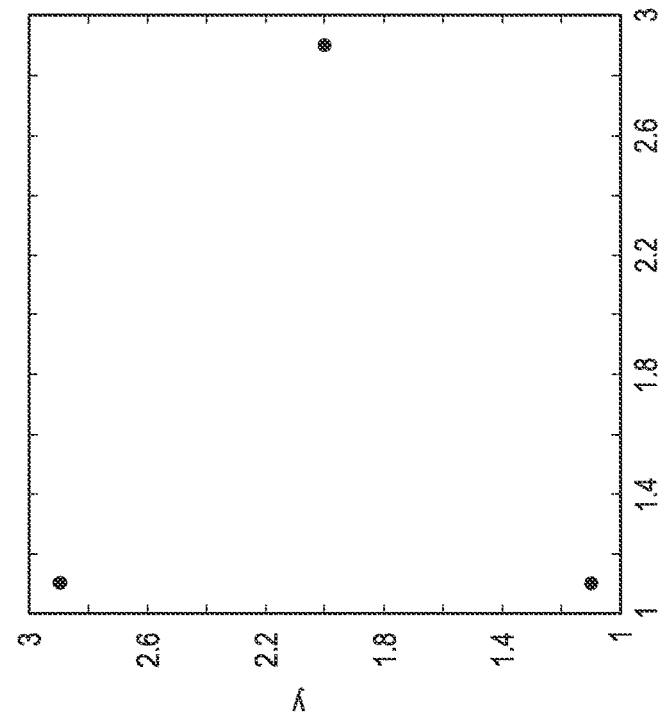
FIG. 1a illustrates non-uniqueness in fitting BC in a 2D homogeneous and isotropic aquifer within a square region [1,1]-[3,3] and observation data: 3 heads and one flow rate at the right boundary.
Figure 1D:
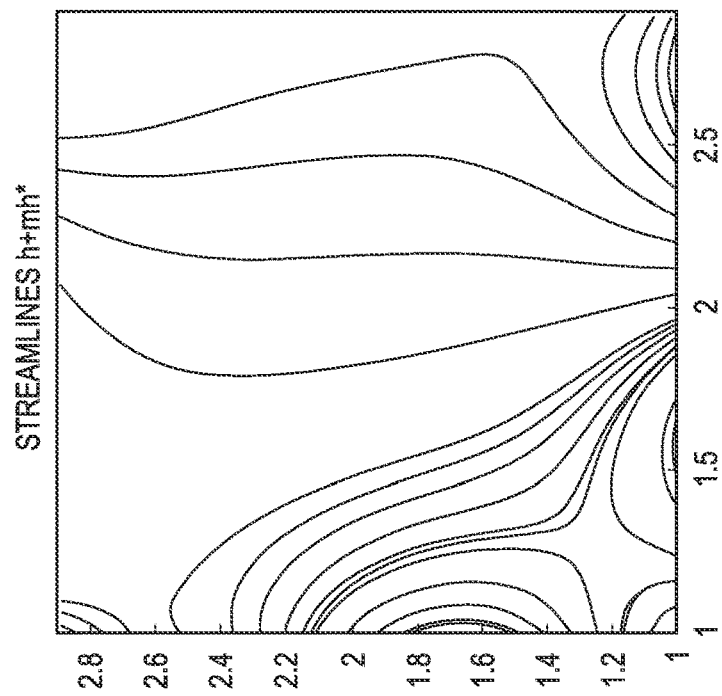
FIGS. 1c-1d illustrate non-uniqueness in fitting BC in a 2D homogeneous and isotropic aquifer within a square region [1,1]-[3,3] and streamlines driven by each BC.
Figure 1C:
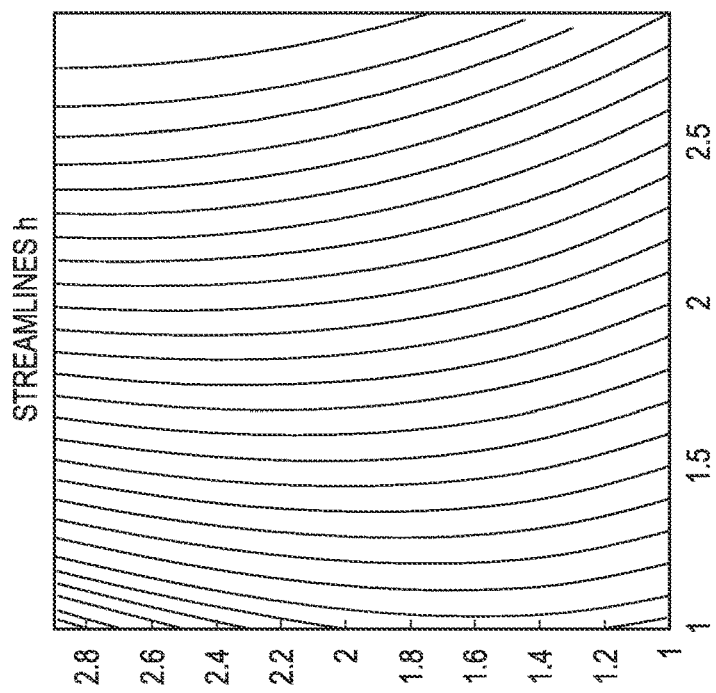

FIG. 1A illustrates non-uniqueness in fitting BC in a 2D homogeneous and isotropic aquifer within a square region [1,1]-[3,3] and observation data: 3 heads and one flow rate at the right boundary. FIG. 1B illustrates non-uniqueness in fitting BC in a 2D homogeneous and isotropic aquifer within a square region [1,1]-[3,3] and two different Dirichlet BCs. FIGS. 1C-1D illustrate non-uniqueness in fitting BC in a 2D homogeneous and isotropic aquifer within a square region [1,1]-[3,3] and streamlines driven by each BC.

Referring to FIGS. 1A-1C, the problem is graphically. The solution, W(z), is assumed as a $2^{nd}$ order polynomial, with parameters $a_0$=300 and $a_1=a_2$=1+i. The corresponding hydraulic head is h(x, y)=300+x−y−2xy+($x^2-y^2$). Three head data (N=3) are sampled directly from the solution at locations z ε(1.1+i1.1; 1.1+i2.9; 2.9+i2). A flow rate is obtained analytically along the y axis on the right-hand-side boundary (this flow rate could be given anywhere within the domain). The arbitrary function W*(z−$z_j$) of eqn. (3) is introduced with these parameters: r=N, m=0.4 and $b_k$=1+i1.19. Parameters $b_k$ are uniform and are derived to satisfy the flow rate for a constant K value of 1 (eqn. (5)). Two different Dirichlet BCs are specified along the model boundary (FIG. 1(b)), leading to different reconstructed flow fields (FIG. 1(c-d)), while both solutions honor the same observed data of 3 heads and one flow rate. In this problem, the additional flow rate at the right-hand-side boundary does not lead to a unique estimation of heads along the same boundary (FIG. 1(b), between distance 2-4), due to an abrupt change in streamlines which significantly changes the flow direction and the interconnected fluxes, while maintaining the same $Q_x$. In addition, significant change in the flow field occurs in the vicinity of the observed heads, where one would normally expect the highest accuracy in head predictions.

New Direct Method

In this embodiment, the system is configured with a novel direct method to provide the best fit to the observed data with stable convergence, without the need for iterations. It is not based on solving a BVP, thus a priori knowledge of the BCs is not necessary. Nor does it attempt to fit BCs to observations, obviating the non-uniqueness issue.

Background

This novel direct method is derived ultimately from the Trefftz method, which superimposes functions that satisfy the governing equations a-priori, where the unknown coefficients are determined by minimizing these functions. A similar concept is the Method of Fundamental Solution [Kupradze & Aleksidze, 1964], which is mathematically equivalent to the Trefftz method as the number of coefficients of the individual superimposed functions increases to infinity [Li et al., 2010]. Application of the Trefftz method was initially focused on inverse problems, before the current focus on BVP, with both finite element formulations [Jirousek & Zielinski, 1995; Kita & Kamiya, 1995; Herrera, 2000; Li et al., 2008; Kolodziej & Zielinski, 2009] and meshless method [Galybin & Mukhamediev, 2004].

The new direct method extends from the meshless method of Galybin & Mukhamediev [2004], where a discretized approach is adopted to eliminate instabilities characterizing the former method. It thus combines the strengths of the discretization-based approaches and the Trefftz method. Within a problem domain, the new method seeks a solution via a set of specialized collocation points which lie on element interfaces. The technique was initially developed for two-dimensional geophysical problems using the complex variable theory, e.g., determination of stresses in the lithospheric plate from observations on the principal stress directions [Irsa & Galybin, 2010]. It was later extended to multiple plates and their interactions to identify stress change in the Earth's crust after an earthquake [Irsa & Galybin, 2011b]. A modification of this method led to the determination of heat fluxes from discrete temperature measurements [Irsa & Galybin, 2009] and fluid velocity from its trajectories [Irsa & Galybin, 2011a]. A three-dimensional version was developed for heat flux reconstruction as well as for determining deformations from discrete dilation data [Galybin & Irsa, 2010]. In many such systems, given the nature of the data and their errors, conventional indirect methods often fail to converge. The new method is applicable to any problems described by the potential theory as long as a fundamental solution exits, i.e., a solution can be found that satisfies the governing equations a priori.

Fundamental Solution

The equations describing 2D steady-state groundwater flow without source/sink are:

$$\nabla \cdot (q) = 0$$

$$q = -K(x,y)\nabla h \quad (6)$$

where $\nabla$ is gradient operator, h is hydraulic head, and q is Darcy flux. The problem domain can be discretized into elements (or grid cells) where the hydraulic head satisfies the fundamental solution of eqn.(6). In the case of a homogenous and isotropic aquifer, this solution is a harmonic function in each element. For simplicity, we use the complex valued holomorphic function W(z), whose real part is harmonic, and thus is the fundamental solution of this problem. Here, W(z) is specified as a $2^{nd}$ order polynomial:

$$W(z) = \sum_{n=0}^{2} a_n z^n, \quad (7)$$

where $z=x+iy$ and $a_n \varepsilon C$. Head and flux of the k-th element can then be approximated:

$$\tilde{h}^{(k)}(x,y) = a_{00}^{(k)} + a_{10}^{(k)} x - a_{11}^{(k)} y + a_{20}^{(k)}(x^2-y^2) - 2a_{21}^{(k)} xy$$

$$\tilde{q}_x^{(k)}(x,y) = -K(a_{10}^{(k)} + 2a_{20}^{(k)} x - 2a_{21}^{(k)} y)$$

$$\tilde{q}_y^{(k)}(x,y) = -K(a_{11}^{(k)} - 2a_{20}^{(k)} y - 2a_{21}^{(k)} x), \quad (8a, b, c)$$

where $a_0^{(k)} = a_{00}^{(k)}$; $a_1^{(k)} = a_{10}^{(k)} + ia_{11}^{(k)}$; $a_2^{(k)} = a_{20}^{(k)} + ia_{21}^{(k)}$. For each element, 5 real-valued unknowns need to be determined. Though the complex variable theory allows for easy adaptation of the fundamental solution to higher orders, it was found that a linear or quadratic approximation is often satisfactory [Galybin & Irsa, 2010]. The use of higher order approximations within elements is permissible, which can lead to coarsened meshes. To simplify our analysis, we restrict ourselves here to the quadratic approximation with numerical convergence tests.

Continuity

Figure 2:
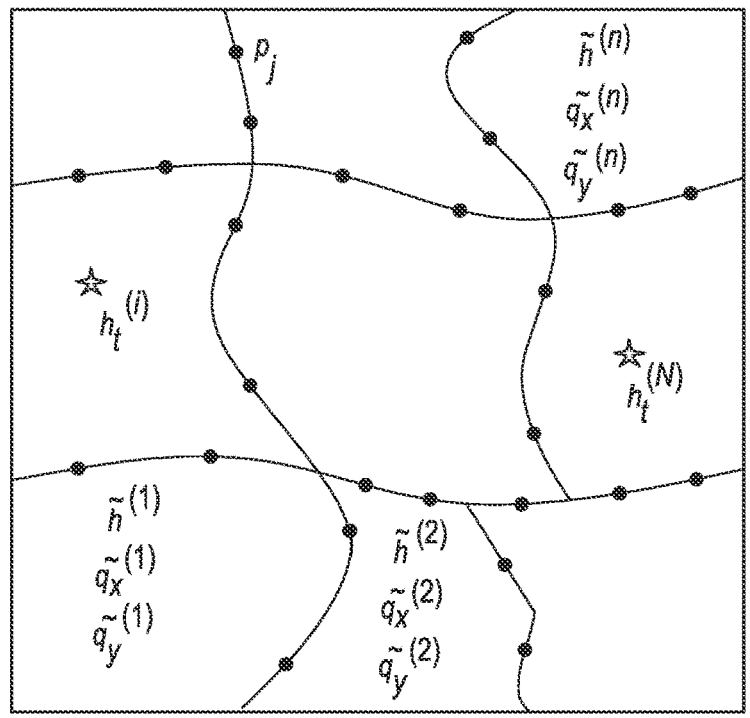
FIG. 2 illustrates a domain discretization with n elements and a set of collocation points (solid circles). The approximating functions are shown in each element. Stars are the head measurement locations (t=1, . . . , N).

FIG. 2 illustrates a domain discretization with n elements and a set of collocation points (solid circles). The approximating functions are shown in each element. Stars are the head measurement locations (t=1, . . . , N).

Referring to FIG. 2, having the fundamental solutions described for each element (eqn. (8)), the solution must also satisfy the governing equation globally. This is accomplished by minimizing a residual function on a set of collocation points $p_j$ which lie on the boundary between adjacent elements (FIG. 2). This minimization forces the residuals to vanish at each point:

$$\int R(\Gamma_j)\delta(p_j-\varepsilon)d\Gamma_j = 0, j=1, \ldots, m_c, \quad (9)$$

where $m_c$ is the total number of element boundaries. $R(\Gamma_j)$ is the residual of an approximating function at the j-th boundary. $\delta(p_j-\varepsilon)$ is the Dirac delta weighting function. In general, continuity along element boundaries is without errors, thus $\lim_{\varepsilon \to 0}\delta(p_j-\varepsilon)=1$. However, the new direct method solves an over-determined problem, thus the weighting function on the element boundaries can be reduced to $\delta(p_j-\varepsilon)<1$, reflecting equal weighting of the observations and continuity at the collocation points. This results in a same well-posed system matrix, leading to faster convergence during its solution. Eqn. (9) gives an average residual across an element boundary, which is replaced in the discrete case by summation of the residuals at the collocation points (2 shown here). The residual $R(\Gamma_j)$ is then replaced by the residual $R(p_j)$ at the collocation point. At data locations, eqn. (9) is also formulated, where $\delta(p_j-\varepsilon)$ represents the measurement error and $R(\Gamma_j)$ is replaced with residuals at the data points $R(t_j)$, where $t_j$ is the j-th data point. The formulation of the data residuals is the same if the observation data lie on the Dirichlet, Neumann, or mixed boundaries.

In this embodiment, eqn. (9) is used in analyzing homogenous and heterogeneous aquifers. However, the hydraulic head approximation function (eqn. (8a)) is modified for the heterogeneous aquifers.

In this embodiment, the study estimates 2D steady-state hydrogeological model parameters, model state variables, and the unknown model BCs for (i) a homogenous aquifer, (ii) single (equivalent) K determination for a randomly heterogeneous aquifer, and (iii) heterogeneous aquifer where prior information on K is available. In the last case, prior information is in the form of hydrofacies zonation and K relationships between adjacent hydrofacies zones. Individual measurement errors are specified on the observed data with a weighting scheme reflecting the assumed magnitude of the errors.

Homogeneous Isotropic Aquifer

Conductivity is a scalar constant throughout the solution domain. Three residuals are evaluated: hydraulic head, Darcy flux x component, and Darcy flux y component. To enforce continuity across element boundaries, the head residual can be written at each element boundary as:

$$\delta(p_j-\varepsilon)R_h(p_j)=\delta(p_j-\varepsilon(K_h^{(k)}(x_j,y_j)-K_h^{(l)}(x_j,y_j))= \\ 0, j=1,\ldots,m \quad (10)$$

where k and l are elements adjacent to $p_j$, and m is the number of collocation points on each boundary (here m=2). The residual is multiplied by K in order to extract the conductivity value from the solution.

For the flux residuals, continuity is also enforced:

$$\delta(p_j-\varepsilon)R_{qx}(p_j)=\delta(p_j-\varepsilon)(\tilde{q}_x^{(k)}(x_j,y_j)-\tilde{q}_x^{(l)}(x_j,y_j))= \\ 0, j=1,\ldots,m$$

$$\delta(p_j-\varepsilon)R_{qy}(p_j)=\delta(p_j-\varepsilon)(\tilde{q}_y^{(k)}(x_j,y_j)-\tilde{q}_y^{(l)}(x_j,y_j))=0 \quad (11\,a,b)$$

Thus at each collocation point $p_j$, 3 equations enforce the condition of continuity. By writing eqns. (10) and (11) at all collocation points, we obtain a system of linear algebraic equations. A domain of n elements will yield 5n unknowns: $\{Ka_{00}^{(1)}, Ka_{10}^{(1)}, Ka_{11}^{(1)}, Ka_{20}^{(1)}, Ka_{21}^{(1)}, \ldots, Ka_{00}^{(n)}, Ka_{10}^{(n)}, Ka_{11}^{(n)}, Ka_{20}^{(n)}, Ka_{21}^{(n)}\}$.

After enforcing continuity at every collocation point, the approximation needs to further honor the observed heads. For element k where the t-th observed head lies, we have: $h_t(x_t,y_t)=\tilde{h}^{(k)}(x_t,y_t)$. Multiplying by K:

$$Kh_t(x_t,y_t)=K\tilde{h}^{(k)}(x_t,y_t) \quad (12)$$

where $(x_t,y_t)$ is coordinate of the observed head $h_t(x_t,y_t)$. However, $h_t(x_t, y_t)$ contains measurement errors, thus head residual for element k is weighted by the inverse of the error variance $\delta(p_t-\varepsilon)$ for observation t:

$$\delta(p_t-\varepsilon)(K\tilde{h}^{(k)}(x_t,y_t)-Kh_t(x_t,y_t))=0, t=1,\ldots,N, \quad (13)$$

where N is the number of head measurements. The right-hand-sides of eqn. (10), (11) and (13) are zeros, thus the solution of the above system is trivial. To estimate K uniquely, at least one flow rate measurement is needed. Equations relating to the flow rates are introduced below, where the right-hand-sides present the weighted flow rate measurements and the left-hand-sides describe the integration of groundwater fluxes along arbitrary contours where flow rates are measured. For example, along a vertical line parallel to the y axis (crossing elements e to f), flow rate can be approximated as:

$$\tilde{Q}_y(x,y) = \sum_{k=e}^{f}\left[\int_0^{dy^{(k)}} \tilde{q}_y^{(k)} dy\right] = \sum_{k=e}^{f}\left[-Ka_{11}^{(k)}dy^{(k)} + Ka_{20}^{(k)}dy^{(k)2} + 2Ka_{21}^{(k)}xdy^{(k)}\right], \quad (14)$$

where x is fixed and $dy^{(k)}$ is length of the k-th element along elements e to f. The flow rate is satisfied analytically and there is no need for collocation points on this line. To further account for flow rate measurement error, the residual equation (eqn. (9)) for the flow rate takes this form at each flow rate measurement location:

$$\delta(p-\varepsilon)(\tilde{Q}_y(x,y)=\delta(p-\varepsilon)Q_y \quad (15)$$

The addition of eqn. (15) yields a non-trivial solution, leading to unique estimation of K. The final equation system consists of eqn. (10), (11), (13) and (15):

$$Ax=b. \quad (16)$$

where A is a sparse matrix (r×s): three diagonals populating most of the system representing continuities, and sporadically populated entries representing observations. r is number of equations, including $3m_cm$ continuity equations, N observed head equations, and g flow rate equation ($r=3m_cm+N+g$). s is number of unknowns (s=5n+1) ... x is the solution vector of size s, $x\varepsilon\{Ka_{00}^{(1)}, Ka_{10}^{(1)}, Ka_{11}^{(1)}, Ka_{20}^{(1)}, Ka_{21}^{(1)}, \ldots, Ka_{00}^{(n)}, Ka_{10}^{(n)}, Ka_{11}^{(n)}, Ka_{20}^{(n)}, Ka_{21}^{(n)}\}$. b is of size r, consisting of all zeros except the g non-zero flow rates. For a detailed formation of the matrix, see Appendix in Irsa & Galyin [2010]. The system is over-determined, thus we are solving a least-squares solution, where the approximating functions with unknown coefficients are minimized to the observations with the assigned weights. Because A is generally not ill-posed, it can be solved directly:

$$x=inv(A^T A)A^T b \quad (17)$$

Should the system be large, an iterative algorithm is preferred, e.g., LSQR algorithm [Paige & Saunders, 1982]. After solving for K and the coefficients $\alpha^{(k)}$, head and flux functions in each element are obtained from eqn. (8). In this study, we use a single flow rate measurement (g=1) which is found sufficient for uniquely identifying K.

Heterogeneous Isotropic Aquifer

Figure 3:
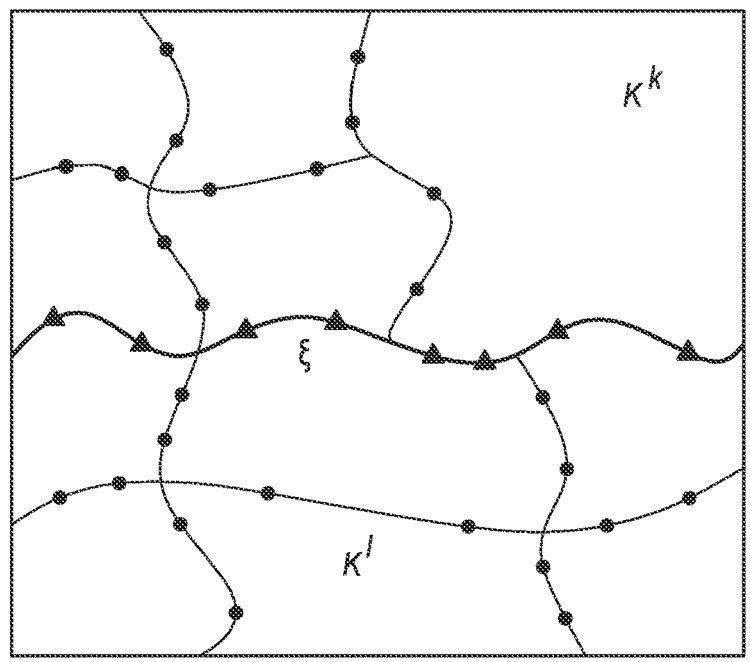
FIG. 3 illustrate schematics of a domain with two hydrofacies separated by interface $\xi$. Domain is discretized with n elements and a set of collocation points (solid circles at element boundaries internal to a hydrofacies; triangles at the interface).

To solve the heterogeneous isotropic aquifer (FIG. 3), the previous method is modified where hydrofacies geometry and prior information on conductivity are needed:

$$K^{(g)}=n_g K^{(g+1)}, g=1, \ldots, M-1, \quad (18)$$

where M is number of hydrofacies and $n_g$ is a known constant describing the relation between K-values of adjacent facies.

The heterogeneous aquifer is evaluated using the same set of residual expressions (eqn. (9)); however, two types of continuities are enforced. For those element boundaries lying within a single hydrofacies, the residual equations remain the same, i.e., eqn. (10) and (11). At element boundaries coinciding with a hydrofacies interface, the head residual equation is multiplied by conductivity of one of the hydrofacies:

$$R_h\delta(p_j-\varepsilon)(p_j)=\delta(p_j-\varepsilon)(K^{(k)}\tilde{h}^{(k)}(x_j,y_j)-K^{(l)}\tilde{h}^{(l)}(x_j,y_j))=0, \\ j=1,\ldots,m, \quad (19)$$

where k and l are elements adjacent to $p_j$ on a hydrofacies interface ($K^{(k)}$ and $K^{(l)}$). m is number of collocation points on the interface. Knowing $n_g$, eqn. (18) is substituted into eqn. (19):

$$\delta(p_j-\varepsilon)R_h(p_j)=\delta(p_j-\varepsilon)(K^{(k)}\tilde{h}^{(k)}(x_j,y_j)-n_k K^{(l)}\tilde{h}^{(l)}(x_j,y_j))=0, j=1,\ldots,m, \quad (20)$$

At the hydrofacies interface ξ, continuity of the normal flux is then enforced. The normal flux can be expressed as: $q_n(\xi_j)=q_x(\xi_j)\cos(\alpha_j(\xi_j))+q_y(\xi_j)\sin(\alpha_j(\xi_j))$, where $\alpha_j(\xi_j)$ is angle of the normal vector to the interface with respect to x evaluated at $\xi_j$. Thus, at a collocation point $p_j$ on $\xi$, the normal flux residual equation is:

$$\delta(p_j-\varepsilon)R_{qn}(p_j)=\delta(p_j-\varepsilon)(\tilde{q}_n^{(k)}(x_j,y_j)-\tilde{q}_n^{(l)}(x_j,y_j))=0,$$
$$j=1,\ldots,m. \quad (21)$$

The residual equations for the observed heads are written similarly as in eqn. (13), with the exception that heads lying in different hydrofacies have different conductivities, thus the K is substituted according to the prior information eqn. (18):

$$\delta(p_t-\varepsilon)(K\tilde{h}^{(k)}(x_t,y_t)-Kh_t(x_t,y_t)) = \quad (22)$$
$$0 \begin{cases} (k)\in K^{(k)} \to K = K^{(k)} \\ k \notin K^{(k)} \to K = n_g K^{(k)} \end{cases}, t=1,\ldots,N.$$

Finally, the same flow rate equations, i.e., eqn. (15), are incorporated.

A system of equations is formed from (10), (11), (20)-(22) and (15). The size of A is (r×s). r is number of equations, including the continuity equations at element boundaries ($3m_b$) and interfaces ($2m_i$), the observed head equations (N), and g flow rate equations ($r=3m_b+2m_i+N+g$), where $m_b$ and $m_i$ is the total number of collocation points on element boundaries and hydrofacies interfaces, respectively. s is number of unknowns ($s=5n+1$) ... x is solution vector of size s, $x\varepsilon\{Ka_{00}^{(1)}, Ka_{10}^{(1)}, Ka_{11}^{(1)}, Ka_{20}^{(1)}, Ka_{21}^{(1)}, \ldots, Ka_{00}^{(n)}, Ka_{10}^{(n)}, Ka_{11}^{(n)}, Ka_{20}^{(n)}, Ka_{21}^{(n)}, K^{(1)}\}$. Only one hydrofacies K is solved; conductivities of the other hydrofacies are obtained from eqn. (18). b is of size r, consisting of all zeros except non-zero flow rates. The system is solved with eqn. (17).

Simulation Examples

Four simulation cases are designed to test the direct method and the proposed algorithms. The observed data are obtained from solving an appropriate BVP using the finite difference method (FDM) and Gaussian Elimination.

Figure 4:
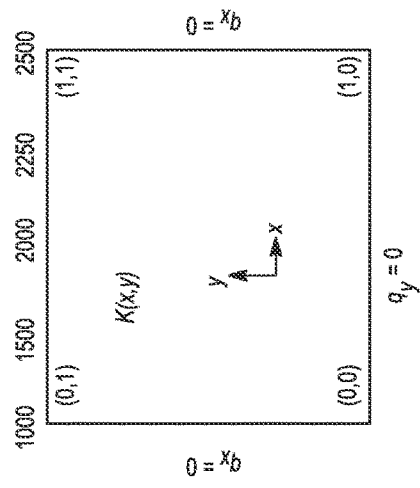
FIG. 4 illustrates a 2D flow model used by most of the test examples: no flow on the left, right, and bottom boundaries, and heads specified on the top boundary (linearly interpolated between the values). To provide the observation data, the domain is discretized into 20×20 FDM block cells.

FIG. 4 illustrates a 2D flow model used by most of the test examples: no flow on the left, right, and bottom boundaries, and heads specified on the top boundary (linearly interpolated between the values). To provide the observation data, the domain is discretized into 20×20 FDM block cells.

Referring to FIG. 4, the first three simulation cases use a problem configuration are shown. The associated FDM solves the flow equation on a rectangular grid with 20×20 cells. Random errors are imposed on the observed heads, $$h_j = h_j^{FDM}\left(1+\frac{\varepsilon}{100}\mu\right), j=1,\ldots,N;$$

where $\varepsilon$ is percent measurement error and $\mu\varepsilon(-1,1)$, drawn from a truncated Gaussian distribution by taking $$f(x) = ae^{-\frac{(x-b)^2}{2c^2}}$$

with parameters a=1, b=0, c=1/e, and cutout values $(-\infty,-1]\cup[1,\infty)$. The one flow rate measurement is assumed error-free in this study for all test cases. The test cases are: a. homogeneous isotropic aquifer; determination of a single K; b. randomly heterogeneous isotropic aquifer; determination of an equivalent K; c. heterogeneous isotropic aquifer; determination of hydrofacies K values; d. hypothetical example with irregular aquifer geometry. Results of each case are reconstructed fields of hydraulic head, fluxes, streamlines, and the estimated conductivity values. A percent relative error in the reconstructed head is defined as:

$$\varepsilon(\%) = \frac{(h_{FDM}-h_{rec})}{h_{FDM}} \times 100,$$

where $h_{FDM}$ are noise-free (true) nodal heads computed for the BVP and $h_{rec}$ is the recovered head (eqn. (8)) at the same location. Average and maximum relative errors are also computed, e.g., $$\bar{\varepsilon}(\%) = \Sigma\left|\frac{(h_{FDM}-h_{rec})}{h_{FDM}} \times 100\right|.$$

In this study, error in the prior model is not considered, though error-based weighting on the prior information equation can be considered in the future. In the following test cases, dimensions for all relevant quantities implicitly assume a consistent set of units (K in m/day m/day, q in m/day, Q in m²/day), thus the units are not labeled.

Homogeneous Isotropic Aquifer (25+1 Observations without Errors)

Figure 5B:
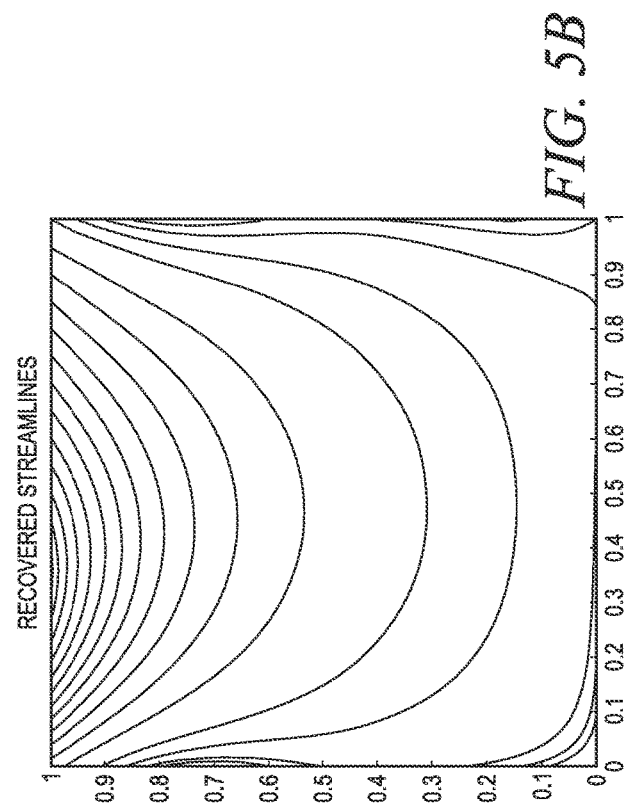
FIGS. 5A-5C illustrate streamlines from the FDM and the direct method (25+1 observed data 30×30 elements and reconstructed head BCs shown for 10×10 (dashed line) and 30×30 (dotted line) elements grid. "True BC" is that used by the FDM.
Figure 5A:
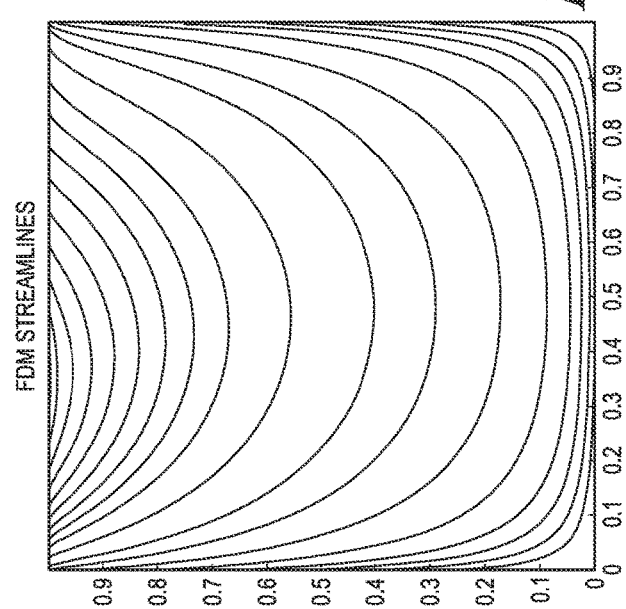
Figure 5C:
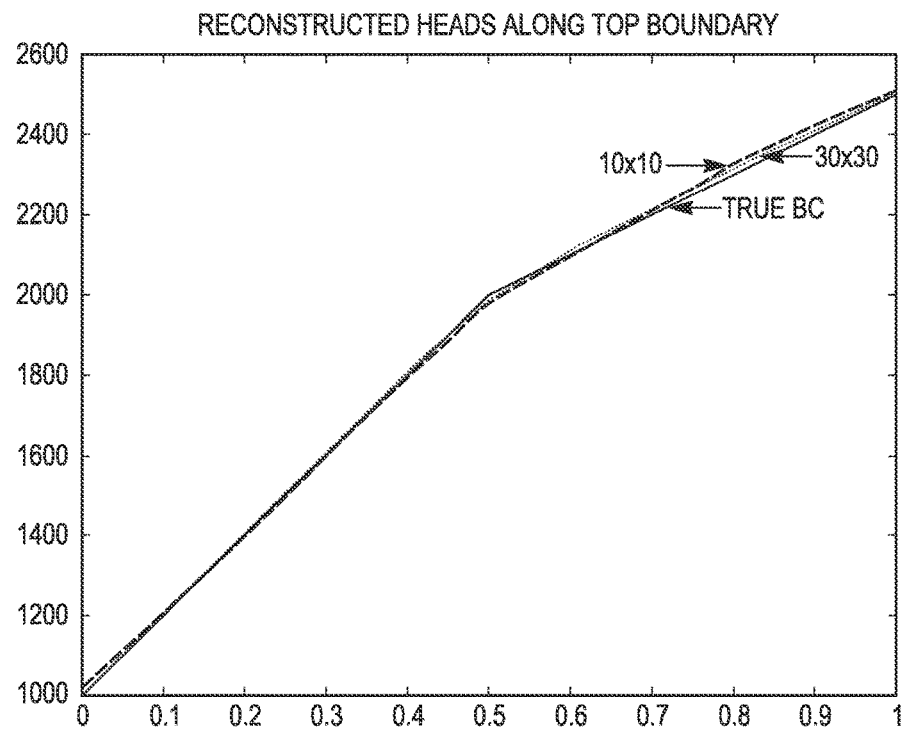

In this example, true K(x, y)=1. Heads are observed at 25 points on a dense 5×5 network distributed uniformly in the problem domain. The flow rate ($Q_y$) is along the right boundary. The direct method uses a coarse grid with 10×10 square elements, 4 times coarsening compared to the FDM approximation. Conductivity computed from the direct method is K=0.78, with $|\varepsilon_{max}|$=2% and $\bar{\varepsilon}$=0.38%. The grid resolution is then increased to 30×30 square elements, yielding K=0.91 and $\bar{\varepsilon}$=0.2%. In both cases, the direct matrix is well conditioned, leading to a stable inversion of the K. In the 30×30 case, streamlines are computed from the reconstructed flow field (FIG. 5b), which can be used to infer the no-flow condition along the model sides and bottom. Along the model top, the reconstructed head function yields the specified BC with excellent accuracy (FIG. 5c.).

15+1 Observations without Errors

Figure 6:
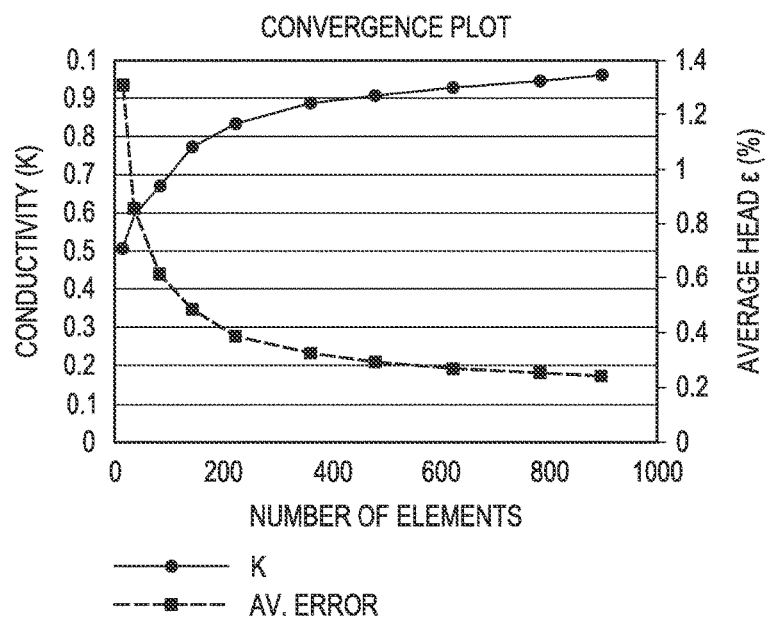
FIG. 6 illustrates convergence of K and $\bar{\varepsilon}$ with increased level of discretization, based on 15+1 observations. True conductivity is K=1.

This example tests the direct method when there are fewer observed data. Heads are measured at locations x=0.05, 0.47, 0.9, with 5 observation points placed uniformly along each profile. Flow rate $Q_y$ is measured along the right boundary. With a 10×10 discretization, we find: K=0.75, $\bar{\varepsilon}$=0.54%, $|\varepsilon_{max}|$=5.6%. The discretization is then refined (FIG. 6). Conductivity converges toward the correct value asymptotically (FIG. 6), e.g., K=0.5 for a 2×2 grid. K=0.96 for a 30×30 grid. The average head error ($\bar{\varepsilon}$) also diminishes with grid refinement.

15+1 Observations with Data Errors

The previous example is repeated but the observed data are subject to measurement errors which are created with a Gaussian random number generator. According to Hill and Tiedeman [2007], errors assigned to one kind of observation data may have equal variance, thus it is common to set the observed head weights to 1. In this example, a standard deviation (std) is set at 9.5 to model the head error (absolute measurement error ~±1% of the total head variation). A 10×10 grid results in K=0.73, $\bar{\varepsilon}$=0.76%, and $|\varepsilon_{max}|$=7.3%.

For a 30×30 grid, given the same measurement errors, K=0.98, and the reconstructed head errors are accordingly smaller.

To test the stability of the method, higher head errors are then imposed: std=102 (absolute measurement error ~±10% of the total head variation). For the given boundary conditions of the test problem, the FDM simulated heads in the bottom half of the domain vary between 1800-1930 ($\Delta h$=130), while locally, head measurement errors can reach up to ±200. Using the direct method the reconstructed streamlines in this region change directions (up to 180°), creating vortexes and singularities. Such a situation would not normally be solvable with many inverse methods, but the direct method still gave a stable inverted K of 0.24 (10×10 grid), less than one order of deviation from the true K.

Equivalent K

A heterogeneous aquifer can be represented by an equivalent homogenous medium. A well-known analytic solution for layered (equal-thickness) hydrofacies gives an equivalent K as harmonic mean for flow perpendicular to layering and arithmetic mean for flow parallel to layering. Although we do not provide a rigorous proof, the following examples demonstrate that the direct method herein leads to the estimation of an equivalent K.

Random ln(K) Map

FIG. 4 illustrates a 2D flow model used by most of the test examples: no flow on the left, right, and bottom boundaries, and heads specified on the top boundary (linearly interpolated between the values). To provide the observation data, the domain is discretized into 20×20 FDM block cells.

Referring to FIG. 4, a Gaussian distribution of ln(K) without spatial correlation, the equivalent K is the arithmetic mean. A 10×10 ln(K) field is created, each K is represented by 4 cells in a 20×20 FDM grid. The same BCs are used to drive the flow (FIG. 4). Observation errors are assumed zero. A Gaussian ln(K) field is generated with a mean of 1 and a std of 0.1 (arithmetic mean and std of K are 2.7 and 0.3, respectively). First, dense data are used, i.e., 25 observed heads and one flow rate. With a 10×10 grid, the estimated K=2.0; with a 30×30 grid, K=2.4, approaching the arithmetic mean (2.7). Then, fewer data are used, i.e., 15 heads and one flow rate, which yields: K=2.0 (10×10 grid) and 2.6 (30×30 grid). Clearly, this particular estimation is insensitive to the amount of the observed data.

The Gaussian ln(K) field is then scaled to a higher variance (mean K=3.2 and std=1.0), while such errors are extreme, the method still estimates a reasonable value: K=1.9 (10×10 grid) and K=2.2 (30×30 grid). The convergence to the mean value is slower compared to when ln(K) variance is low. This behavior is similar to that observed for the homogeneous isotropic case with nonzero observed head errors. In a certain sense, ln(K) variance may be viewed as a source of error for the observed heads. Note, that in the FDM solution itself, discretization error, interblock conductivity weighting scheme, and the solution method also introduce errors to the FDM and thus also to the direct method. While refinement in FDM and better solution technique may lead to more accurate results and thus better estimation of K in the direct method, this topic is not investigated in this study.

Flow Parallel to Stratification

Figure 7A:
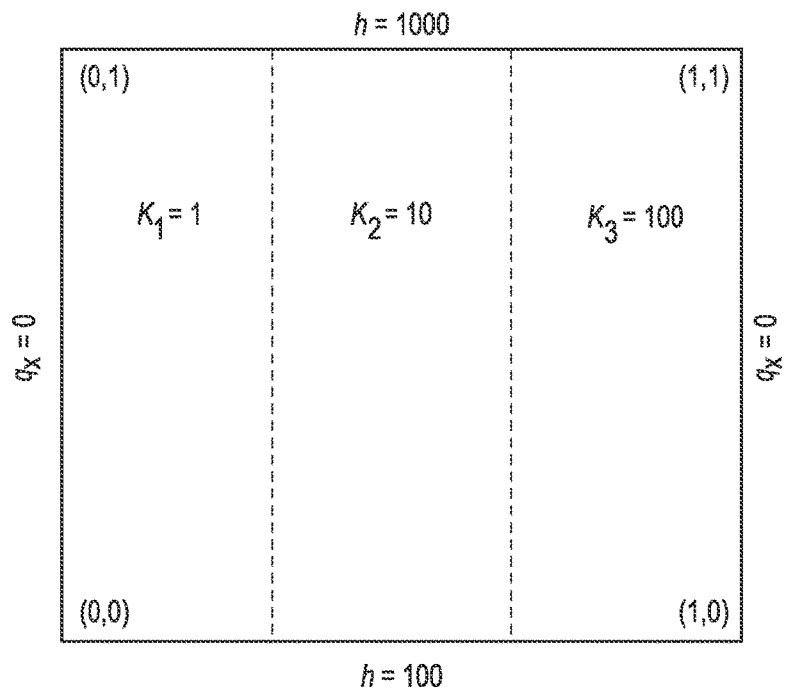
FIGS. 7A-7B illustrate hydrofacies zones, (a) parallel stratification, and (b) perpendicular stratification. The true K values for the zones are shown.

When flow is parallel to hydrofacies stratification and zones are of equal thickness, the equivalent K is the arithmetic mean (FIG. 7a). In this problem a uniform flow is driven by constant heads (1000 at the top and 100 at the bottom), while the sides are no-flow. For this BCs and 3 known K values ($K_1$=1, $K_2$=10 and $K_3$=100; arithmetic mean is 37.0), 18 heads are sampled from the FDM solution at: x=0.05, 0.47, 0.9 (6 observations uniformly placed across each profile). A flow rate $Q_y$ is sampled along a horizontal line at y=0.5 crossing all zones. Random error is added to all observed heads with std=13 (measurement error up to ±3% of the total head variation). For this problem with linear heads, results converge immediately to K=39.6 for a grid as small as 2×2. The method is also stable at larger errors, such as std=40 (error up to ±10%). In this case, K obtained with a 30×30 grid is 34.0.

Flow Perpendicular to Stratification

Figure 7B:
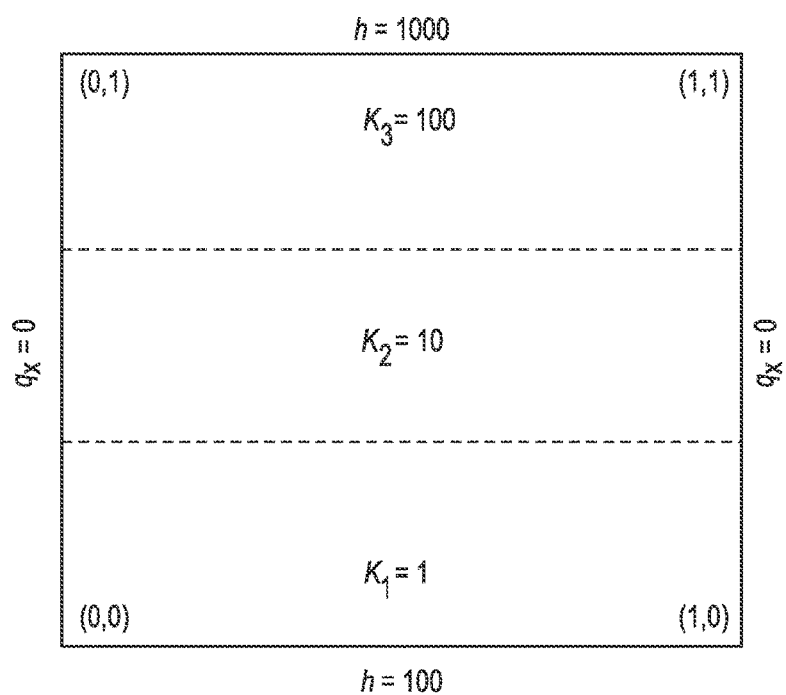

When flow is perpendicular to stratification and zones are of equal thickness (FIG. 7b), the equivalent K is the harmonic mean. The same BCs as in the previous example are used. The same 18 heads are sampled from the FDM solution. A flow rate $Q_x$ is sampled at x=0.5, crossing all zones. The equivalent K of this model is the harmonic mean $$\frac{3}{\sum_{j=1}^{m}\frac{1}{K_{(j)}}} = 2.7.$$

Compared to the previous example, convergence of the direct method is slower, slower, which is likely due to the more complex head profile. Given the same random error (std=13 or 3% of the total variation), we find K=1.6 (10_10) and 1.8 (30_30). When the error is increased (std=40 or _10% error), K=1.6 (10_10) and 1.77 (30_30). Although the errors are higher, the method is stable and the estimated K values appear to approach the harmonic mean with grid refinement.

In the above cases, the domain is represented by a single K. To satisfy the governing equation and continuity of the head and flux across the problem domain, the set of equations formulated by the direct method naturally leads to an equivalent K value. The examples are of simple configuration where equivalent K can be obtained analytically, and we anticipate that the results should be applicable to more general settings. Since all these cases do not involve pumping tests, the direct method may serve as a fast and robust tool for evaluating formation equivalent conductivity without aquifer stimulation.

Heterogeneous Isotropic Aquifer

The algorithm of Sec. 4.2 is tested by examining 2 unit square models, each with 2 hydrofacies (FIG. 8). Prior information with respect to K is specified by eqn. (18). The same BCs as in FIG. 4 is used.

Figure 8A:
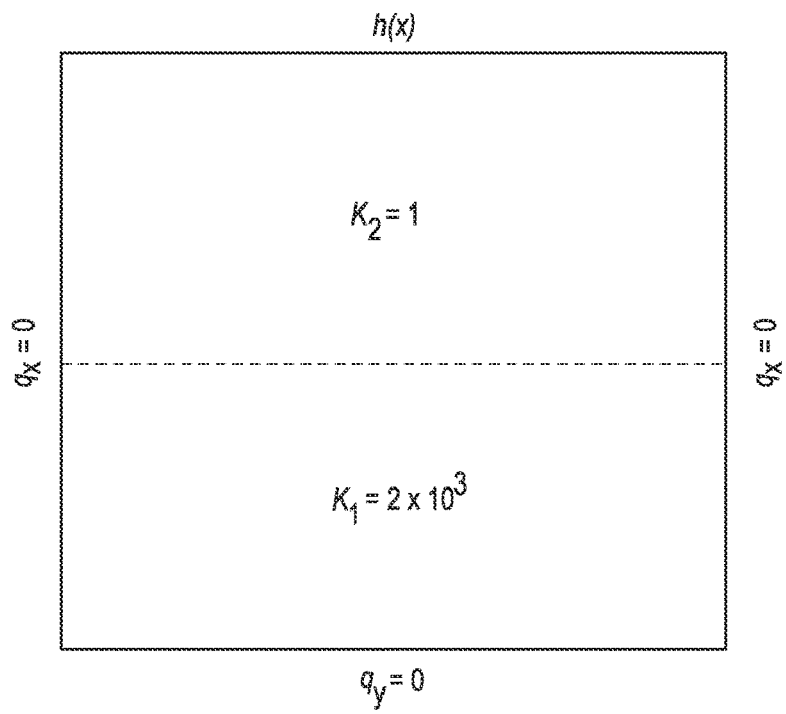
FIGS. 8A-8B illustrate a unit square domain with (a) 2 vertical zones, (b) 2 horizontal zones. In both models, BC is described by FIG. 4.

The horizontal-zoned model is tested with 15 observations of heads (x=0.05, 0.47, 0.9 with 5 heads uniformly placed across each profile) and one flow rate $Q_y$ at x=1 (FIG. 8(a)). The observation data are sampled from a FDM solution with $K_1$=2×10³ and $K_2$=1. Errors are randomly sampled with a std=9.8 (head error ~±1% of total head variation). Prior information gives $n_g$=2000. A 10×10 grid results in $K_1$=1.51×10³ and $K_2$=0.75 with $\bar{\varepsilon}$=0.34% and $|\varepsilon_{max}|$=5.4%. In a 30×30 grid, $K_1$=1.86×10³ and $K_2$=0.93 with E=0.14% and $|\varepsilon_{max}|$=4%.

Figure 8B:
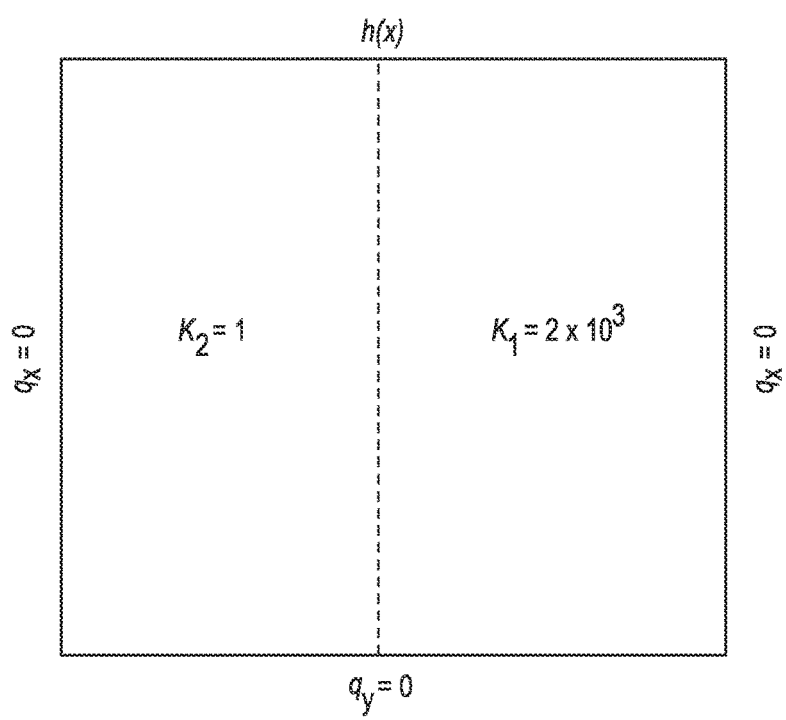

The vertical-zoned model is tested with 24 head observations (x=0.05, 0.36, 0.68, 0.9) and one flow rate $Q_y$ at x=1 (FIG. 8(b)). The true conductivities are $K_1$=2×10³ and $K_2$=1. Observations errors are the same as in the previous example. The same prior model is used, yielding $K_1$=1.66×10³ and $K_2$=0.83 (10×10), and $K_1$=2.2×10³ and $K_2$=1.1 (30×30). In both of these zoned models, the correct BCs are recovered; the accuracy in its reconstruction increases with increasing number of elements.

A Hypothetical Example with Irregular Aquifer Geometry

Figure 9B:
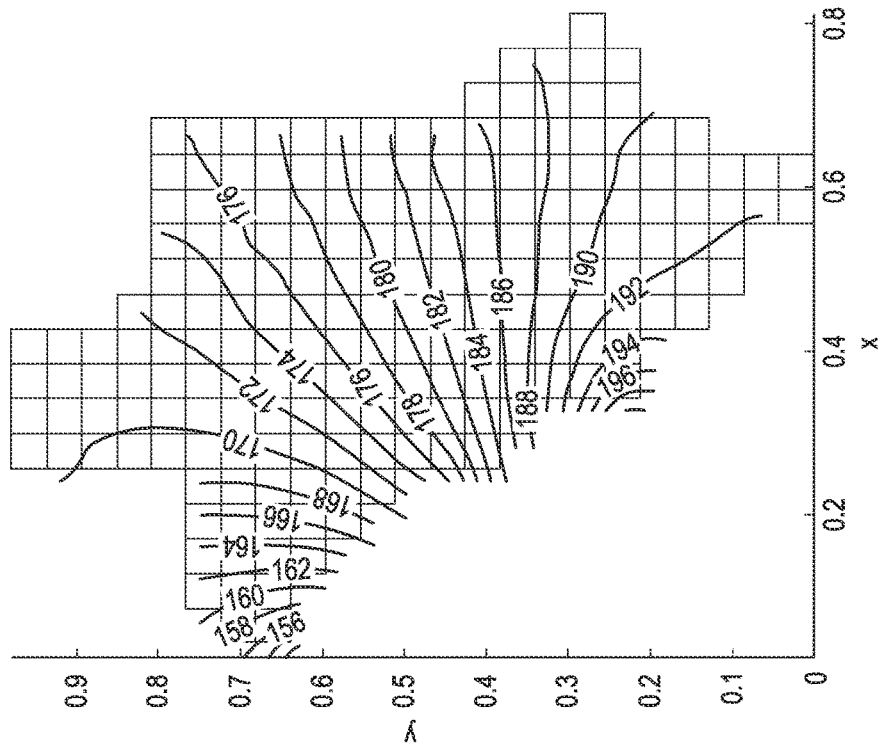
FIGS. 9A-9B illustrate (a) A hypothetical model with 4 hydrofacies zones, (b) FDM solution of the hydraulic head for the given conductivities and boundary conditions of (a).
Figure 9A:
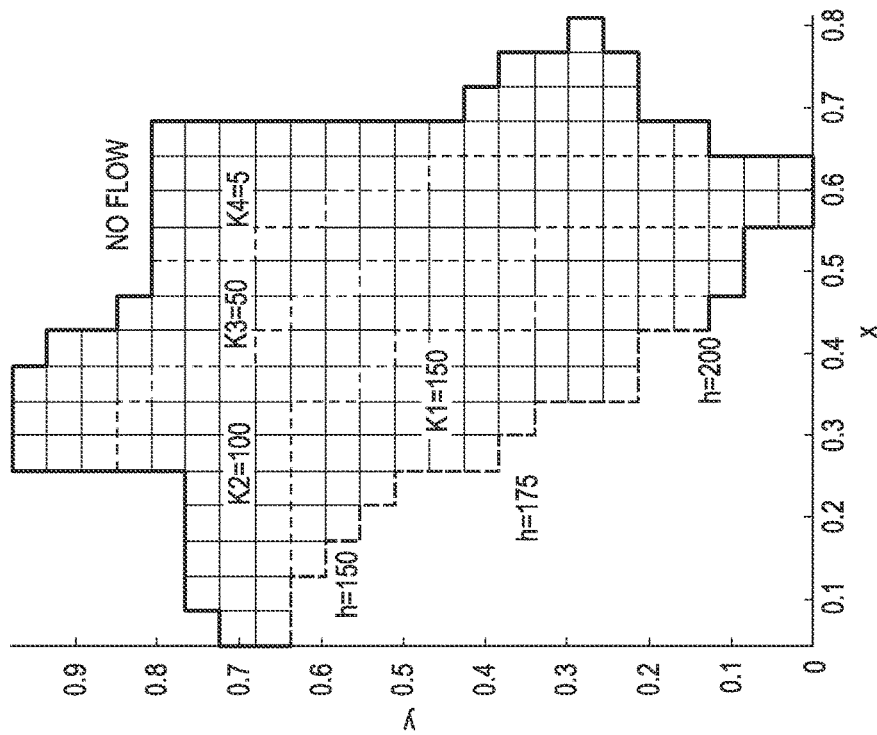
Figure 10B:
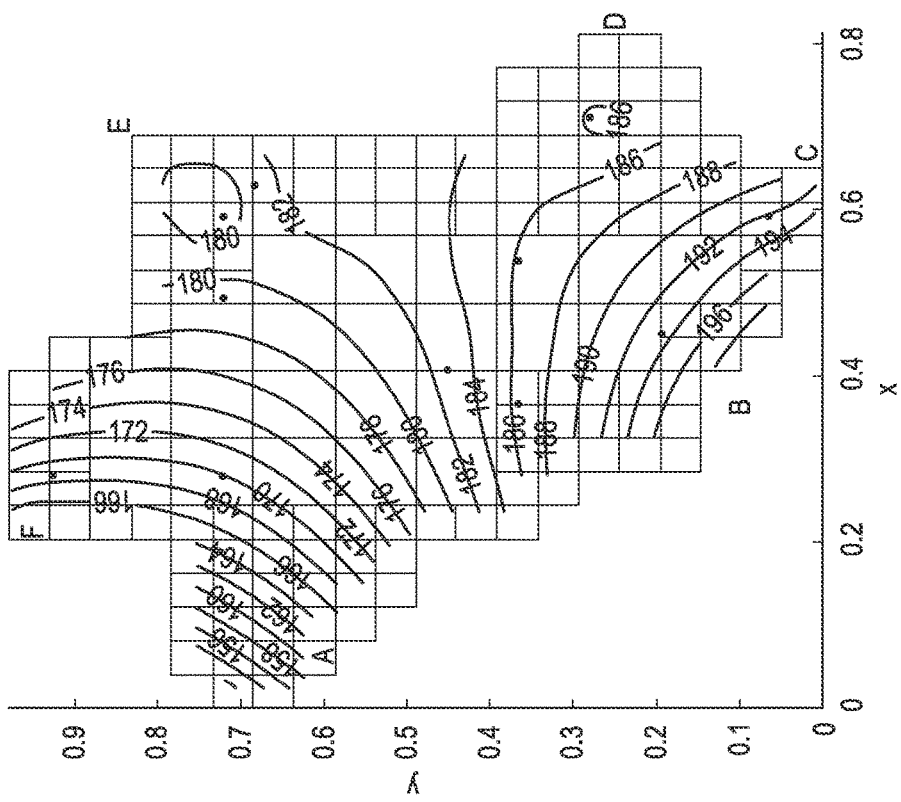
FIGS. 10A-10B illustrate reconstructed hydraulic heads given (a) 40, (b) 12 head observations. Locations of head data are shown by dots. A 0.5% error is imposed on each observed head, corresponding to head variation of 1. Both models use the same single flow rate measurement.
Figure 10A:
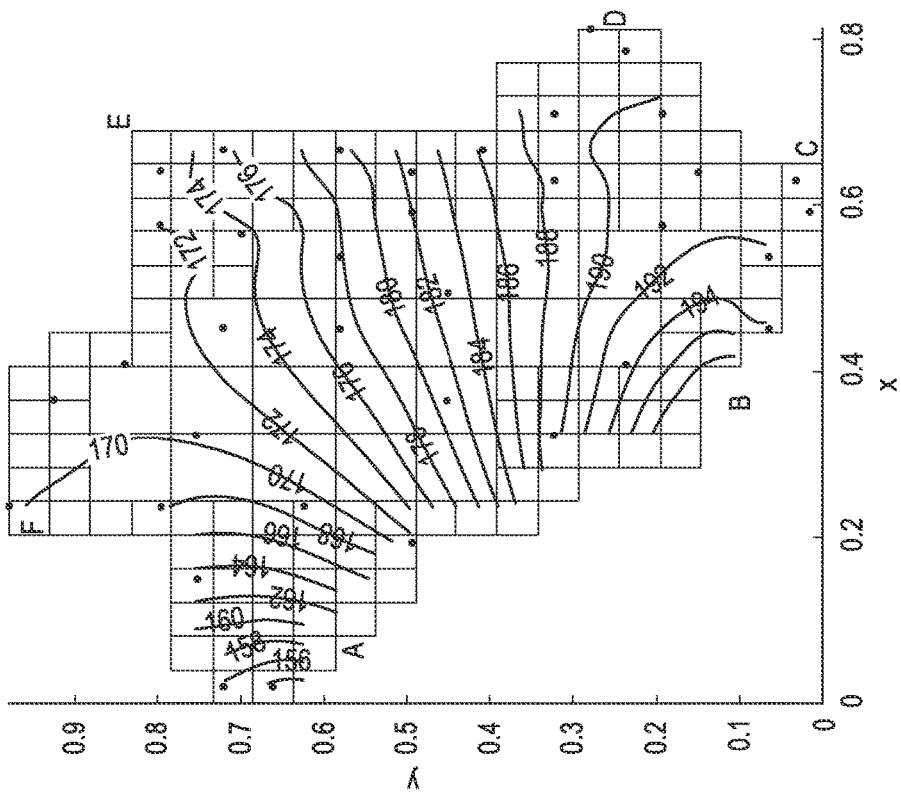
Figure 11:
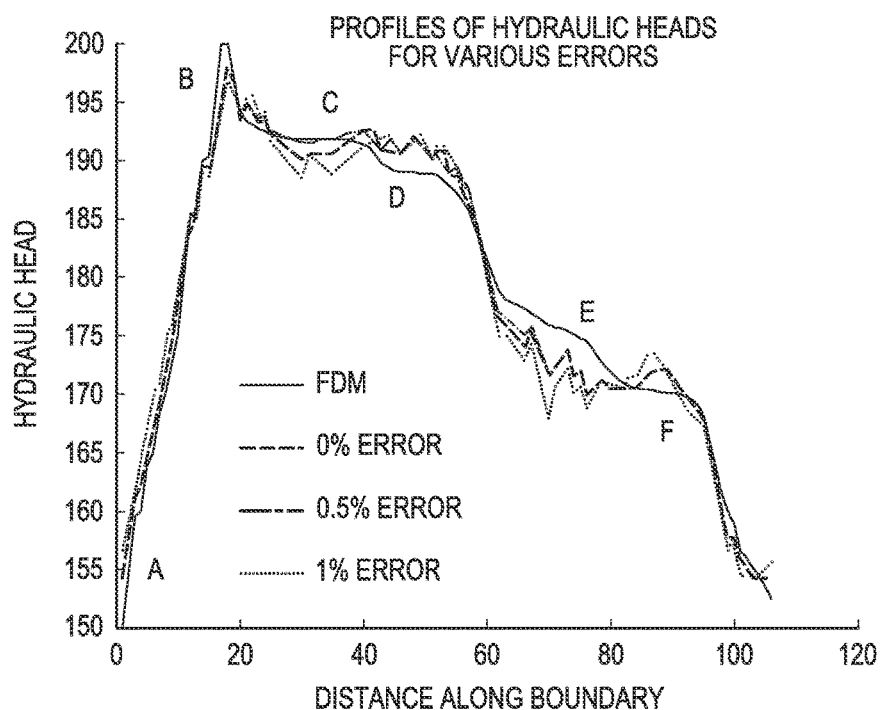
FIG. 11 illustrates reconstructed heads along the model boundary (A→F; see FIGS. 10A-10B) for the case with 40 observed heads (head locations shown in FIG. 10A).
Figure 12:
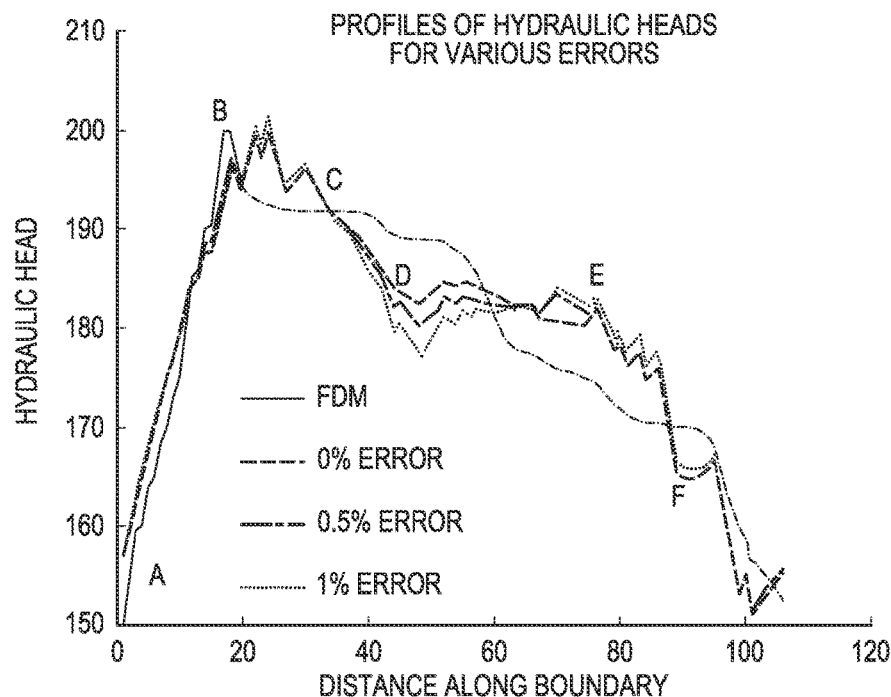
FIG. 12 illustrates reconstructed heads along the model boundary (A→F; see FIGS. 10A-10B) for the case with 12 observed heads (head locations shown in FIG. 10B).

A hypothetical example with irregular aquifer geometry containing 4 zones is analyzed (FIG. 9a), which is a modification of an example from Heidari & Ranjithan [1998]. The model consists of a no flow boundary (solid line) and a specified head boundary (dashed line; specified heads shown). Four zones are shown with $K_1=150$, $K_2=100$, $K_3=50$ and $K_4=5$. For the given BC, the FDM solution is shown in FIG. 9b. To estimate the conductivities and BCs with the direct method, 6 cases are analyzed: the first three utilize 40 observations of hydraulic head and one flow rate, with data error of 0%, 0.5% and 1% (i.e, observed and true heads deviate by 0, ~1 and ~2); the other three utilize 12 observations of hydraulic head and one flow rate with the same increasing data errors. For the error of 0.5%, the reconstruction results given dense versus sparse observation data are shown in FIG. 10. Overall, the heads are reconstructed reasonably well, the denser observation data giving rise to greater accuracy. The worst results occur near the northeastern corner of the model (FIG. 10b), which is believed to be due to a combination of sparse data and the corner location. To evaluate how well the boundary condition is recovered, we plotted hydraulic heads along the entire model boundary for all models and at all error levels. When the data are dense, BC recovery is quite good, with a deviation generally increasing with the magnitude of the data error (FIG. 11); when the data are sparse, BC errors are greater in comparison, and also increase with the magnitude of the data error (FIG. 12). Finally, estimated hydraulic conductivities for the 6 cases are shown in Table 1. Without data error, dense and sparse observations yield very accurate K values. Given the same observation data, accuracy in K estimation degrades with increasing magnitude of the data error, as expected. Overall, K recovery is excellent.

Element Shape, Collocation Points, and Error Weighting

Since the Trefftz method is insensitive to mesh distortion [Jirousek and Zielinski, 1995], there is no special requirement in the direct method for the element shape and the aspect ratio. Unlike the FEM or FDM, the direct formulations are not based on nodes/vortexes, thus the elements do not need to meet at the nodes. Though square elements are used here, previous applications of the method in geophysical inversion yielded excellent results with other element shapes [Irsa, 2011].

For a regular 2D domain with uniform rectangular elements, the number of collocation points is $$m = \frac{ijc_1}{c_2[2ij - i - j]}.$$

$i$ is number of cells across x; $j$ is number of cells across y; $c_1$ is number of unknown coefficients in each element; $c_2$ is number of continuity equations. Here, with 5 unknowns in each element and 3 continuity equations, $m \approx 1$. Should one solve a forward BVP problem with the direct method, $m=1$ is sufficient to provide a unique solution. For the inverse problems, however, one collocation point cannot guarantee a stable solution, thus $m \geq 2$. In all the above examples, we set $m=2$ and the weighting function on the continuity equations at the collocation points are reduced to 0.5 to account for the fact that $r \approx 2s$ (coefficients defined in eqn. (16)).

TABLE 1

Conductivity estimated for different observation densities and at different levels of head measurement errors. The true conductivities used in the FDM are: $K_1 = 150$, $K_2 = 100$, $K_3 = 50$, $K_4 = 5$.

| Head measurement error | 40 observed heads | | | | 12 observed heads | | | |
|---|---|---|---|---|---|---|---|---|
| | $K_1$ | $K_2$ | $K_3$ | $K_4$ | $K_1$ | $K_2$ | $K_3$ | $K_4$ |
| 0% (0) | 150 | 100 | 50 | 5 | 150.22 | 100.14 | 50.07 | 5.01 |
| 0.5% (±1) | 153.24 | 102.16 | 51.08 | 5.11 | 159.11 | 106.07 | 53.04 | 5.30 |
| 1% (±2) | 141.10 | 94.07 | 47.03 | 4.70 | 161.91 | 107.94 | 53.97 | 5.40 |

Figure 13:
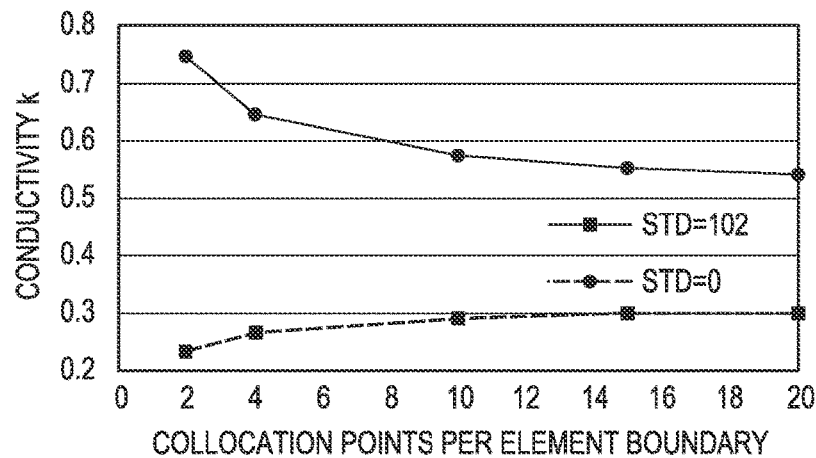
FIG. 13 illustrate estimated K vs. number of collocation points. Here, the problem presented in FIG. 4. is solved. Data are 15 heads and 1 flow rate. The true K=1.

Higher number of collocation points ($m \gg 1$), however, serves as a smoothing parameter which is only preferable if observations are known to contain extremely high errors such as in an example presented in 5.1.3., where the solution leads to a flow pattern with singularities. Higher m puts more emphasis on the smoothness/continuity of the solution; the observed data are accordingly given lower weights reflecting their high errors. Thus, increasing m is encouraged only if the observation errors are extremely high. In this case, the convergence of the direct method with grid refinement should also be tested. This can be illustrated for a given problem with a true K of 1, where the estimated K does not converge towards 1.0 with increasing number of collocation points (FIG. 13). This is true for when the observations contain either no error or very high errors.

The direct method uses head and flux approximation functions that satisfy the governing equation, thus inclusion of the weighting functions, $\delta(p_j-\varepsilon)$, is not necessary. The least squares solution method automatically finds an optimal solution whether the approximation functions are weighted or not. Should the measurement error be known for each observed datum a user-specified variance can be used. Here, a Gaussian noise is assumed, though other distributions can be used. The error variance is the basis upon which weights are assigned to the observed data in the direct formulations. Here, the errors are assumed to be uncorrelated, corresponding to the diagonal weight matrix of Hill & Tiedeman [2007], though future work may explore correlated errors. For a discussion of how weights can be determined for different hydrogeological data, see Hill & Tiedeman [2007].

Discussion

A chief strength of the new direct method is that it does not require prior knowledge of the BCs. Also, the model domain does not have to conform to physical boundaries which are often uncertain or unknown. For example, the model domain can extend into regions where the aquifer does not exist. This will not create unrealistic outcomes; rather, the solution in this area will be an extrapolation of the direct solution constrained by the observed data where they exist, while satisfying the governing equations. Given other physical constraints, the actual boundary conditions can be inferred [Irsa, 2011]. On the other hand, the nature of the BCs may be inferred if the observed data are sufficiently dense and accurate (e.g., FIG. 5b). Though an isotropic aquifer is analyzed here, the method can be extended to locally anisotropic systems via coordinate transform techniques [Fitts, 2010].

The new method, due to its low demand on data and robustness in the presence of measurement errors, can be developed into an efficient prototyping tool as part of a field reconnaissance study, before conducting pumping tests and collecting additional data to build detailed models. The inferred BC can help delineate BVP domains, whereas the conductivity estimates can provide prior information for solving indirect inverse problems using regularized inversion. Although we have shown 2D results here, extension of the method to 3D is straightforward using 3D harmonic approximating functions and 3D elements with collocation points on its sides [Irsa & Galybin, 2010].

Due to its efficiency and flexibility, we envision future extension of this technique to the simultaneous identification of parameter structure, value, state variables, and boundary conditions, up to three-dimensions. To incorporate hydrogeological site static data, a variety of geostatistical-based iterative schemes (e.g., gradual deformation, sequential self-calibration, soft data integration) can be adapted, where the direct method will replace the "inversion filter" which is typically based on indirect inverse method. Parsimony in parameter structure can be explored using techniques such as data-driven zonation [Eppstein & Dougherty, 1996] and penalized objective function/model ranking statistics [Poeter & Anderson, 2005]. Though the current method does not incorporate uncertainty measures, uncertainty of the estimated parameters (and possibly boundary conditions) is strongly influenced by material zonation and the prior information equations. By setting additional criteria (e.g., objective function), iterative schemes can be developed to identify alternatively viable parameters, structures, and model boundary conditions. Experimentally, the direct method can be verified in sand tanks, comparing its merits for parameter and BCs estimation against those based on pumping tests and other aquifer characterization techniques.

The new direct inverse method for parameter and boundary condition estimation for steady-state groundwater flow problems is effective. One of its improvements is its computational efficiency, as there is no need to fit an objective function nor repeated forward simulating of a BVP. In embodiments, a discretization scheme using Trefftz-based approximations and a collocation technique to enforce the global flow solution may be used. The noisy observation data are directly incorporated into the solution matrix which is solved in a one-step procedure. The output is zoned hydrofacies hydraulic conductivity and analytical expressions of heads and fluxes which can be back-substituted to determine the model boundary conditions. Two methods are proposed, one for a homogeneous isotropic aquifer, which can also be used for estimating an equivalent conductivity. The second method is for heterogeneous aquifers where hydrofacies zonation is known in advance, together with prior information on hydraulic conductivity. The direct methods are tested using different data distributions, sampling density, and measurement error variances (up to ±10% of the total variation). Different hydrofacies patterns and heterogeneity variances are tested for both regular and irregular problem domains. All the examples tested were free from instability and conductivity converges with further refining of the grid towards the true or expected values. Under natural flow (i.e., no pumping), the direct method yields an equivalent conductivity of the aquifer, suggesting that the method can be used as an inexpensive characterization tool with which both aquifer parameters and boundary conditions can be inferred.

In yet another embodiment, a new method for three-dimensional steady-state aquifer inversion is developed to simultaneously estimate aquifer hydraulic conductivities and the unknown aquifer boundary conditions (BC). The method has its key strength in computational efficiency, as there is no need to fit an objective function, nor repeated simulations of a forward flow model. It employs a discretization scheme based on functional approximations and a collocation technique to enforce the global flow solution. The noisy observed data are directly incorporated into the inversion matrix, which is solved in an one-step procedure. The inverse solution includes hydraulic conductivities and head and flux approximating functions from which the model BC can be inferred. Thus a key advantage of the method is that it eliminates the non-uniqueness associated with parameter estimation under unknown BC which can cause the result of inversion sensitive to the assumption of aquifer BC. Two approximating functions are tested here, one employing quadratic approximation of the hydraulic head (flux is linear), the other cubic approximation. Two different BC are also tested, one leading to linear flow, the other strongly nonlinear flow. For both BC, the estimated conductivities converge to the true values with grid refinement, and the solution is accurate and stable when a sufficient number of the observation data is used. Compared to the quadratic function, the cubic function leads to a faster convergence of the estimated conductivity at a lower level of grid discretization, while it is also more robust for the different flow conditions tested. A sensitivity analysis is conducted whereby the inversion accuracy is evaluated against data density. Composite scale sensitivity (CSS) can reveal the overall information content of the data. However, when the number of measurements is fixed, CSS cannot reveal whether the observed data can lead to reliable conductivity estimates. A one-observation-at-a-time (OAT) approach is proposed, which can indicate the reliability of the estimated conductivity for a given set of the observation data. To evaluate the stability of the method when the observation data contain errors, a problem with 4 hydrofacies conductivities is inverted using hydraulic heads and a single Darcy flux component. The results are accurate when the measurement error is small but become slightly less accurate when the error is larger. In summary, flow condition, inverse formulation, grid discretization, observation data density and location, and measurement errors all influence the accuracy of inversion.

Hydraulic conductivity (K) is a critical parameter influencing fluid flow and solute transport in aquifers. However, estimation of aquifer hydraulic conductivity is a challenging task, due to issues related to aquifer heterogeneity, parameter and measurement scale effect, uncertainty in aquifer boundary conditions, and the lack of efficient estimation techniques. This study presents a three-dimensional (3D) steady-state inverse method which simultaneously estimates aquifer hydraulic conductivities, flow field, and the unknown aquifer boundary conditions (BC). In the following, different approaches of estimating aquifer hydraulic conductivity are briefly reviewed, before key features of the new method are presented and contrasted with the existing inverse methodology.

Aquifer K can be measured directly with Darcy tests on oriented cores or estimated using aquifer tests, indirect means, or the calibration of an aquifer simulation model.

Typically, core conductivity measurements sample a small aquifer volume, leading to values that are not representative of the aquifer at larger scales. With slug tests, K can be estimated for a greater volume using analytical flow solutions developed assuming radial flow from the test well in a homogeneous formation with an infinite lateral extent. Similarly, with pumping tests, analytical flow solutions have been developed to estimate large-scale horizontal hydraulic properties, e.g., the well-known Thiem solution for analyzing steady-state flow and the Theis solution for analyzing transient flow [Fitts, 2013]. To obtain K at higher resolutions, the analytical functions can be applied to specific aquifer intervals that are isolated from the other intervals, e.g., borehole flowmeter test, multilevel slug test, direct-push permeameter test [Molz et al., 1994; Butler, 2005; Bohling et al., 2012]. Compared to the K derived from core measurement and pumping test, these measurements can sample an intermediate range of the formation volume. Moreover, at the same core scale or well-test intervals, indirect K measurements can be made based on correlations between rock petrophysical properties and fluid flow properties, e.g., magnetic resonance logs, acoustic, density, or neutron logs, and electrical-conductivity profiling [Williams et al., 1984; Tang and Cheng, 1996; Shapiro et al., 1999; Hyndman et al., 1994, 2000; Schulmeister et al., 2003; Kobr et al., 2005; Camporese et al., 2011]. For quality control, these indirect measurements are compared and combined with one or more direct K measurements. However, correlation between fluid flow and petrophysical properties is often site-specific and empirical in nature. To address this issue, joint inversion techniques have been developed whereas aquifer hydrodynamic data are analyzed jointly with geophysical measurements [Kowalsky et al., 2006; Brauchler et al., 2012]. In these analyses, explicit correlation functions are not needed, although certain "structure similarity" between fluid flow and petrophysical properties is enforced to help constrain the joint inversion.

Another type of indirect K measurement can be made by building and calibrating an aquifer simulation model with an inverse method [Hill & Tiedeman, 2007]. For an overview of the inverse methodologies used in groundwater model calibration, including both direct and indirect methods and their pros and cons, please see Neuman & Yakowitz [1979], Weir [1989], and Irsa & Zhang [2012]. Within an inversion framework, K becomes a model calibration parameter and can be estimated (or inverted) at different scales of interest. For example, aquifer flow models with distinct hydrofacies zones can be built for which K can be estimated for each hydrofacies. In highly parameterized inversion, K can be estimated for each grid cell by imposing additional constraint equations on the inverse algorithms [Zimmerman et al., 1998; Doherty, 2005; Liu and Kitanidis, 2011]. However, most of the existing inverse techniques are based on minimizing an objective function, which is typically defined as a form of mismatch between the measurement data and the corresponding model simulated values. During inversion, to minimize the objective function, parameters including conductivities are updated iteratively using a forward model which provides the linkage between the parameters and the data. Because a forward model is needed, boundary conditions (BC) of the model are commonly assumed known, or less frequently, calibrated during the inversion. However, BC of natural aquifers are often unknown or uncertain. [In transient problems, both initial and boundary conditions are unknown.] As demonstrated by Irsa & Zhang [2012], different combinations of parameters and BC can lead to the same objective function values, thus results of many existing techniques may become non-unique.

To address non-uniqueness in K estimation, Irsa & Zhang [2012] developed a novel steady-state direct method for inverting two-dimensional (2D) confined aquifer flow. The new method adopts a set of approximating functions for hydraulic heads and groundwater fluxes as the fundamental solutions of inversion. It does not rely on minimizing objective functions (i.e., forward model-data mismatch), while hydraulic conductivity, flow field, and the unknown aquifer BC can be simultaneously estimated. Synthetic aquifer problems with regular and irregular geometries, different (deterministic) hydrofacies patterns, variances of heterogeneity, and error magnitudes were tested. In all cases, K converged to the true or expected values and was therefore unique, based on which heads and flow fields were reconstructed directly via the approximating functions. Boundary conditions were then inferred from these fields. In the 2D analysis, the inversion accuracy was demonstrated to improve with increasing amount of the observed data, low measurement errors, and grid refinement, although source/sink effects cannot be accommodated. To address the source/sink effects (e.g., pumping and recharge), Zhang [2013] extended the technique to inverting unconfined aquifers by superposing analytical flow solutions to generate the approximating functions. In these cases, the inverse solution was obtained via nonlinear optimization while the same high computation efficiency was maintained. Furthermore, to account for uncertainty in inversion due to the uncertain hydrofacies patterns, the method was combined with geostatistical simulation, whereas both K uncertainty and uncertainty in the unknown aquifer BC can be quantified [Wang et al., 2013].

This study extends our earlier works by demonstrating the applicability of the new direct method to inverting three-dimensional (3D) steady-state flow in confined aquifers. Similar to our earlier works, the 3D algorithm is tested using a set of synthetic forward (true) models which provide the measurement data, with or without measurement errors, for inversion. However, unlike the earlier works, the inversion accuracy is tested using two different sets of (increasingly complex) approximating functions under two different global flow BC which induce either linear or strongly nonlinear flow. Again, BC of the forward models are assumed unknown and are estimated by inversion along with the hydraulic conductivities and the flow field. To assess the accuracy of inversion, the estimated conductivities and the BC are compared to those of the forward models. A sensitivity analysis is conducted to evaluate how the inversion outcomes converge to the true model with grid refinement or with increasing quantity of the observation data. The issue of data worth is examined using different statistical measures. The stability of the method is also examined when measurement errors are increased from error-free to a set of realistic values. The inverse solution is considered stable if the estimated hydraulic conductivities do not vary from the true values by more than one orders of magnitude.

In one embodiment, a non-uniqueness in parameter estimation under unknown BC is first illustrated, before the 3D inverse formulation of this study is introduced. Results are presented in the following four sections relating to: (1) convergence of the inverse algorithm with grid refinement; (2) data needs; (3) information content of the observations; and (4) stability of inversion under increasing measurement errors. In addressing topics (1)~(3), a homogeneous aquifer problem is inverted and the observation data include hydraulic heads and a single groundwater flow rate. In addressing topic (4), inversion is carried out for a heterogeneous problem with 4 hydrofacies. In this case, observation data include hydraulic heads and a single Darcy flux component. The relevant results are discussed before conclusion and future research are summarized at the end.

Non-Uniqueness in Parameter Estimation

Figure 14A:
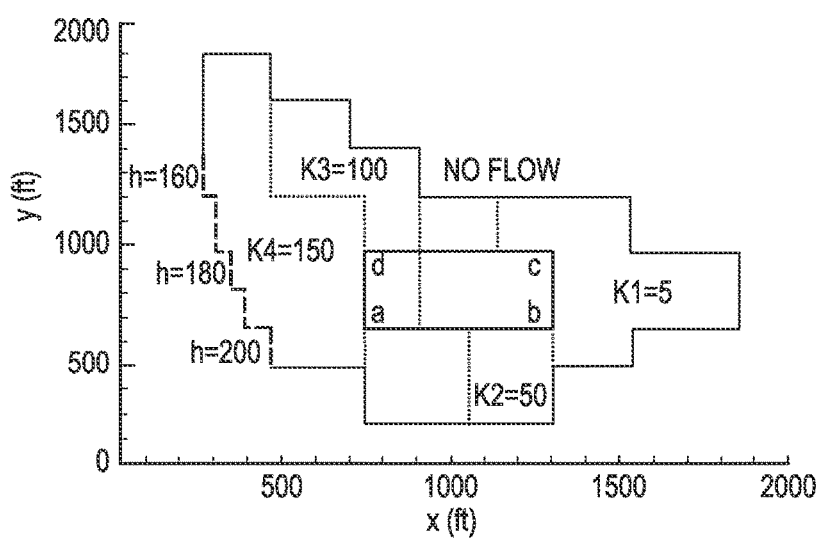
FIGS. 14A-C illustrate (a) The larger finite difference model (FDM) and the subdomain ('a-b-c-d') where the aquifer dynamic data are sampled for inversion. The BC of the FDM are shown: besides the inflow and outflow boundary, the remaining boundaries are no-flow. (b) Hydraulic heads along the subdomain boundaries are computed by the FDM and are referred to as the "True BC" (thick solid line). Heads along the same boundaries inverted by the new method with error-free measurements are referred to as "Inverse heads" (thick dash line). (c) Based on the True BC, two increasingly perturbed sets of BC ("Approx. BC" and "Inaccurate BC"; thin dash and dotted lines) are given to PEST for the estimation of K2 and K3 of the subdomain.

The determination of hydraulic conductivity for steady-state groundwater flow is mainly driven by the indirect inverse methods solving a set of boundary value problems to minimize an objective function. These methods assume either known BC for a given problem, or by appropriate parameterizations, obtain optimized BC during inversion which is typically an iterative procedure. The earlier generation of direct inversion methods (e.g., see a review in Sun [1994]) make similar assumptions about the BC, although boundary conditions of real aquifers are rarely known in advance. In this section, we demonstrate that unknown aquifer BC can lead to non-uniqueness in the estimated hydraulic conductivities (Ks). For simplicity, a 2D example is presented here by calibrating a subdomain problem (see the box labeled 'a-b-c-d' in FIG. 14a) of a larger forward model. A set of true Ks and BC are specified to this larger model (FIG. 14a), which is simulated with MOD-FLOW2000 [Harbaugh et al., 2000]. The finite difference forward model (FDM) and its discretization is shown in FIG. 14a. From the subdomain of this model, a set of regularly spaced observation data (18 heads and 4 Darcy fluxes) is sampled without any measurement errors. Based on these data, two hydrofacies conductivities (K2, K3) that lie within the subdomain is calibrated with PEST [Doherty, 2005] and with the new method [Irsa & Zhang, 2012]. For both methods, the inversion domain is defined by the box-shaped subdomain within which all the observation data lie. The subdomain BC are unknown to the new method, but are assumed known to PEST with increasing degree of uncertainty. For both methods, the location of the larger FDM boundaries as well as their BC are unknown, which is typical of real-world problems where the measurement site may lie far from the aquifer boundaries. Because only deterministic (zoned) inversion is tested and compared here, the pattern of conductivities within the subdomain is assumed known to both methods.

Figure 14B:
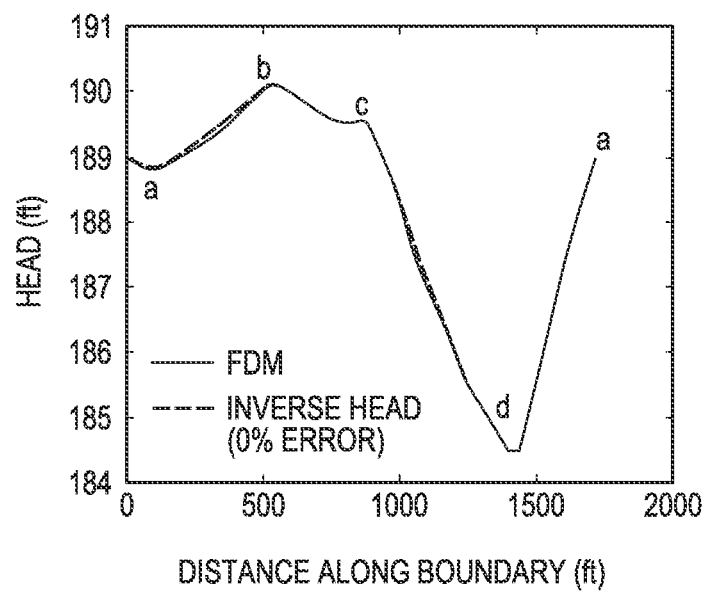

For inversion with the new method, a 3×2 inverse grid is used to represent the subdomain (not shown). This small grid size gives rise to a very small inversion system of equations, which can be solved efficiently, i.e., the inverse code is written with MATLAB 2012a for which the computation time to solve this problem is less than one second on a PC workstation. Given the set of error-free observed data, the estimated Ks are extremely close to the true values with the estimation errors that are less than 1% (Table 2). The inversion also recovers the hydraulic heads along the subdomain boundaries (as well as heads internal to these boundaries), which are compared to the true "BC", i.e., heads sampled from the larger FDM along the subdomain boundaries (FIG. 14b). With the new method, K2, K3 and the BC can be accurately and simultaneously estimated.

TABLE 2

Estimated hydraulic conductivities (ft/d) for the subdomain using the new method and using PEST under 3 different sets of assumed subdomain BC.

| | Grid | K2 | K3 | BC |
|---|---|---|---|---|
| True model (subdomain) | 14 × 8 | 50 | 100 | True BC sampled from the larger FDM |
| PEST | 40 × 40 | 46.6 | 105.9 | True BC given to PEST (i.e., to create a forward model) |
| PEST | 40 × 40 | 90.4 | 54.8 | Approx. BC given to PEST |
| PEST | 40 × 40 | 10000 | 0.1 | Inaccurate BC given to PEST |
| New method | 3 × 2 | 49.8 | 100.7 | Estimated by inversion |

Figure 14C:
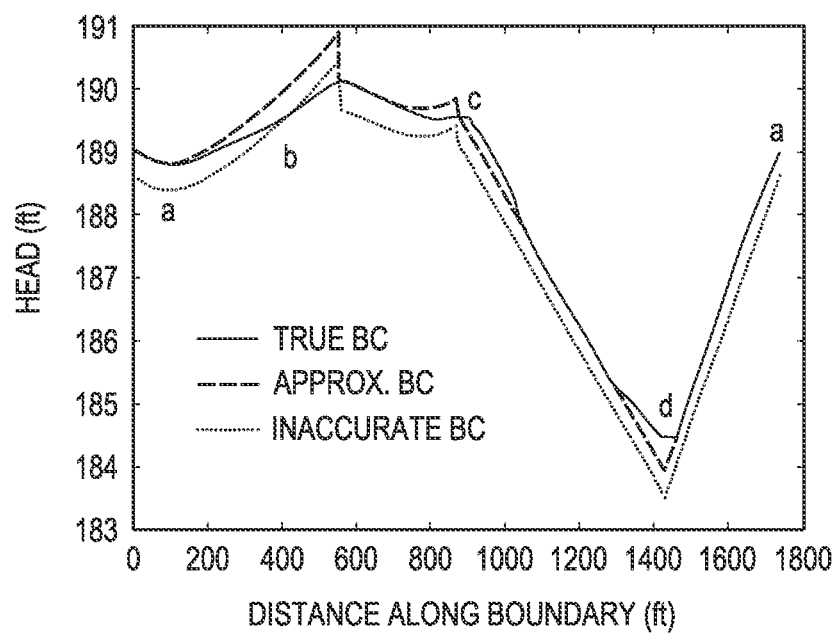

For inversion with PEST, forward simulations of steady-state flow within the subdomain are needed. This forward model, also computed with MODFLOW2000, is extracted from the larger FDM and is discretized with a finer 40×40 grid (the original discretization in the FDM is 14×8). To generate the initial guess for PEST's iterations, true K2 and K3 values are given as the starting parameter values. To run the forward model, different BC are postulated along the subdomain boundaries (FIG. 14c), which lead to very different calibration results (Table 2). When the postulated BC are identical or close to the true BC ("True BC" and "Approx. BC" in FIG. 14c, respectively), the estimated Ks are either the true values or not far from the true values (Table 2). However, when a more perturbed set of BC is given to PEST ("Inaccurate BC"), the estimated Ks become quite inaccurate and fall at the parameter bounds provided to inversion even though their true values are used as the starting parameters. The case presented here reflects an extreme situation where wells are drilled and sampled for hydraulic heads along the entire model boundaries. Even if such a sampling scheme can be practically accommodated, the BC provided to inversion likely will contain measurement errors. Clearly, whether PEST can accurately recover the parameters will depend on how high these BC errors are.

For the problem examined here, the new inverse method yields "unique" outcomes while PEST results are sensitive to the assumed BC. This comparison illustrates the promise of the new method for uniquely estimating hydraulic conductivities when aquifer BC are unknown or uncertain. For the given (assumed known) parameterization pattern, inversion with the new method can also obtain the correct BC, which suggests that it has a potential to be combined with the objective-function-based techniques to help reduce the non-uniqueness in parameter estimation. Further development and verification of the method for three-dimensional aquifer inversion is clearly desired and is the focus of the current study.

Direct Method

The inverse method of this study discretizes the model domain into block elements where a state variable is approximated with functions satisfying the local governing flow equation a priori, i.e., the fundamental solutions. Specifically, hydraulic head of each element is approximated by a function satisfying the Laplace's equation, and Darcy flux components are obtained from differentiating the head function via Darcy's Law. The inverse solution is obtained via minimizing a set of residual equations that are written at a set of collocation points placed at the element interfaces. Residual equations are also written at the observation locations, whether they are observed (point-scale) heads, observed (point-scale) fluxes, or observed flow rates. The unknown hydraulic conductivity is estimated together with the parameters of the head and flux approximating functions. The new direct method does not require a prior knowledge of the aquifer BC, nor does it attempt to fit the BC during inversion. For any given problem, the aquifer BC are always assumed unknown. Together with the aquifer hydraulic heads and conductivities, the BC are part of the inverse solution. Furthermore, should the BC be known along a part of or along the entire model boundaries, the BC data (be they heads, fluxes, or flow rates) can be directly incorporated into the inversion as a form of the observation data.

Approximating Functions

The equation describing 3D steady-state groundwater flow in a heterogeneous confined aquifer without source/sink effect is:

$$\nabla \cdot (q) = 0$$

$$q = -K(x,y,z)\nabla h \quad (23)$$

where $\nabla$ is the gradient operator, h is hydraulic head, $K(x,y,z)$ is locally isotropic, and q is Darcy flux. Given Eqn. (23), the hydraulic head solution is a harmonic function within a homogeneous sub-region of the model domain, e.g., a single inverse grid element or a hydrofacies zone comprising of a number of elements. In this study, $K(x,y,z)$ is parameterized as discrete hydrofacies zones. For a given sub-region, the solution to the flow equation can be formulated by adopting a set of approximating functions of hydraulic head and Darcy fluxes. While the 2D studies of Irsa & Zhang [2012] tested a quadratic head approximating function in which case the flux approximation is linear, here we test two sets of functions with increasing orders of approximation, i.e., quadratic head $\tilde{h}_q$:

$$\tilde{h}_q(x,y,z) = a_0 + a_1 x + a_2 y + a_3 z + a_4 xy + a_5 xz + a_6 yz + a_7(x^2 - z^2) + a_8(y^2 - z^2) \quad (24)$$

and cubic head $\tilde{h}_c$:

$$\tilde{h}_c(x, y, z) = \begin{array}{l} a_0 + a_1 x + a_2 y + a_3 z + 3a_4(x^2 - z^2) + 3a_5(y^2 - z^2) + \\ 6a_6 xy + 6a_7 xz + 6a_8 yz + 6a_9 xyz + a_{10} x(3y^2 - x^2) + \\ a_{11} x(3z^2 - x^2) + a_{12} y(3x^2 - y^2) + a_{13} y(3z^2 - y^2) + \\ a_{14} z(3x^2 - z^2) + a_{15} z(3y^2 - z^2) \end{array} \quad (25)$$

In both cases, Darcy flux components are approximated as:

$$\tilde{q}_x = -K \frac{\partial \tilde{h}_c}{\partial x}, \tilde{q}_y = -K \frac{\partial \tilde{h}_c}{\partial y}, \tilde{q}_z = -K \frac{\partial \tilde{h}_c}{\partial z}.$$

In the above equations, sub-indexes q and c indicate the order of approximation in the hydraulic head, while $a_0$, $a_1, \ldots, a_{15}$ are the unknown coefficients that will be determined from the inverse solution. In the model domain, each block element has 4 approximating functions ($\tilde{h}^{(k)}$, $\tilde{q}_x^{(k)}$, $\tilde{q}_y^{(k)}$, $\tilde{q}_z^{(k)}$), with 9 unknown coefficients for the quadratic head approximation and 16 unknown coefficients for the cubic head approximation. The corresponding level of approximation for the Darcy flux is linear if $\tilde{h}_q$ is adopted and quadratic if $\tilde{h}_c$ is adopted.

Continuity at the Collocation Points

In 3D inversion, for both the quadratic and cubic hydraulic head approximations, each element interface has one collocation point in the center of the interface (see Appendix A). Due to the harmonic properties of these approximating functions, one collocation point can ensure that the average value of the functions is preserved across the element interface. In order for the solution of the direct method to satisfy the flow equation globally, a set of residual functions needs to be minimized at each collocation point $p_j$:

$$\int R(\Gamma_j) \delta(p_j - \varepsilon) d\Gamma_j = 0, j = 1, \ldots, m_c \quad (26)$$

where $m_c$ is the total number of element interfaces, $R(\Gamma_j)$ is the residual of an approximating function on the j-th interface, and $\delta(p_j - \varepsilon)$ is the Dirac delta weighting function. In 3D inversion, the Dirac delta weighting function needs to be chosen based on the size of the inversion matrix (see detail in Appendix B).

For the quadratic head approximation, when the element interface lies within a single hydrofacies zone, the residual equations enforcing head and flux continuity across each element interface are written for these 4 quantities: $\tilde{h}_q$, $\tilde{q}_{qx}$, $\tilde{q}_{qy}$, $\tilde{q}_{qz}$. However, when the interface links two elements of different hydraulic conductivities, only two residual equations are needed in order to honor the reflection principle: $\tilde{h}_q$, $\tilde{q}_{qn}$, where $\tilde{q}_{qn}$ represents the normal component of the elemental Darcy flux to the interface. For the cubic head approximation, the residual equations enforcing continuity of head, flux, and their derivatives across element interfaces are written for 9 quantities: $\tilde{h}_c$, $\tilde{q}_{cx}$, $\tilde{q}_{cy}$, $\tilde{q}_{cz}$, $$\frac{\partial \tilde{q}_{cx}}{\partial y}, \frac{\partial \tilde{q}_{cx}}{\partial z}, \frac{\partial \tilde{q}_{cy}}{\partial z}, \frac{\partial \tilde{q}_{cx}}{\partial x}, \frac{\partial \tilde{q}_{cy}}{\partial y}.$$

Due to the linear dependency between the second order derivatives of the state variable (hydraulic head), $$\frac{\partial \tilde{q}_{cz}}{\partial z}$$

does not need to be evaluated [Galybin & Irsa, 2010]. Similarly, when the interface is adjacent to elements with different conductivities, only 5 residual quantities are evaluated: $\tilde{h}_c$, $\tilde{q}_{cn}$, $$\frac{\partial \tilde{q}_{cn}}{\partial x}, \frac{\partial \tilde{q}_{cn}}{\partial y}, \frac{\partial \tilde{q}_{cn}}{\partial z}.$$

In the following subsection, the equations are written for an interface which lies within a hydrofacies zone. For those that lie at the hydrofacies boundaries, the equations will be appropriately reduced (as discussed above) and are thus not presented. Moreover, Eqn. (26) is also formulated at the observation locations, where $\delta(p_j - \varepsilon)$ now represents a weighting imposed due to measurement errors ($\delta$ is 1.0 if the observations are error-free), and $R(\Gamma_j)$ is replaced with the residuals at the data locations $R(t_j)$, where $t_j$ is the j-th observed data.

Algorithms

The algorithms of the 3D direct method are presented in this section, where the hydraulic head solution is first approximated with the quadratic formulation, and then with the cubic formulation. All of which may be conducted on devices in communication with the system (FIG. 1B).

Quadratic Approximation

For the quadratic approximation, 4 continuity equations for the head and flux components are evaluated based on Eqn. (26). At the j-th collocation point $p_j(x_j, y_j, z_j)$ lying on an interface between elements (k) and (l), the following continuity equations can be written:

$$\delta(p_j-\varepsilon)R_{h_q}(p_j)=\delta(p_j-\varepsilon)(K\tilde{h}_q^{(k)}(x_j,y_j,z_j)-K\tilde{h}_q^{(l)}(x_j,y_j,z_j))=0$$

$$\delta(p_j-\varepsilon)R_{q_{qx}}(p_j)=\delta(p_j-\varepsilon)(\tilde{q}_{qx}^{(k)}(x_j,y_j,z_j)-\tilde{q}_{qx}^{(l)}(x_j,y_j,z_j))=0$$

$$\delta(p_j-\varepsilon)R_{q_{qy}}(p_j)=\delta(p_j-\varepsilon)(\tilde{q}_{qy}^{(k)}(x_j,y_j,z_j)-\tilde{q}_{qy}^{(l)}(x_j,y_j,z_j))=0$$

$$\delta(p_j-\varepsilon)R_{q_{qz}}(p_j)=\delta(p_j-\varepsilon)(\tilde{q}_{qz}^{(k)}(x_j,y_j,z_j)-\tilde{q}_{qz}^{(l)}(x_j,y_j,z_j))=0 \quad (27)$$

where the hydraulic head residual equation is multiplied by the hydraulic conductivity in order to extract the K value from the solution. By writing Eqn. (27) at all the collocation points in the problem domain, a set of algebraic equations can be written with which head and flux continuity can be enforced locally within each element, while satisfying the global flow equation.

Eqn. (26) is then written for the N observed hydraulic heads. For the k-th element, where the t-th observed head lies, we aim to minimize the difference between the observed head $h_t(x_t,y_t,z_t)$ and the approximating function at the same location: $\tilde{h}_{q/c}^{(k)}(x_t,y_t,z_t)$. This equation is also multiplied by K, and taking into account the observation weight $\delta(p_j-\varepsilon)$, we write a head measurement residual equation at the location of the observed head:

$$\delta(p_t-\varepsilon)(K\tilde{h}_{q/c}^{(k)}(x_t,y_t,z_t)-Kh_t(x_t,y_t,z_t))=0, t=1,\ldots,N \quad (28)$$

The right hand sides of Eqns. (27) and (28) are all zeros, thus the solution at this point would be trivial. At least one flux or flow rate measurement is needed for the inversion to succeed, which also reflects the well-known fact that hydraulic conductivity cannot be uniquely determined from the hydraulic head data alone [Hill & Tiedeman, 2007]. For example, if an observed flux component (e.g., $q_x$) is available, Eqn. (28) can be rewritten to create a flux measurement residual equation using the same error-based weighting scheme as that of the head observations:

$$\delta(p_t-\varepsilon)(\widetilde{q_x}_{q/c}^{(k)}(x_t,y_t,z_t)-q_x(x_t,y_t,z_t))=0 \quad (29)$$

Similar equations can be written if additional flux components are measured. Alternatively, a flow rate measurement can be used. Because the flux approximating functions are given analytically throughout the problem domain, an approximating function of flow rate along any line or surface can be created by integrating the appropriate fluxes. For instance, in a unit cube with dimensions [0,0,0] to [1,1,1], a flow rate $\widetilde{Q_x}$ along one side of the model domain (x=1) can be evaluated as a surface integral:

$$\tilde{Q}_x(x,y,z) = \sum_{k=e}^{f}\left[\int_0^{dz^{(k)}}\int_0^{dy^{(k)}} \tilde{q}_{qx}^{(k)} dy\, dz\right]$$

where $dy^{(k)}$ and $dz^{(k)}$ are the lengths of the k-th element along the y and z axis, respectively, e to f represent a set of elements lying on the side of the domain at x=1. Given an observed flow rate measured on the same surface (Qx), the flow rate measurement residual equation takes the form:

$$\delta(p-\varepsilon)\tilde{Q}_x(x,y,z)=\delta(p-\varepsilon)Q_x \quad (30)$$

The addition of Eqn. (29) or (30) yields a non-trivial solution, which leads to the unique estimation of the hydraulic conductivities. The final equation system consists of Eqns. (5), (6), (29) or (30), which can be solved with a least-squares method (more explanation is provided later). Note that if flux and flow rate measurements are both available, equations (29) and (30) can both be used (the same can be said if multiple flux and flow rate measurements exist). However, as demonstrated in the Results section, a minimum of one flux component or one flow rate measurement suffices to provide a well-posed inverse solution even when multiple hydraulic conductivities are estimated.

Cubic Approximation

Based on Eqn. (26), the cubic approximation of the hydraulic head leads to 9 continuity equations: hydraulic head, three Darcy flux components, three cross derivatives, and two second order derivatives of the hydraulic head. For the j-th collocation point $p_j(x_j,y_j,z_j)$ lying on an interface between elements (k) and (l), we have the following continuity equations:

$$\delta(p_j-\varepsilon)R_{h_c}(p_j)=\delta(p_j-\varepsilon)(K\tilde{h}_c^{(k)}(x_j,y_j,z_j)-K\tilde{h}_c^{(l)}(x_j,y_j,z_j))=0 \quad (31)$$

$$\delta(p_j-\varepsilon)R_{q_{cx}}(p_j)=\delta(p_j-\varepsilon)(\tilde{q}_{cx}^{(k)}(x_j,y_j,z_j)-\tilde{q}_{cx}^{(l)}(x_j,y_j,z_j))=0$$

$$\delta(p_j-\varepsilon)R_{q_{cy}}(p_j)=\delta(p_j-\varepsilon)(\tilde{q}_{cy}^{(k)}(x_j,y_j,z_j)-\tilde{q}_{cy}^{(l)}(x_j,y_j,z_j))=0$$

$$\delta(p_j-\varepsilon)R_{q_{cz}}(p_j)=\delta(p_j-\varepsilon)(\tilde{q}_{cz}^{(k)}(x_j,y_j,z_j)-\tilde{q}_{cz}^{(l)}(x_j,y_j,z_j))=0$$

$$\delta(p_j-\varepsilon)R_{\frac{\partial q_{cx}}{\partial y}}(p_j)=\delta(p_j-\varepsilon)\left(\frac{\partial \tilde{q}_{cx}^{(k)}}{\partial y}(x_j,y_j,z_j)-\frac{\partial \tilde{q}_{cx}^{(l)}}{\partial y}(x_j,y_j,z_j)\right)=0$$

$$\delta(p_j-\varepsilon)R_{\frac{\partial q_{cx}}{\partial z}}(p_j)=\delta(p_j-\varepsilon)\left(\frac{\partial \tilde{q}_{cx}^{(k)}}{\partial z}(x_j,y_j,z_j)-\frac{\partial \tilde{q}_{cx}^{(l)}}{\partial x}(x_j,y_j,z_j)\right)=0$$

$$\delta(p_j-\varepsilon)R_{\frac{\partial q_{cy}}{\partial z}}(p_j)=\delta(p_j-\varepsilon)\left(\frac{\partial \tilde{q}_{cy}^{(k)}}{\partial z}(x_j,y_j,z_j)-\frac{\partial \tilde{q}_{cy}^{(l)}}{\partial z}(x_j,y_j,z_j)\right)=0$$

$$(p_j-\varepsilon)R_{\frac{\partial q_{cx}}{\partial x}}(p_j)=\delta(p_j-\varepsilon)\left(\frac{\partial \tilde{q}_{cx}^{(k)}}{\partial x}(x_j,y_j,z_j)-\frac{\partial \tilde{q}_{cx}^{(l)}}{\partial x}(x_j,y_j,z_j)\right)=0$$

$$\delta(p_j-\varepsilon)R_{\frac{\partial q_{cy}}{\partial y}}(p_j)=\delta(p_j-\varepsilon)\left(\frac{\partial \tilde{q}_{cy}^{(k)}}{\partial y}(x_j,y_j,z_j)-\frac{\partial \tilde{q}_{cy}^{(l)}}{\partial y}(x_j,y_j,z_j)\right)=0$$

The head measurement residual equation is formulated similarly as Eqn. (28), with the difference that the approximating hydraulic head function is cubic. Similarly, Eqn. (29) or Eqn. (30) is rewritten with $\tilde{q}_x$ or $\tilde{Q}_x$ evaluated using flux approximating functions that are derived from the cubic head.

For both the quadratic and cubic head approximating functions, the final systems of equations can be assembled into a matrix form:

$$Ax \approx b. \quad (32)$$

where A is a sparse matrix (r×s). r is the number of equations, and s is the number of unknowns. If the domain is discretized into n elements, the quadratic approximation yields s=9n+1, while s=16n+1 for the cubic approximation. The number of equations can be determined by $r=4m_c+N+g$ for quadratic approximation and $r=9m_c+N+g$ for cubic approximation, where N is the number of observed hydraulic heads, g is the number of flux or flow rate observations (g≥1), x is the solution vector of size s, $x \varepsilon \{Ka_0^{(1)}, \ldots, Ka_8^{(n)}, K\}$ or $x \varepsilon \{Ka_0^{(1)}, \ldots, Ka_{15}^{(n)}, K\}$, b is of size r, consisting of all zeros except g non-zero fluxes or flow rates. The system of equations can be solved using a least-squares minimization technique with either a direct solver (e.g., $x=(A^TA)^{-1}A^Tb$) or an iterative LSQR solver [Paige and Saunders, 1982]. For the example problems presented in this study, in addition to observed heads, one flow rate or flux measurement was provided to inversion which was sufficient to uniquely determine one or more hydraulic conductivities.]

The inversion algorithms presented in Section 3 are tested on several synthetic examples where the true aquifer flow conditions were simulated with MODFLOW2000 from which a number of hydraulic heads, flow rate, or flux were sampled. For several test examples inverting a homogeneous aquifer, inversion results were obtained using both the quadratic and cubic head approximations with (mostly) error-free measurements. Increasing inverse grid densities were tested. An analysis was then conducted to evaluate the issues of data support, parameter sensitivity to observation density, and of when observation data can yield reliable K estimates. Finally, a problem with 4 conductivities was inverted under increasing head measurement errors. In this section, dimensions for all relevant quantities assume a consistent set of units (e.g., head in ft, K in ft/d, q in ft/d, Q is ft$^3$/d), thus units of the various quantities are often not labeled.

Convergence and Accuracy of the Direct Formulations

Figure 15B:
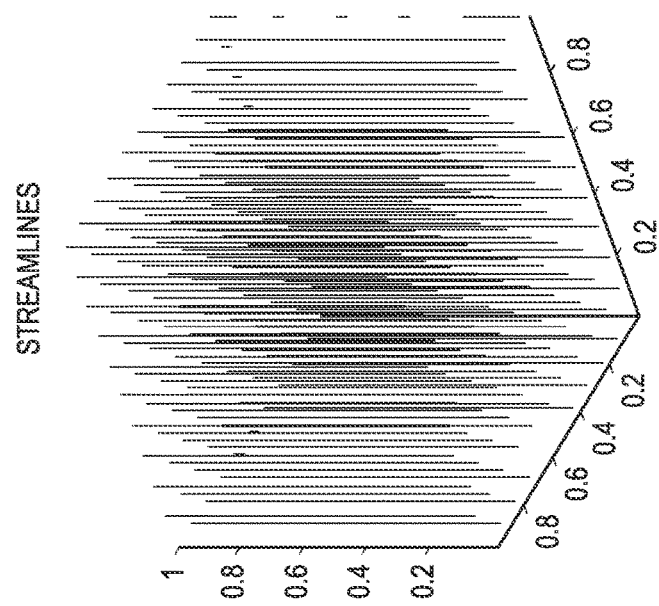
FIGS. 15A-B illustrate a linear flow model, or Model1. FDM true solution of heads (a) and streamlines (b).
Figure 15A:
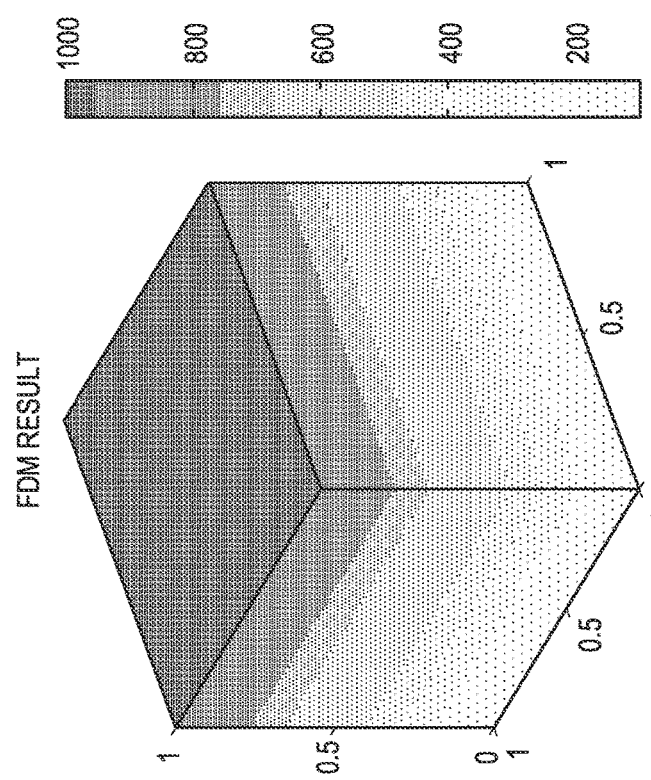

In this subsection, two homogeneous forward models were created to test the inversion algorithm. For both models, a cubic domain of dimensions [0,0,0]~[1,1,1] was created. To each model, a true K value of 1.0 was assigned. A finite difference grid with 25×25×25 block elements was used for the forward simulations, thus a theoretical maximum of 15,625 observed hydraulic heads can be extracted from each model (i.e., enough data exist for a sensitivity study using random selections of the observations). The only difference between the two models lies in how the aquifer boundary conditions were specified:

1) A linear flow model or Model1 (FIG. 15). The BC were specified as: h=1000 is assigned to the top boundary and 100 is assigned to the bottom boundary, while the sides have no-flow boundaries. Under this set of BC, the FDM solution of hydraulic heads and streamlines for K=1 is shown (FIG. 15). A vertical flow rate ($Q_z$) was sampled from this solution along the model side boundary at x=1. Given these BC, this measured flow rate is considered error-free.

2) A nonlinear flow model or Model2 (FIG. 16). The BC were specified as: the top boundary has a hydraulic head following a parabolic function $(300+100[(x+0.3)^2+(y+0.4)^2])$, while the remaining 5 sides were assigned no-flow boundaries. Under this set of BC, the FDM solution of hydraulic heads and streamlines for K=1 is shown (FIG. 16). A flow rate, $Q_z$, was sampled along the model side boundary at x=1. A measurement error of +3% was imposed on this flow rate.

Figure 17B:
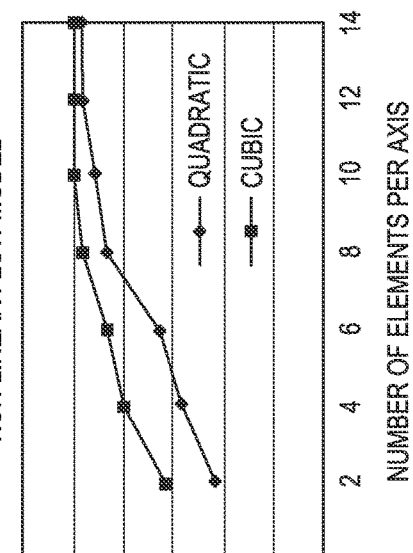
FIGS. 17A-B illustrate a grid refinement study for Model and Model2, based on 50 observed heads and one observed flow rate. When the number of elements per side is 2, the inverse grid is 2×2×2, and so forth.
Figure 17A:
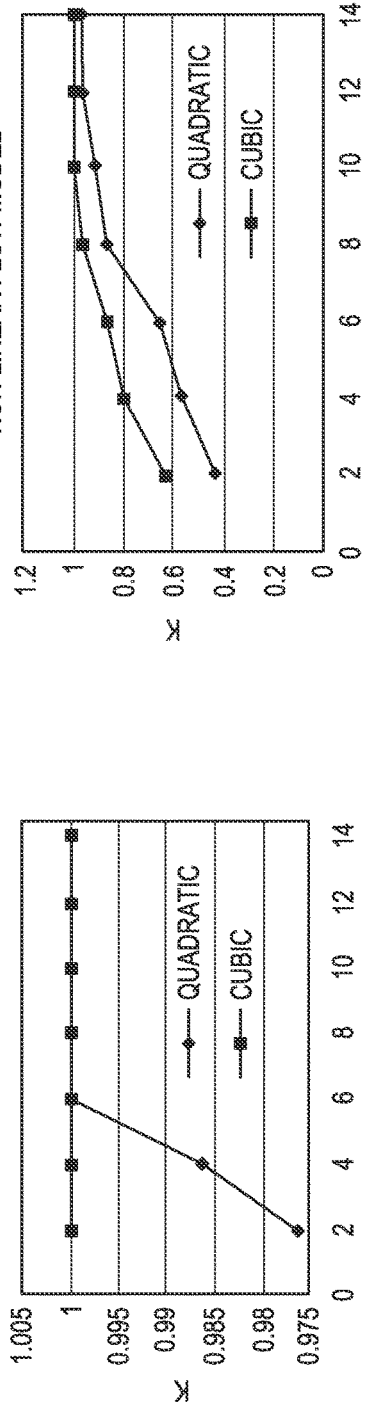

From each forward model, besides the one flow rate measurement, fifty heads were sampled in a quasi-regular fashion, without imposing any measurement errors. These data were used as the observed data for inversion where both the quadratic and cubic head approximating functions were tested. Under both linear (Model1) and strongly nonlinear flow (Model2), a convergence analysis was conducted whereby the inverse grid was increasingly refined. Results of this grid refinement study are provided in FIG. 17, which demonstrates the applicability of the 3D inversion formulations. For the given observed data, inversion accuracy increases with grid refinement. For a fixed grid, however, the cubic head formulation leads to more accurate K estimates compared to the quadratic head formulation. In other words, the cubic formulation achieves similar accuracy as the quadratic formulation but with fewer elements (in the following analysis, all inversions were done using the cubic formulation). Moreover, flow condition also influences the accuracy of inversion: under linear flow, both formulations converge to the true K quickly (cubic at 2×2×2; quadratic at 6×6×6); under nonlinear flow, both converge more slowly and a higher resolution grid is needed to achieve the same level of estimation accuracy. Because with the larger grid sizes, the inverse solution takes longer time, a 6×6×6 grid is used in all subsequent analysis with the exception of the last example (4.4). This discretization allows us to conduct a sensitivity study with relative efficiency.

Data Support

Figure 18:
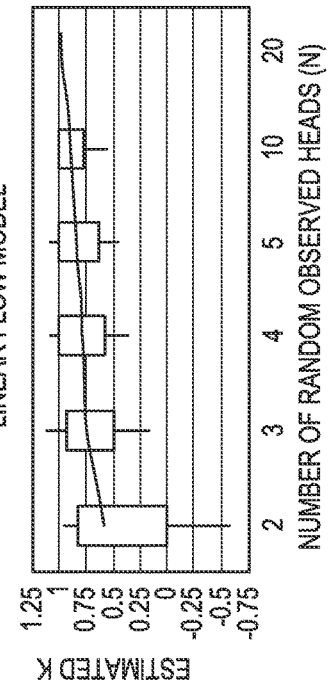
FIG. 18 illustrates conductivity estimated for Model1 when increasing number of the observed heads are provided to inversion. The true K of the problem is 1.

The answer to "How many observations do we need to be able to estimate all the unknown parameters?" depends on the problem of interest. In heterogeneous aquifers, the number of observations is rarely sufficient to provide perfect (high resolution) solutions [Moore and Doherty, 2006]. However, given a hydrofacies parameterization, there usually exists a threshold level of measurement data that can lead to satisfactory estimation of the parameters and, in our case, the boundary conditions as well. Because the direct method invokes an efficient one-step solution procedure, it is highly suitable as an analysis tool to understand the issue of data support. For both Model1 and Model2, observed heads were randomly sampled to provide the input data for inversion, keeping the same flow rate measurement along the model side boundary at x=1. For a given data support (N varies from 2 to 100), heads were randomly sampled from the FDM 102 times. N={2, 3, 4, 5, 10, 20} for Model1; N={5, 10, 15, 20, 25, 30, 40, 50, 100} for Model2. For both models, the estimated K was plotted against the data support, N (FIG. 18, 19). At each N, 102 inverse solutions were obtained which result in the following estimated K values: minimum, maximum, 80% percentile (box), and median (connected solid line).

For both models, conductivity converges to the correct value (K=1) with increasing data support, as expected. With the exception of N=2 (Model1) and N<20 (Model2), the estimated K generally varies within one order of magnitude from the true value, i.e., the estimated K is greater than 0.1 and less than 1.5. For each model, there appears to be an approximate threshold N value where the estimated K stabilizes and the variance of the K starts to decrease: N=5 (Model1), N=30 (Model2). For Model1, 80% of the estimated K ranges from 0.64 to 1.0 when N=5; for Model2, this envelop is from 0.7 to 1.25 when N=30. At these support sizes, adding more observed heads does not significantly increase the accuracy and reliability (i.e., reduction in the estimation variance) of the result. This behavior was observed in other inversion studies as well and was referred to as a 'screening effect' [Feyen et al., 2003]. The variance is also larger when the number of the observations is small. An exception is that when N is very small (e.g., 2 for Model1 and 5 for Model2), a few estimated conductivities actually become negative due to incorrect estimation of the hydraulic head gradient $[\partial h/\partial x, \partial h/\partial y, \partial h/\partial z]^T$. In these cases, wrong gradient signs can be computed locally from the few observed heads that are spaced either too close to one another or sampled at locations that make gradient evaluations difficult, e.g., $\partial h/\partial z$ is estimated using measured heads that are sampled on or near a horizontal plane. In these cases, inspection of the reconstructed streamlines (not shown) reveals incorrect local flow directions, indicating the issue with head gradient. Clearly, when data are sparse, head gradient estimation becomes challenging in 3D and inversion accuracy suffers accordingly. This problem vanishes when more observed heads are provided to inversion with which head gradient vectors can be more accurately computed. In a field situation, before any inversion is carried out, the existing measurements need to be closely examined to evaluate whether head gradient, which varies with space, can be accurately determined. Without such data, inversion accuracy will be poor regardless of the inverse method used. Moreover, even when N is very small, the degeneracy in the head gradient estimation (i.e., negative K estimates) occurs in only about 10% of the inverse problems, while 80% of the estimated K still remains positive.

The K estimation variance, together with the evolution of its median value, suggests a minimum number of head observations for the inversion to succeed under linear and nonlinear flow. For Model1 (linear flow), if a 10% conductivity estimation error is considered acceptable, 10 observed heads (along with the one observed flow rate) are sufficient to provide an accurate K estimate. Upon inspecting the solutions, the highest errors in K estimation tend to occur when the observed heads lie close to one another (i.e., average distance <0.5), resulting in a strong screening effect. In these cases, model domains extend beyond the observation locations, leading to extrapolation in the rest of the model where the observed data do not exist. In these outer regions, continuity of head and flux are imposed but locally these solutions are not conditioned to measurements, which leads to a greater overall estimation error. In real applications, model domain is typically defined by the observation locations (see Section 2). Thus, should the model domain be selected to more closely follow the data, the inversion accuracy is also expected to improve. For Model2 (nonlinear flow), given the same acceptable error in K estimation, an N threshold appears around 40. Interestingly, accurate result can also be obtained with an N as low as 10, i.e., near the maximum estimated K. This particular solution suggests that for N=10, an optimal distribution of the observed heads exists. These heads may be described as a set of "influential observations with high information content" for the K estimation [Hill and Tiedeman, 2007]. Together, these results suggest that the accuracy of K estimation depends not only on the quantity of the observations but also on their locations. Furthermore, when N is greater than 30, the median K is generally overestimated due to the imposed +3% error on the observed flow rate. However, when N increases from 30, the influence of this flow rate error on K estimation becomes less pronounced: when N=100, only around +3% overestimation of the median K is observed.

Information Content of the Observations

Figure 19:
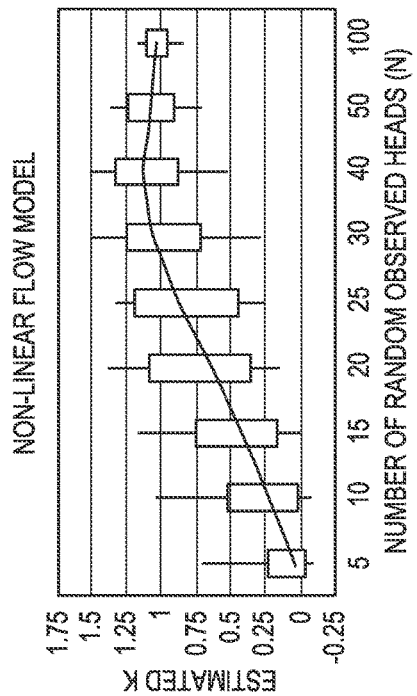
FIG. 19 illustrates conductivity estimated for Model2 when increasing number of the observed heads are provided to inversion. The true K of the problem is 1. The one observed flow rate contains a +3% measurement error.
Figure 20:
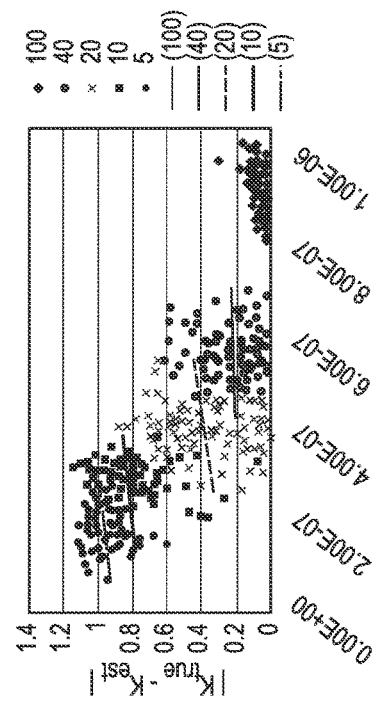
FIG. 20 illustrates a computed CSS for Model2 when increasing number of the observed heads are provided to inversion. For each observation set (of size N), 102 inversion runs were carried out. Thick lines represent a linear fit of the K estimation error against CSS for a particular observation set.

Various sensitivity analysis methods exist with which the influence of observations on parameter estimation can be assessed. These methods are often based on estimating a sensitivity matrix by differentiating the observations with respect to the parameters [Hill and Tiedeman, 2007]. Here, the fit-independent Composite Scaled Sensitivity (CSS) statistic is tested, which provides a scalar value summarizing the total information provided by all observations for the estimation of one parameter, in our case, K of the aquifer:

$$CSS = \sum_{j=1}^{N+1} \left[\frac{DSS_j^2}{N+1}\right]^{0.5}, DSS_j = \left(\frac{\partial h_j}{\partial K}\right)|K| \quad (33)$$

where N is the number of head observations and (+1) reflects the one flow rate measurement. Here, for a subset of the support sizes: N={5,10,20,40,100}, CSS is computed for Model2 using the forward model for each set of the (randomly sampled) observed heads at their measurement locations. (Note that for each support size, 102 inversion runs had been carried out with which K was estimated given the same observed heads.) The CSS values are plotted against the absolute error of K estimation (FIG. 20). Larger N leads to higher CSS, indicating an overall increase of the information content of the data, which then leads to a better estimated K. For the same dataset, however, a slight increase in the K estimation error is observed with increasing CSS. It suggests that for this model, CSS is not able to give detailed information to distinguish if a given set of the observations can result in an accurate and reliable K estimate. Similar to FIG. 19, we observed that N~40 appears to be a measurement threshold: when N>40, the K estimation error decreases sharply with increasing N.

For Model2, CSS appears to be an inadequate indicator of the information content of the data, i.e., whether a particular set of the observations can yield accurate inversion results. Here, we present a simple and efficient OAT (one-observation-at-a-time) procedure which is shown for limited test cases to be a good indicator of whether a set of observations can lead to a reliable K estimate. In this procedure, we propose to solve the inverse problem using only 1 observed head at first, recording the estimated conductivity value, i.e., $K_1$. Then, one more observed head is added, yielding $K_2$, and so on until $K_N$ (N represents the total number of the observed heads in the dataset). We then evaluate the convergence behavior of the estimated K versus the number of observations used. If K appears to converge (i.e., the estimated K appears to stabilize when increasing number of the head measurements are used), then we randomize the sequence of the head selections from the same observation dataset, and repeat the analysis to obtain a new set of $K_1$ to $K_N$. Again, the behavior of K is inspected and compared to the first sequence. This analysis can be repeated many times, and all sequences of K are compared together. The estimated K using the full dataset (of size N) is considered reliable if all the K sequences appear to converge after certain measurement threshold is reached.

Figure 21A:
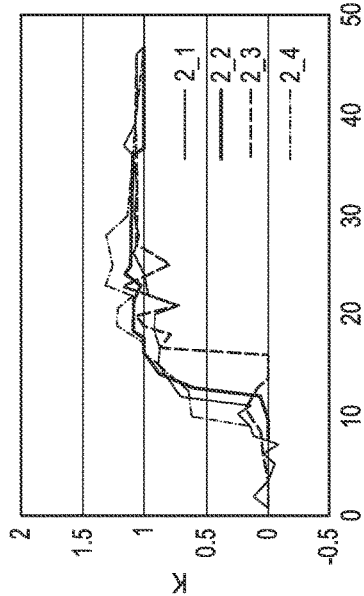
FIGS. 21A-C illustrate OAT test runs for 3 different measurement datasets, with (a) fast converging, (b) slow converging, and (c) non-converging characteristics. For each dataset, 4 randomized sequences were run. True K of this problem is 1.
Figure 21C:
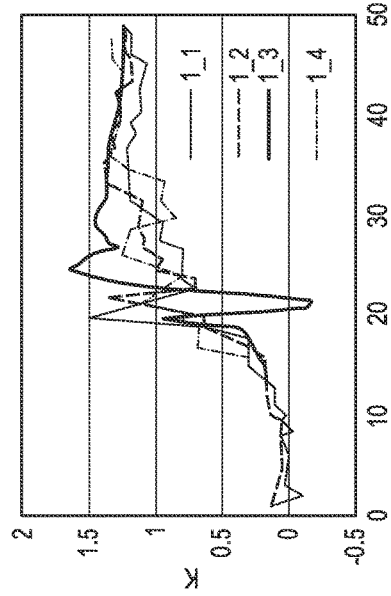
Figure 21B:
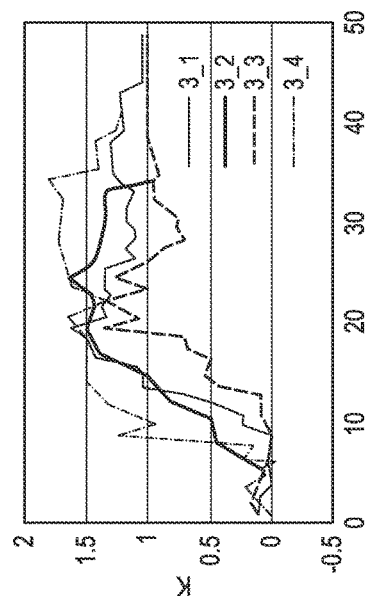

To illustrate the OAT procedure, 3 examples using Model2 are presented with N=50 (again, only one flow rate measurement is used). In each example, 50 heads were randomly sampled at different locations, yielding 3 alternative measurement datasets. For each measurement set, 4 randomized sequences were created using the OAT procedure. Three different behaviors are observed: (1) Fast convergence (FIG. 21a): for all 4 sequences, a stable K is obtained with as few as 30 observed heads. After 30, adding more observed heads does not change the result, but may increase the reliability of the estimated K. In this case, the particular measurement set (a total of 50 heads) can provide enough information for the reliable K estimation. (2) Slow convergence (FIG. 21b): a stable K is obtained at 44 observed heads, in this case, the measurement dataset (another randomly selected 50 heads) may provide less information for the reliable K estimation. (3) Non convergence (FIG. 21c): none of the sequences suggest that the estimated K is stabilizing. In this case, the measurement dataset (yet another 50 heads) do not provide sufficient information for the reliable K estimation, thus more observation data would be needed. In the above analysis, a few sequences first appear to converge, but switch to very different K values as more observed heads are added, i.e., the sequence labeled "3_1" in FIG. 21b, when N reaches 15. This suggests that the addition of one more observed head leads to a significant change in the inverted flow field, thus illustrating the nonuniqueness issue discussed earlier [Irsa & Zhang, 2012], where different BC associated with different flow patterns can all satisfy the same observed data. This behavior also suggests the necessity of randomizing the sequence when carrying out the OAT analysis. Having multiple sequences can help identify possible false convergence behavior.

Figure 22B:
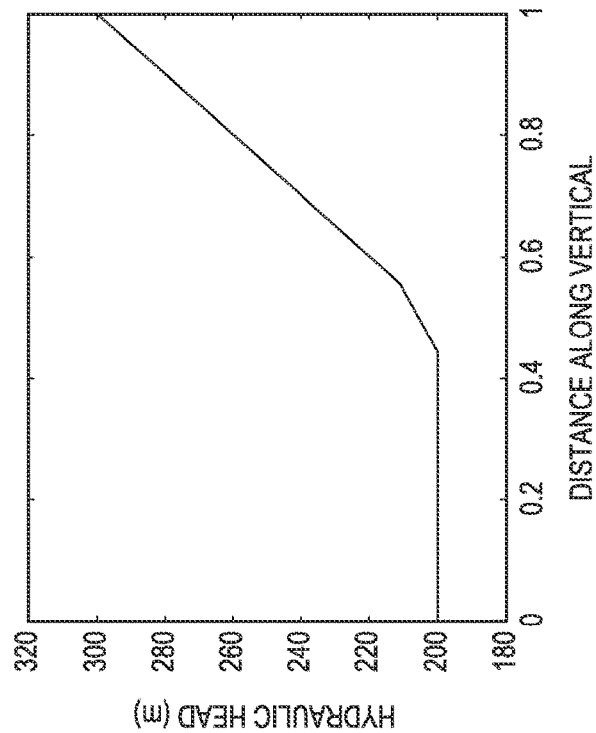
FIGS. 22A-B illustrate a recovered hydraulic head profile (dotted line) compared to the corresponding true head profile (solid line) (a) along a diagonal line at the model top boundary in Model2, dataset "2_1", N=50. (b) along the model center for a problem with two horizontal hydrofacies and linear flow boundary conditions.
Figure 22A:
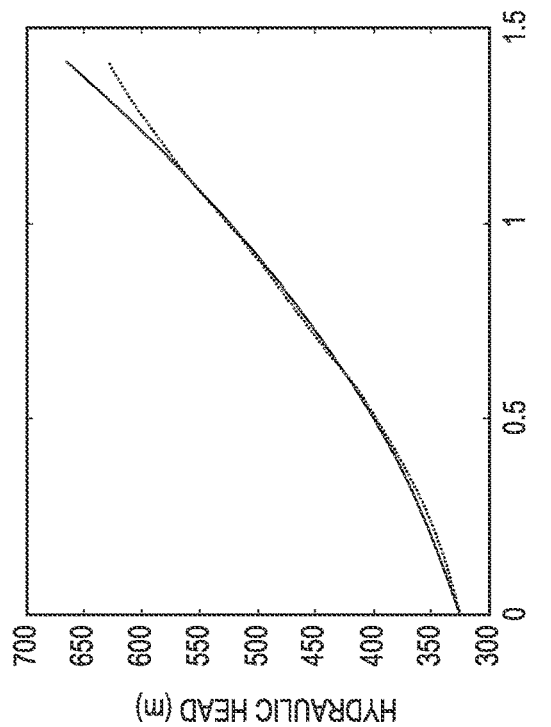
Figure 24A:
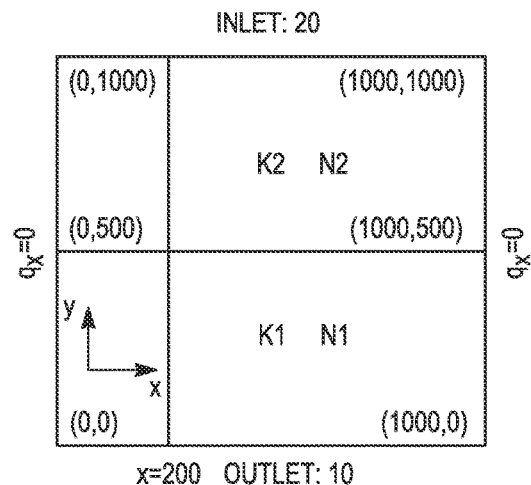
FIGS. 24a-24d illustrate an inversion outcomes of case 3: (a) computational domain with a line at x=200 ft indicating the location where inverted head is compared to the true FD head. (b) Head profiles along the line when the measured heads are error-free. Location of the measured heads is also indicated (circles). (c) measured heads contain ±1% error. (d) measured heads contain ±5% error.
Figure 24B:
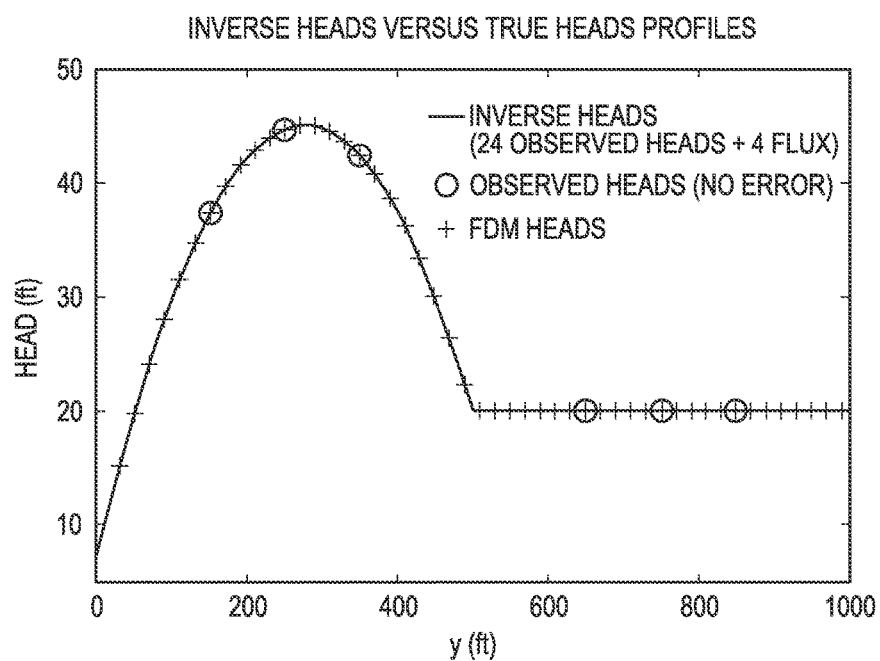
Figure 24C:
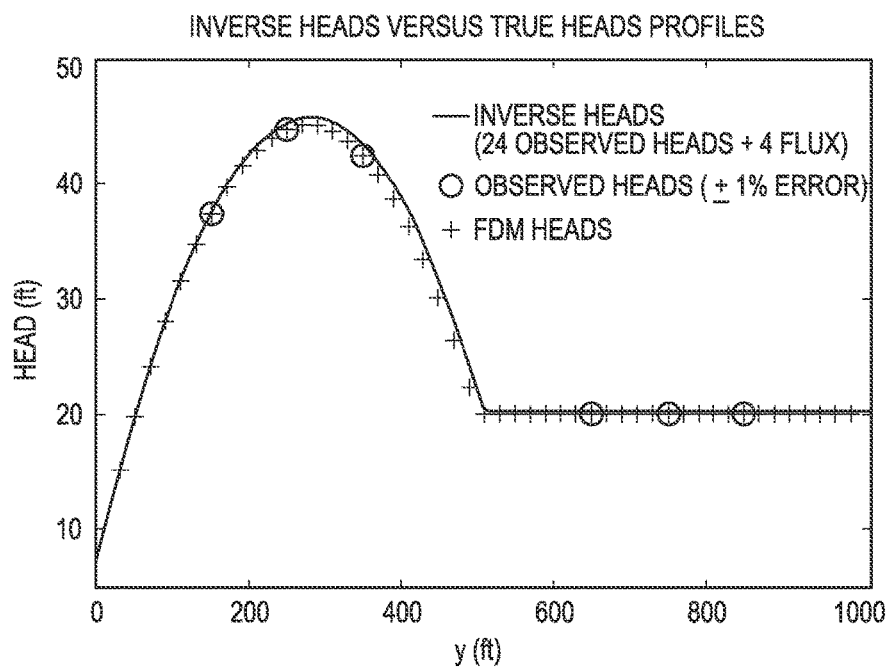
Figure 24D:
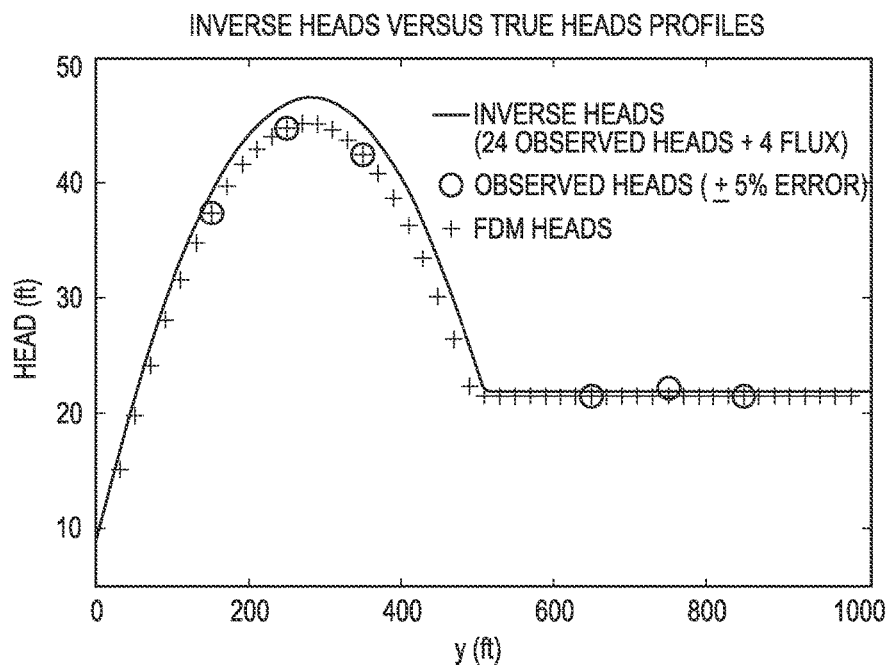
Figure 25B:
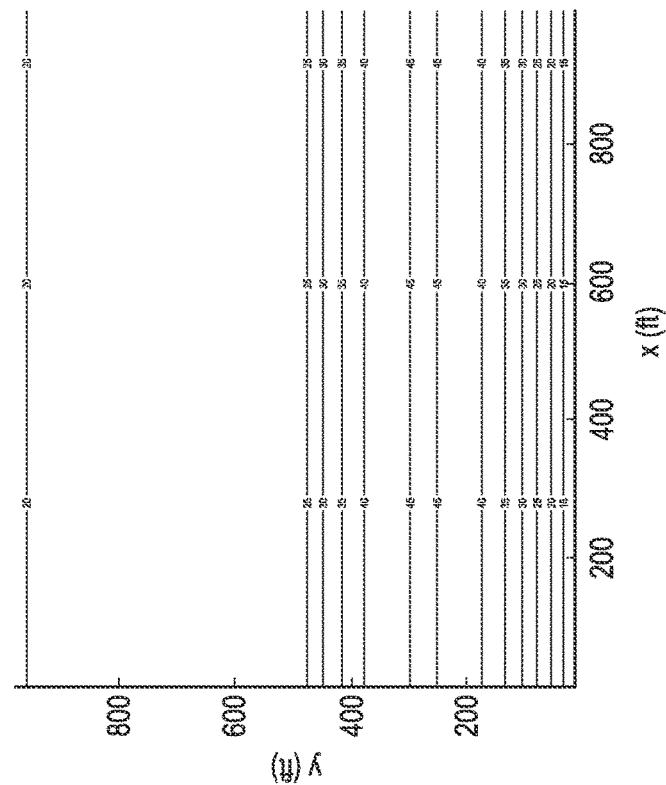
FIGS. 25a-25d illustrates a hydraulic head contour map of case 3. (a) head contour map of the FDM; (b) inverted head given error-free measured heads; (c) inverted head given measured heads with ±1% errors; (d) inverted head given measured heads with ±5% errors.
Figure 25A:
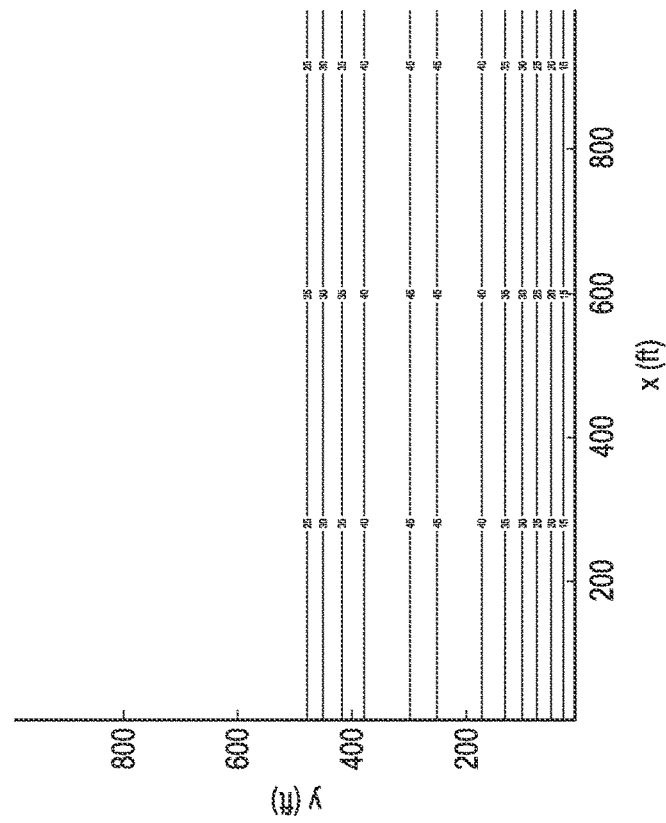
Figure 25C:
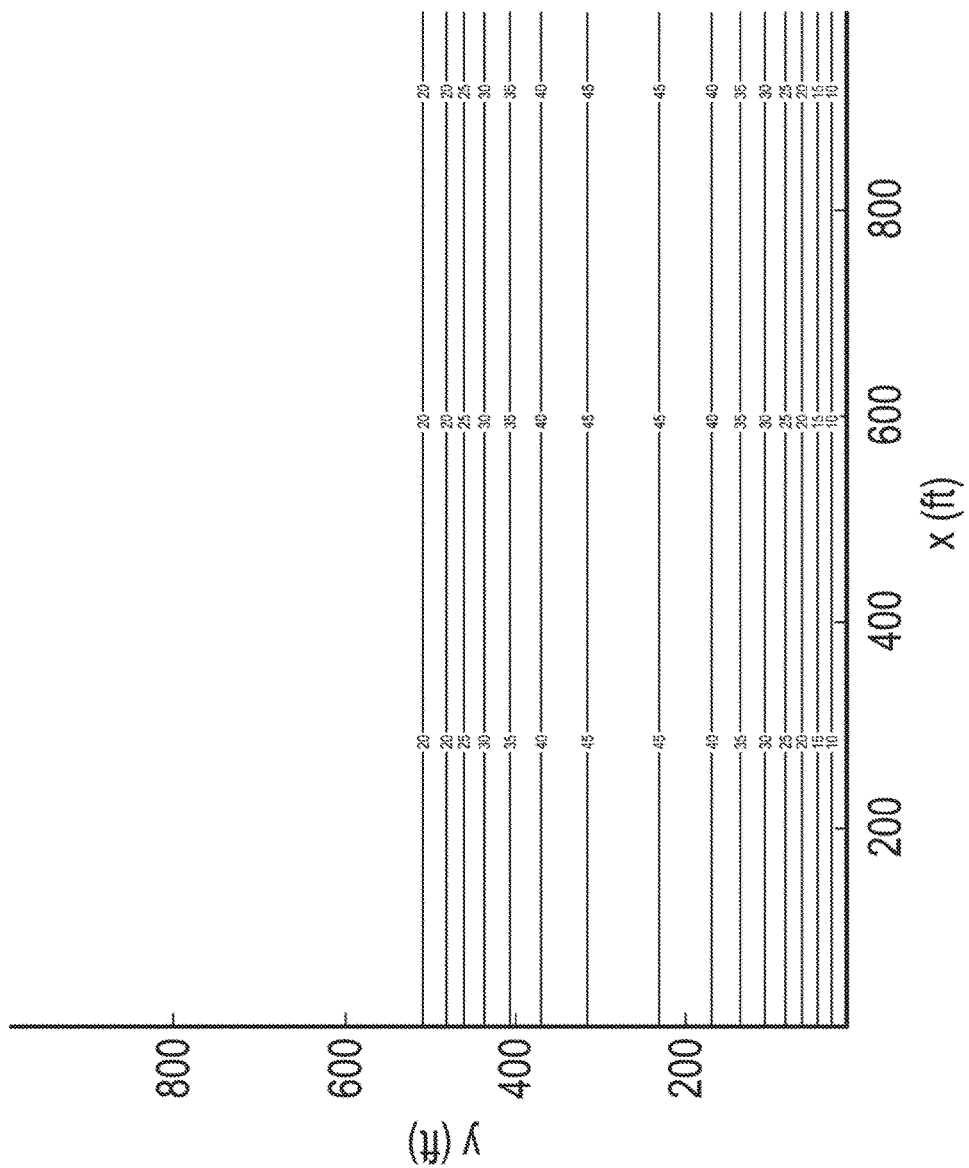
Figure 25D:
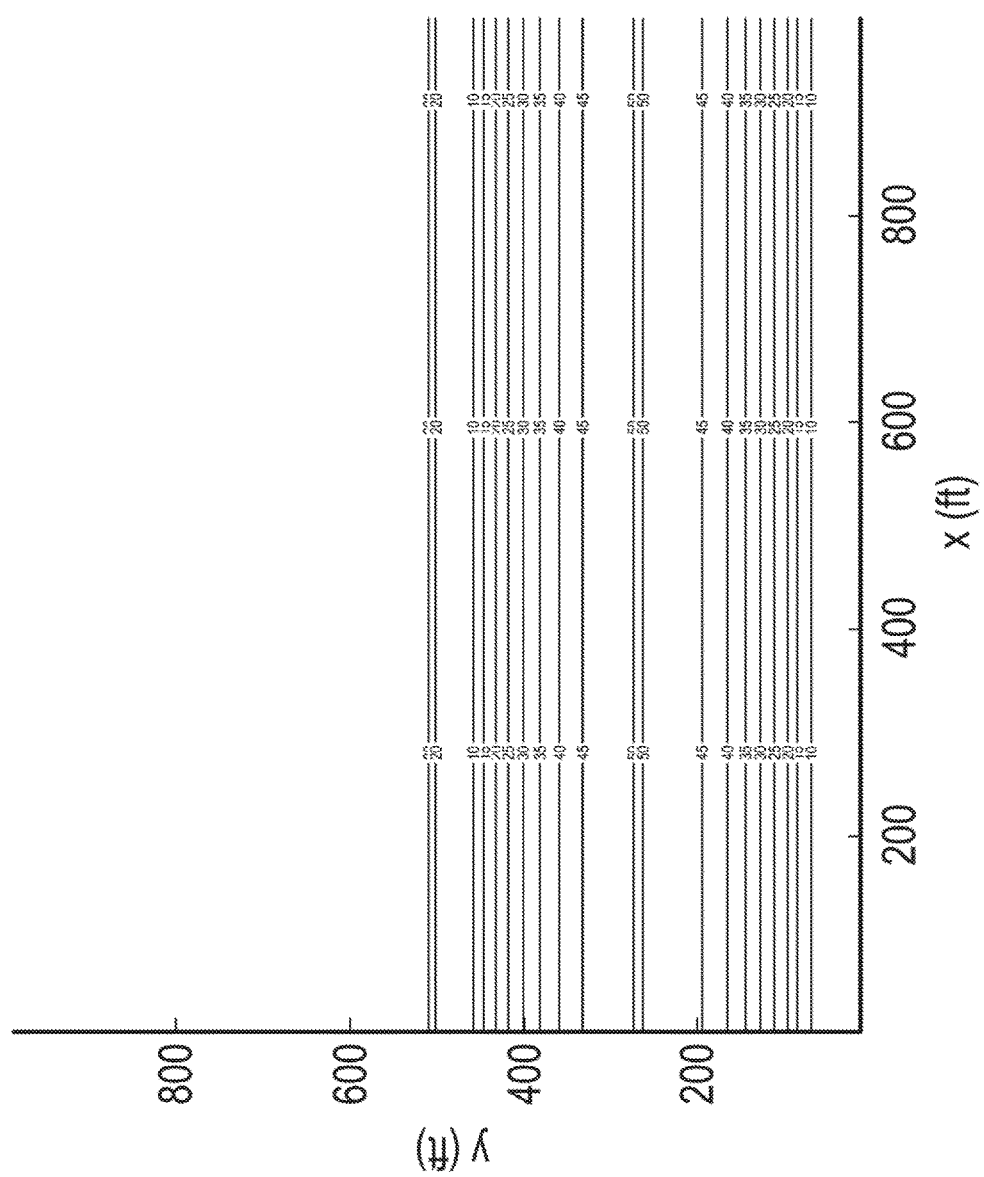

To evaluate the accuracy of BC recovery, the BC obtained from one inverse solution (Model2: dataset "2_1" when N=50; see FIG. 21a) are compared with the true BC which were used in the forward FDM to generate the observation data. Along a diagonal profile on the model top boundary where the true hydraulic head was specified as a parabolic function, the recovered head profile closely matches the true head profile (FIG. 22a). In addition, a separate inversion is carried out when the model domain contains two horizontal hydrofacies zones of equal thickness (the bottom hydrofacies K is 100 times the top hydrofacies K). The true model in this case is driven with a set of linear flow BC, thus flow is from top to bottom (this problem is similar to the heterogeneous problem described in the next section and is thus not presented in great detail). Along a straight line in the center of the model domain extending from the bottom boundary to the top boundary, the recovered head profile is again favorably compared with the true head profile (FIG. 22b). In all other inversion runs when accurate Ks were estimated based on sufficient observation data, a similar accuracy in BC recovery is observed. Similar to K estimation, the accuracy in BC recovery also increases with the increasing number of the observation data.

Heterogeneous Inversion & Stability

A heterogeneous model is inverted where four hydrofacies zones exist within a computation domain of $x \varepsilon [0,100]$, $y \varepsilon [0,100]$, $z \varepsilon [0,100]$ (all units are in ft). In this analysis, the cubic hydraulic head formulation is used. At the hydrofacies interfaces where K differs across the neighboring elements, fewer equations are needed in formulating Eqn. (31), as only the hydraulic head, the normal flux, and its derivative are written for the continuity equations.

at (83.0, 83.0, 82.5). The inversion is carried out first with a coarse grid, and then with a refined grid. Initially, error-free measurements are used, and the estimated conductivities are identical with those of the true model (Table 3). Then, increasingly higher measurement errors are imposed on the observed heads while keeping the mean error approximately zero (error is not imposed on the flux measurement). For example, if the errors is ±0.1%, it means that we randomly add or subtract 0.1% of the total head variation to each measured head sampled from the true model. Tapes and pressure transducers can yield head measurements with a precision of less than 1 cm [Post et al., 2013]. Pressure transducers sometimes suffer from environmental effects, which can lead to head measurement errors on the order of several cm or even decimeters [Post et al., 2013]. In comparison, our head errors of ±0.1~0.5 ft (±3~15 cm) are reasonable. Though other techniques can lead to even greater head measurement errors (e.g., meters), Post et al. (2013) recommends that "the use of such data beyond anything other than an initial, general reconnaissance study is questionable, and any quantitative analysis based on them should be avoided". Therefore, we did not test head errors greater than ±0.5 ft.

When a small inverse grid (2×2×2) is first used, the estimated conductivities become less accurate with increasing head measurement errors, although the inversion results are still stable, i.e., for the given error magnitudes, the estimated hydraulic conductivities do not vary from the true values by more than one orders of magnitude. When the inverse grid is refined to 4×4×4, for the same measurement errors, much improved K estimates were obtained, especially for the cases with the larger measurement errors (±0.5 ft). Clearly, similar to the homogeneous cases inverted earlier, inversion accuracy of the heterogeneous problem is also affected by the grid resolution. The conductivity estimation error, however, is expected to grow when the measurement errors are further increased and/or when the number of observed heads is further decreased (this latter

TABLE 3

Estimated hydraulic conductivities (ft/d) when inversion is conditioned to observed heads with increasing measurement errors. Conductivities of the true model are also listed. The measurement error is defined by a percent of the total head variation in the solution domain. The computation time is obtained by running the inversion code on a dual-core 64-bit PC workstation.

| Head measurement error | Hydraulic Conductivities | | | | Grid | Computation Time |
|---|---|---|---|---|---|---|
| | K1 | K2 | K3 | K4 | | |
| True model | $1.0 \times 10^{-2}$ | $5.0 \times 10^{-2}$ | $1.0 \times 10^{-1}$ | $5.0 \times 10^{-1}$ | 50 × 50 × 20 | ~5 sec |
| Inversion: 0% (0) | $1.0 \times 10^{-2}$ | $5.0 \times 10^{-2}$ | $1.0 \times 10^{-1}$ | $5.0 \times 10^{-1}$ | 2 × 2 × 2 | ~1 sec |
| Inversion: ±0.1% (±0.1 ft) | $9.7 \times 10^{-3}$ | $4.9 \times 10^{-2}$ | $9.7 \times 10^{-2}$ | $4.9 \times 10^{-1}$ | 2 × 2 × 2 | ~1 sec |
| Inversion: ±0.5% (±0.5 ft) | $5.7 \times 10^{-3}$ | $2.9 \times 10^{-2}$ | $5.7 \times 10^{-2}$ | $2.9 \times 10^{-1}$ | 2 × 2 × 2 | ~1 sec |
| Inversion: ±0.1% (±0.1 ft) | $1.01 \times 10^{-2}$ | $5.05 \times 10^{-2}$ | $1.01 \times 10^{-1}$ | $5.05 \times 10^{-1}$ | 4 × 4 × 4 | ~2 sec |
| Inversion: ±0.5% (±0.5 ft) | $1.08 \times 10^{-2}$ | $5.4 \times 10^{-2}$ | $1.08 \times 10^{-1}$ | $5.4 \times 10^{-1}$ | 4 × 4 × 4 | ~2 sec |

Spatially, the 4 hydrofacies are organized as (the value of their respective hydraulic conductivity is given in Table 3):

K1 zone: $x \varepsilon [0,50]$, $y \varepsilon [0,50]$, $z \varepsilon [0,100]$
K2 zone: $x \varepsilon [50,100]$, $y \varepsilon [0,50]$, $z \varepsilon [0,100]$
K3 zone: $x \varepsilon [0,50]$, $y \varepsilon [50,100]$, $z \varepsilon [0,100]$
K4 zone: $x \varepsilon [50,100]$, $y \varepsilon [50,100]$, $z \varepsilon [0,100]$ Under a set of true model BC (specified head of 200 ft and 100 ft for the top and bottom boundaries, respectively, and no-flow for the sides), a forward FDM is simulated with a dense grid of 50×50×20 from which a set of observation data are sampled. These data consist of 64 randomly sampled heads and one vertical Darcy flux component ($q_z$) sampled problem was evaluated previously with the homogeneous cases and will not be repeated here). A systematic study is needed, however, to evaluate an optimal monitoring network with which the inversion can be carried out with a high degree of stability—i.e., accurate parameter estimates that are robust to measurement errors while only a limited number of head measurements is required for the inversion to succeed.

The recovered head boundary conditions are very accurate when the error-free data are used to condition the inversion (not shown), but become less accurate when the measurement error is increased. These results are consistent with what was found in our earlier 2D studies. Computation time for the above inversion (i.e., a program written with MATLAB 2012a) is extremely fast when a least-squares direct matrix solver is used. Generally, it takes less than two seconds for the solver to converge, and the solution time does not appear to be affected by the increasing measurement errors that are tested in this problem. However, for 3D inversion with much larger grid sizes, the system of equations will become much bigger. Iterative solution techniques will likely be needed for which a number of efficient LSQR solvers (both serial and parallel) are under development [Lee et al., 2013].

Discussion

Using synthetic examples providing a set of true models from which measurements can be sampled, this study demonstrates the applicability of the new direct method for aquifer inversion in three dimensions. In formulating the fundamental solutions of inversion, earlier studies evaluated a set of lower order approximating functions which were shown to provide sufficiently accurate solutions for different 2D problems [Irsa & Zhang, 2012; Wang et al., 2013]. For 3D inversion, two sets of approximating functions of increasing complexity are developed and tested: quadratic head and linear Darcy flux versus cubic head and quadratic Darcy flux. Although the lower order approximating functions can yield accurate results when the inverse grid is refined, the higher order approximating functions can lead to a faster convergence of the estimated conductivity at a lower level of grid discretization. Regardless of the order of approximation, the direct method can yield accurate results given a sufficiently refined grid, whereas high accuracy can also be gained with a coarse grid using higher approximation. Such grids lead to fewer equations and number of unknowns in the inversion system of equations, thus the analysis can be performed with a high computational efficiency. Moreover, based on two simulations with identical parameterization but with different flow fields (uniform versus strongly non-uniform), the effect of boundary conditions, or the degree of flow tortuosity, also impacts the inversion accuracy. The cubic approximating function is found to be more robust when different flows are inverted, and is thus chosen for the majority of the analysis. A sensitivity analysis is then conducted to elucidate the effect of sampling density on the inversion accuracy. The results suggest that the location of the measurement data can also influence inversion: when the measured heads are clustered, the inversion accuracy suffers because of the greater extrapolation error. An OAT procedure is used to determine if a given set of measurements can lead to a reliable K estimate. Because the new method is computationally efficient, a large number of inversion runs, as required by the OAT procedure, can be completed quickly. The optimal measurement location, however, remains undetermined and will require additional analysis for which a global sensitivity technique will likely be needed [Saltelli et al., 2008]. Finally, using a problem with four hydrofacies, stability of inversion under increasing observation errors is demonstrated. The inversion accuracy is not only influenced by the magnitude of the measurement errors but is also affected by the inverse grid resolution.

In conducting the above analyses, which were carried out to analyze the inverse algorithm and its stability, the observation data include hydraulic heads and a single subsurface flow rate, or hydraulic heads and a single Darcy flux component. Clearly, to apply the new method to inverting problems under non-pumping conditions, an issue exists with measuring the subsurface groundwater fluxes or flow rates which are needed for inversion. One way to collect flux measurements is to conduct borehole flowmeter tests [Molz et al., 1994] or downhole flow logging [Gellasch et al., 2013] under ambient flow. To measure subsurface flow rates, hydrograph separation can be utilized, although this technique requires that aquifer intersect streams whose gain/loss can be accurately measured. In studying groundwater-surface water interactions, various seepage meters can directly measure water fluxes at sediment-water interfaces [Kalbus et al., 2006]. Indirect approach can use Darcy's Law to infer subsurface fluxes based on local K and hydraulic head measurements. For example, using the Multilevel Slug Test, a local K can be estimated at each packed-off interval [Bulter, 2005]. Before the test (under ambient flow), if the same interval is subject to multiple head measurements at locations above and beneath this interval, an in-situ groundwater flux can be inferred. In addition, new measurement techniques for in-situ groundwater flux determination are now available [Labaky et al., 2009]. With the Point Velocity Probe, for example, both the magnitude and direction of the average linear velocity can be measured. If porosity measurement is also available, Darcy flux vectors can then be determined. The above discussion suggests that subsurface flow rate or flux measurements can in theory be obtained if the appropriate tests are conducted. However, some of these fluxes are indirect measurements (e.g., those determined by Distributed Temperature Sensing involve inverse modeling of the measured temperatures), and the associated measurement errors may be higher. In addition, under the Dupuit-Forchheimer condition, new inverse formulation has been developed to account for the source/sink effects (e.g., pumping and recharge) [Zhang, 2013]. For problems with heterogeneous conductivity and recharge distributions, inversion is successful given a single pumping rate in additional to hydraulic heads as measurements. For these problems, subsurface flux or flow rate observations are no longer needed [Zhang, 2013]. The extension of the 3D method to address source/sink effects will be investigated in the future. To summarize, data requirement of the new inverse method is not unreasonably high. The potential of this method to be adopted by real world analysis can be enhanced by new measurement techniques or improved formulations.

A fundamental contribution of our series of studies is to prove, via the new method, that boundary condition information is not needed for estimating aquifer parameters including hydraulic conductivities (and source/sink rates). With the objective-function-based approaches, hydraulic head and flux BC must be specified along the entire model boundaries, because these methods require the repeated simulations of a forward flow model in order to minimize the objective function. One issue with these approaches lies in the fact that BC are typically unknown in real aquifers, and if a wrong set of BC is assumed, parameters estimated using objective functions are likely non-unique. As demonstrated in Irsa & Zhang [2012], two different sets of BC can give rise to two different flow fields both of which can perfectly fit the same observed data, yielding a zero objective function. Moreover, when BC are specified to the forward model, these traditional methods in effect require that inversion be conditioned to these boundary heads or fluxes. In other words, by specifying BC to a forward model in order to minimize an objective function, the calibrated model is "fitted" to these heads or fluxes. The problem is that such heads or fluxes are not real measurements that are sampled from the aquifer; rather they reflect a conceptual assumption made by the modeler. Because of subsurface uncertainty, if a wrong BC assumption is made (e.g., leakage exists along a presumed no-flux boundary), this will result in the so-called "model error" which is difficult to remediate using the objective functions, e.g., various authors have discussed how the objective functions may be modified to account for such errors [Doherty and Welter, 2010]. As demonstrated in herein, even in the extreme case where boundary heads are sampled everywhere in order to provide the BC for the forward model, measurement errors, which effectively create a large number of "incorrect measurements" along these boundaries, can significantly impact the accuracy of inversion using the objective function. With the new method, the heads, fluxes, or flow rates are provided to inversion at the locations where they are measured, and they can be anywhere inside the model domain or on the model boundaries. Compared to the traditional methods, no assumptions about the BC are made, eliminating the possibility of making the type of "model errors" that can arise due to a wrong BC assumption. In fact, our series of studies demonstrate that observation data that are sampled anywhere in the solution domain (with a minimum of one flux or one flow rate measurement) can effectively replace the need for specifying the BC along the entire model boundaries.

Although BC can in theory be calibrated, such an approach is likely to be inefficient. This is because infinite combinations of parameters and BC can satisfy the same observed data and non-uniqueness in calibrating the model parameters and model BC can only be eliminated at the limit where the observed data are sampled everywhere. In the real world, both the location of the aquifer boundaries and their boundary conditions are typically uncertain. As demonstrated herein, the new method applies to problems when the location of the aquifer boundaries is unknown, in which case the inversion domain is defined by the location of the measurements. This is again because the new method does not built a forward model to evaluate objective functions. A further issue with the objective-function-based methods is computation efficiency. For example, using global optimization techniques (i.e., genetic algorithm, neural net, and others), thousands or more forward models must be solved to minimize an objective function (and if BC are additionally calibrated, more forward problems must be solved). With the new method, given appropriate measurements, both the parameters and the unknown model BC can be simultaneously estimated. It is computationally efficient because the inversion only involves a single matrix solve. If appropriate approximating functions are used, the inverse grid can also be very small, leading to high computation efficiency. An exception is when the inverse method is combined with geostatistics, whereas many parameter realizations are inverted to account for the uncertainty in hydrofacies distribution [Wang et al., 2013]. Integration of the 3D method with geostatisistics will be addressed in the future.

CONCLUSION In this study, a new inverse method is presented for three-dimensional steady-state aquifer inversion where the aquifer boundary conditions are unknown. This method extends the two-dimensional study of Irsa & Zhang [2012], where its key strength lies in its computational efficiency. The formulation of the inverse method is based on (1) creating local solutions, or approximating functions, of hydraulic head and Darcy flux that satisfy the homogeneous, local flow equation; (2) enforcing the continuity of head and flux globally via a set of collocation points that lie on elemental interfaces; (3) conditioning the local solutions at the measurement locations. Because of this formulation, there is no need to fit an objective function, nor is there a need for repeated simulations of the forward flow model. Via step (3), the noisy observed data can be directly incorporated into the solution matrix, which is solved in a one-step procedure. The inversion results include hydraulic conductivities and head and flux approximating functions from which the model boundary conditions can be inferred.

Two hydraulic head approximating functions were tested, one employing quadratic approximation of the hydraulic head, the other cubic approximation. Compared to the quadratic approximating function, the cubic function leads to a faster convergence of the estimated hydraulic conductivity at a lower level of grid discretization, while it is also more robust when different flow conditions are inverted. Two different boundary conditions were also tested, one leading to linear flow, the other strongly nonlinear flow. Under both boundary conditions, the estimated conductivities converge to the true values with the refinement of the inverse grid, and the inversion results were shown to be accurate when a sufficient number of the observation data were used. Under linear flow, for example, 10 observed heads and 1 observed flow rate measurement can lead to accurate inverse solutions. Under nonlinear flow, however, 40 observed heads and 1 flow rate measurement are needed. Inversion is also successful using observation data such as 64 hydraulic heads and a single Darcy flux component. This level of data requirement is considered quite high if traditional water wells are used for the hydraulic head measurements. On the other hand, multilevel sampling wells can provide the much needed vertical resolution to obtain the measured heads in three-dimensions. These new technologies can significantly reduce the number of observation wells needed for the inversion to succeed. In this study, the observed heads are randomly sampled, although measurement location is known to be a significant factor that can impact the accuracy of parameter estimation [Hill & Tiedeman, 2007]. Based on the insights of this study, future work will explore optimal sampling locations, thus data requirement for inversion can be further reduced. Furthermore, to understand data worth, a sensitivity analysis is conducted whereby the inversion accuracy is evaluated when increasing number of the observed heads are sampled. The results of this analysis are analyzed first with the composite scale sensitivity (CSS) which can reveal the overall information content of the data. The more heads are sampled, the higher the CSS, and the more accurate the inverse solution. However, when the number of measurements is fixed, CSS cannot identify whether the particular set of the observations can lead to a reliable conductivity estimate. A one-observation-at-a-time (OAT) approach is proposed, which can identify the reliability of the estimated conductivity for a given set of the observations. To evaluate the stability of the inverse method when measurement data contain errors, a problem with 4 hydrofacies zones is inverted. The results are accurate when the measurement error is small but become slightly less accurate when the error is larger. In summary, flow condition, inverse formulation, grid discretization, observation data density and location, and measurement errors can all influence the accuracy of inversion.

This study points to an efficient way of conducting first-pass, low-cost aquifer characterization where both aquifer parameters and aquifer boundary conditions can be obtained from limited site data, prior to conducting pumping tests or other aquifer stimulation techniques. In particular, Section 2 suggests that the new method can act as a low-resolution screening model to infer the unknown site BC, which when given to PEST or other objective-function-based techniques, may improve their results. Base on the insights of this study (e.g., more measurements are needed to successfully invert nonlinear flow), future studies will investigate sensitivity measures that take into account the aquifer flow condition, which can then help identify a set of optimal observation locations. Future work will also incorporate site geostatistical data in three-dimensions to account for realistic aquifer heterogeneity and to explicitly quantify uncertainty in both parameter and boundary condition estimations. Source/sink effects, though not addressed here, will be investigated. Joint hydrological and geophysical inversion is of interest, whereby geophysical measurements correlated to the hydrological parameters can be used to provide additional constraint questions. By adding such equations to inversion, highly parameterized techniques estimating a greater number of parameters (e.g., K at each grid cell) will be attempted.

An embodiment is directed towards an inverse method to simultaneously estimate multiple hydraulic conductivities, source/sink strengths, and boundary conditions (BC), for two-dimensional confined and unconfined aquifers under non-pumping or pumping conditions. The method incorporates noisy observed data (hydraulic heads, groundwater fluxes, or well rates) at measurement locations. Given sufficient measurement data, the method yields well-posed systems of equations that can be solved efficiently via nonlinear optimization. The solution is stable when measurement errors are increased. The method is successfully tested on problems with regular and irregular geometries, different heterogeneity variances (maximum Kmax/Kmin is 10,000), and error magnitudes. Under non-pumping conditions, when error-free observed data are used to condition the inversion, the estimated conductivities and recharge rates are accurate within 8% of the true values. When data contain increasing errors, the estimated parameters become less accurate. For problems where the underlying parameter variation is unknown, equivalent conductivities and average recharge rates can be determined. Under pumping (and/or injection) conditions, a hybrid formulation is developed to address these local source/sink effects as well as the impact of different types of boundary conditions on drawdowns. Accurate results can be gained without local grid refinement at wells, inversion is thus successful with coarse grids leading to high computation efficiency. Furthermore, flux measurements are not needed for the inversion to succeed; data requirement of the method is not much different from that of interpreting classic well tests. Finally, inversion accuracy is not sensitive to the degree of nonlinearity of the flow equations. Performance of the inverse method for confined and unconfined aquifer problems is similar in terms of the accuracy of the estimated parameters, the recovered head field (including the head BC), and the speed of the nonlinear solver.

Model calibration is a standard tool for developing predictive hydrogeologic models. In both confined and unconfined aquifers, groundwater flow is not only influenced by the intrinsic hydraulic parameters of the aquifer, e.g., hydraulic conductivity (K), transmissibility (T), and storage coefficients, but also the source/sink effects due to areal recharge (or inter-formational leakage), evapotranspiration, and well operations. For a variety of scientific and management purposes, there exists a need to estimate not only the hydraulic parameters of the aquifers, but also the parameters that characterize the source/sink strengths. However, the simultaneous estimation of K (or T) and source/sink rates suffers a well-known issue of parameter identifiability. For example, if a homogenous unconfined aquifer is receiving uniform recharge, the flow equation becomes: $\nabla^2(h^2) = -2N/K$, where $\nabla^2$ is the Laplace operator and N is the recharge rate. Clearly, as long as the ratio of the recharge rate versus conductivity remains the same, infinite combinations of these two parameters can yield identical hydraulic head distribution in the aquifer. In this case, fitting or inverting only the hydraulic head data cannot lead to the unique estimations of these two parameters. This is a limitation that cannot be overcome with any inverse methods. In this study, groundwater fluxes that are sampled in the subsurface under non-pumping conditions or well rates that are sampled at the surface under pumping (or injection) conditions are used to supplement the hydraulic head measurements in developing a new steady-state inverse method for both confined and unconfined aquifers. Based on these measurements, the method is able to simultaneously estimate hydraulic conductivities and recharge rates for aquifers where both parameters are also spatially inhomogeneous. In the following sections, a brief review of the existing techniques is provided, highlighting the need and motivation for developing the new inverse method.

A variety of techniques exist for estimating aquifer conductivities and recharge rates. On the one hand, traditional aquifer test methods develop type curves based on the assumption that aquifer conductivity is homogeneous or aquifer exhibits simple layering [1], although conductivity estimated with such assumptions can exhibit "scale effect" due to aquifer heterogeneity [2-4]. Other techniques employ slug tests, borehole flowmeters, and geophysical measurements to estimate the conductivities of small aquifer volumes near wellbores [5-8]. Methods have also been developed that combine geostatistics with the inverse theory to directly infer heterogeneous aquifer conductivity while quantifying its estimation uncertainty [13-15]. In most studies, however, source/sink effects such as the recharge rates were either not accounted for, assumed to be known (e.g., negligible recharge is a common assumption), or were eliminated using specialized formulations. On the other hand, extensive investigations have been carried out to estimate aquifer recharge, usually for unconfined systems [16]: some are based on water or chemical mass balances [17-21], others infer the recharge rates from physical-based, vadose-zone or rainfall-runoff models [22-24], while still others use model calibration and the inverse theory to infer recharge as one or more unknown parameters [25]. With the exception of model calibration, which can be used to simultaneously estimate hydraulic conductivities along with the recharge rates, many methods assume aquifer conductivity to be known, homogeneous, or piecewise homogeneous. For confined aquifers, recharge typically occurs as leakage, for which inverse methods are frequently used to infer the rates [26].

The majority of the previous methods are based on minimizing an objective function, which is typically defined as a form of mismatch between the measurement data and the corresponding model simulated values. During inversion, parameters are updated iteratively using a forward model, which requires the specification of the model boundary conditions (BC). However, in real aquifers, BC are typically unknown and assumptions of model BC may not reflect the actual subsurface conditions. To address this, Irsa & Zhang [9] developed a steady-state inverse method for confined aquifers by adopting a set of approximating functions for hydraulic heads and groundwater fluxes. The method, which did not rely on objective functions, could simultaneously estimate a single K, flow fields, and BC. However, source/sink effects (e.g., recharge, well operation) could not be accommodated, while the approximating functions employ polynomials without being attributed any physical meanings. To add source/sink terms, [27] extended the method of [9] by superposing analytical flow solutions to generate the approximating functions. Using nonlinear optimization, multiple conductivities (Ks) and multiple recharge rates (Ns) were simultaneously estimated. Using observed heads and as few as a single pumping rate, the method was successfully tested on one-dimensional (1D) unconfined aquifer problems subject to various source/sink effects. Interestingly, for problems where the underlying parameter variabilities are unknown (e.g., the aquifer is assumed homogeneous with a constant recharge rate), equivalent conductivities and average recharge rates can be obtained. The method thus handles model "structure errors", whereas the inverse parameterization either simplifies or complexifies the true parameter fields. However, only 1D flows in simple geometries were tested [27]. For problems with a pumping well, local grid refinement at the well was needed to obtain accurate solutions. Despite its physical-based formulations, its ability for solving realistic problems remains unknown.

This embodiment significantly extends and enhances the earlier studies by inverting two-dimensional realistic aquifer problems with source/sink effects, for both confined and unconfined aquifers with heterogeneous conductivity and recharge rates. By developing a set of hybrid approximating functions, an improved unified theory is presented, which addresses both non-pumping and pumping conditions. The problems explored in [9] under non-pumping conditions (i.e., subsurface groundwater fluxes must be sampled) and in [27] for 1D flows under more general conditions are shown to be subsets or special cases of the unified theory. In the new formulation, well test solutions are implemented locally, thus inversion can be successfully carried out using a coarse grid, whereas local grid refinement (LGR) at the wells is not needed. This new formulation, which was not explored in the earlier studies, results in significant computational savings as the inversion system of equations remains small. Although using well tests to infer aquifer parameters has been investigated extensively in the literature for both homogeneous and heterogeneous media [28-35], areal source/sink effects are almost always ignored and the aquifer boundaries must be placed far away from the well (alternatively, a suitably small aquifer K or well pumping rate was assumed). Therefore, with these methods, neither areal source/sink nor aquifer BC can influence pumping and the associated drawdowns. In the new formulation, for both confined and unconfined aquifers, BC can significantly affect drawdowns at the wells, e.g., a barrier wall placed close to a well resulting in increased drawdown compared to that of an infinite-BC solution. In addition, drawdowns can be simultaneously impacted by BC and areal recharge, which does not affect the accuracy of parameter and BC estimation. The new method can therefore address realistic problems where pumping (and/or injection) can be influenced by areal source/sink and nearby boundary characteristics.

The goals of this study are three-fold: (1) we investigate the new physical-based approach (i.e., hybrid formulation) for inverting flows in confined and unconfined aquifers under both non-pumping and pumping conditions. (2) For problems where the underlying heterogeneities are unknown, we investigate whether equivalent conductivities and average recharge rates can be found. That is, at hydrogeological sites where highly detailed measurements are unattainable, can inverse methods provide estimates of large scale aquifer parameters that can represent the effects of unresolved small-scale variations? As demonstrated in a suite of upscaling studies [11-12], simplified hydrofacies models with equivalent parameters can capture certain bulk flow and conservative tracer transport behaviors without resolving all the detailed heterogeneity. (3) Comparing the performance of the inverse method between confined and unconfined flow problems, is the inversion accuracy affected by the degree of nonlinearity in the flow equation?

A fundamental contribution of our series of studies is to prove, via the new inverse method, that boundary condition information is not needed for estimating parameters, i.e., both the conductivities and the recharge rates. With the objective-function-based inversion approaches, hydraulic head and flux BC must be specified along the entire model boundary, because these methods require the repeated forward simulations of a BVP in order to minimize the objective function. For example, the often-adopted no-flux BC is in effect specifying a zero flux across the Neumann-type boundaries. One issue with these approaches lies in the fact that BC are typically unknown in real aquifers, and if a wrong set of BC is assumed, parameters estimated using objective functions are likely non-unique. As demonstrated in [9], two different sets of BC can give rise to two different flow fields both of which can perfectly fit the same observation data (3 heads and 1 flow rate), yielding a zero objective function. Although BC can be calibrated to evaluate its impact on parameter estimation, such an approach is likely to be inefficient. As demonstrated in [9], infinite combinations of parameters and BCs can satisfy the same observed data and non-uniqueness in calibrating the model parameters and model BC can only be eliminated at the limit where the observed data are sampled everywhere. These issues motivated our studies where we have demonstrated, both previously and in this work, that groundwater fluxes or well rates that are sampled anywhere in the solution domain can effectively replace the need for specifying the model BC. Moreover, another issue with the objective-function based approaches is computation efficiency. For example, using global optimization techniques (i.e., genetic algorithm, neural net, and others), thousands or more boundary value problems (BVPs) must be solved in the forward mode to minimize the objective function (and if BC are also calibrated, more BVPs must be solved). In our method, given appropriate measurement data, both parameters and unknown model BC can be simultaneously estimated without objective functions. It is computationally efficient because the inversion involves a single step of equation assemblage—repeated solutions of the BVPs are not needed (an exception is when the inverse method is combined with geostatistics, whereas many parameter realizations are inverted to account for uncertainty in the static data [36]).

In an embodiment, the groundwater flow equations and the unified inverse theory implementing a hybrid formulation are introduced first, which are followed by results testing the method for a variety of confined and unconfined aquifer problems. In each test set, synthetic forward flow models are used to generate the true observation data under a set of true model BC. These data are provided to inversion to estimate model parameters and model BC, which are then compared against those of the forward models. The issue related to model "structure errors" is also explored by estimating equivalent or average parameters when the parameter variability is unknown to inversion.

Theory

This study focuses on the inversion of a single confined or unconfined aquifer. In this section, mathematical equations describing groundwater flow are first presented, followed by the introduction of the inverse theory, the fundamental approximating functions of inversion, and the nonlinear solution techniques employed. Similar to [9], the Dupuit-Forchheimer assumption is adopted here, which assumes negligible vertical flow. The aquifer can therefore be modeled in two-dimensions along the horizontal plane. For homogeneous aquifers, a "rule of thumb" was proposed by Haitjema and Mitchell-Bruker [10], defining conditions under which the Dupuit-Forchheimer assumption is applicable:

$$L \gg \sqrt{\frac{K_H}{K_V}} H,$$

where $K_H$ and $K_V$ are horizontal and vertical conductivities ($K_H/K_V$ is 1.0 in our cases), L is distance between hydrogeological boundaries (i.e., lateral length of aquifer domains in this work), and H is aquifer thickness. All the test problems of this study are designed following this criterion, which results in negligible vertical flow, even when conductivity and recharge rates are inhomogeneous.

Under the Dupuit-Forchheimer assumption, steady state groundwater flow equation in a confined aquifer with source/sink effects is written as:

$$\frac{\partial}{\partial x}\left(Kb\frac{\partial h(x,y)}{\partial x}\right) + \frac{\partial}{\partial y}\left(Kb\frac{\partial h(x,y)}{\partial y}\right) + N(x,y) + Q\delta(x_0, y_0) = 0 \text{ on } \Omega \quad (34)$$

where h(x,y) is hydraulic head [L], K is depth-averaged, locally isotropic hydraulic conductivity [L/T], N(x,y) is areal source/sink rate [L/T] (only recharge is investigated), Q is pumping or injection rate at point ($x_0$, $y_0$) [L³/T] (wellbore radius is assumed zero), b is the saturated thickness, $\Omega$ is the solution domain. All the aquifer problems in this work have a horizontal base which is set as the hydraulic head datum.

Model Boundary Conditions are a Combination of No-Flux and the Dirichlet-Type Boundary Conditions:

$$h = g(x;y) \text{ on } \Gamma \quad (36)$$

where $\Gamma$ is the Dirichlet-type domain boundary and g(x; y) describes a set of specified heads on $\Gamma$.

Under the same Dupuit-Forchheimer assumption, steady state groundwater flow equation in an unconfined aquifer with source/sink effects is written as:

$$\frac{\partial}{\partial x}\left(Kh(x,y)\frac{\partial h(x,y)}{\partial x}\right) + \frac{\partial}{\partial y}\left(Kh(x,y)\frac{\partial h(x,y)}{\partial y}\right) + N(x,y) + Q\delta(x_0, y_0) = 0 \text{ on } \Omega \quad (37)$$

where h(x,y) is unconfined aquifer hydraulic head which is identical to the saturated thickness for the chosen head datum. Similar to the boundary conditions of the confined aquifer, no-flow and Dirichlet boundaries are used.

Inverse Method

The inversion method enforces two constraints: (1) global continuity of the hydraulic head and Darcy fluxes throughout the solution domain $\Omega$; (2) local conditioning of the inverse solution to observed hydraulic heads, fluxes, and/or flow rates. The continuity equations are written as:

$$\int R_h(\Gamma_j)\delta(p_j-\varepsilon)d\Gamma_j = 0, j = 1, \ldots, m \quad (37)$$

$$\int R_q(\Gamma_j)\delta(p_j-\varepsilon)d\Gamma_j = 0, j = 1, \ldots, m \quad (38)$$

where $R_h(\Gamma_j)$ and $R_q(\Gamma_j)$ are the residuals of the approximating functions of hydraulic head and Darcy fluxes at the jth cell boundary (or element interface) in the inversion grid, respectively. m is the total number of element interfaces. $\delta(p_j-\varepsilon)$ is the Dirac delta weighting function which samples the residual functions at a set of collocation points on $\Gamma_j$. A value of 1.0 is assigned to this function; the continuity constraint is therefore strongly enforced. Both residual equations can be further expanded as:

$$R_h(\Gamma_j) = \bar{h}^i(\Gamma_j) - \bar{h}^k(\Gamma_j) \quad (39)$$

$$R_q(\Gamma_j) = \bar{q}^i(\Gamma_j) - \bar{q}^k(\Gamma_j) \quad (40)$$

where $\bar{h}$ and $\bar{q}$ are a set of proposed fundamental solutions of inversion (next). i and k denote cells in the inversion grid adjacent to each element interface $\Gamma_j$. For 2D inversion in a horizontal coordinate (x,y), $\bar{q} = [q_x, q_y]$.

The fundamental solutions are conditioned at measurement locations:

$$\delta(p_j-\varepsilon)(\bar{h}(p_j) - h^o) = 0 \quad (41)$$

$$\delta(p_j-\varepsilon)(\bar{q}_x(p_j) - q_x^o) = 0 \quad (42)$$

$$\delta(p_j-\varepsilon)(\bar{q}_y(p_j) - q_y^o) = 0 \quad (43)$$

where $p_j$ is a measurement point, $h^o$, $q_x^o$ and $q_y^o$ are the measured head and flux data, $\delta(p_j-\varepsilon)$ is a weighting function assigned to the equations to reflect the magnitude of the measurement errors. $\delta(p_j-\varepsilon)$ is generally proportional to the inverse of the error variance [26]. When measurement error is high, the weighting function is adjusted to be smaller; when measurements are error free, $\delta(p_j-\varepsilon) = 1$. In this study, for select aquifer problems, inverse results under both error-free and random measurement errors are investigated to evaluate the accuracy and instability of the inversion outcomes with increasing data errors.

Equations (42) and (43) are optional. When non-pumping conditions are investigated, these equations must be available to inversion to allow the unique and simultaneous estimation of the parameters (see discussion in the Introduction). In these cases, subsurface fluxes must be sampled and provided to inversion as observation data in addition to the hydraulic heads. However, under pumping conditions, the pumping and/or injection rates (Q) are considered known observation data. In these cases, subsurface flux sampling is not needed and Equations (42) and (43) are not used.

Fundamental Solutions

A key component of the physical-based inverse method is the adoption and superposition of analytical groundwater flow solutions as the fundamental solutions of inversion. The analytical solutions are developed for homogeneous aquifers with uniform hydraulic conductivity and recharge rate; therefore the analytical solutions are applicable to describing flow in either individual grid cells or within individual homogeneous hydrofacies zones. Under this assumption, Eqn (34) of the confined aquifer becomes:

$$Kb\frac{\partial}{\partial x}\left(\frac{\partial h(x,y)}{\partial x}\right) + Kb\frac{\partial}{\partial y}\left(\frac{\partial h(x,y)}{\partial y}\right) + N(x,y) + Q\delta(x_0, y_0) = 0 \text{ on } \Omega i \quad (44)$$

where K, N, b and Q are the hydraulic conductivity, recharge rate, saturated thickness of the homogeneous sub-domain ($\Omega i$), and pumping or injection rate inside $\Omega i$, respectively. For this equation, an analytical solution can be found:

$$\bar{h}(x, y) = a_1 + a_2 x + a_3 y + a_4 xy - \frac{N}{2Kb}(a_5 x^2 + (1-a_5)y^2) + \frac{Q}{2\pi Kb}\ln((x-x_0)^2 + (y-y_0)^2)^{\frac{1}{2}} \tag{45}$$

where $a_1, a_2, a_3, a_4$ and $a_5$ are the unknown coefficients. In Eqn. (45), the first four terms reflect a background flow field due to large scale hydraulic boundary effect extending beyond $\Omega_i$; the $5^{th}$ term describes flow induced from local recharge internal to $\Omega_i$, and the last term describes pumping or injection induced change on the hydraulic head internal to $\Omega_i$. Using Darcy's law, analytical solutions of the Darcy flux can be approximated as $$\bar{q}_x(x,y) = -K\left(a_2 + a_4 y - a_5 x \frac{N}{Kb} + \frac{Q(x-x_0)}{2\pi Kb((x-x_0)^2 + (y-y_0)^2)}\right) \tag{46}$$

$$\bar{q}_y(x,y) = -K\left(a_3 + a_4 x - (1-a_5)y \frac{N}{Kb} + \frac{Q(y-y_0)}{2\pi Kb((x-x_0)^2 + (y-y_0)^2)}\right) \tag{47}$$

In inversion, K and N of the local sub-domain are unknown parameters to be estimated. Eqn. (11) is discretized over the inversion grid and the above coefficients become cell-wise constants: $x^T = [a_1^l, a_2^l, a_3^l, a_4^l, a_5^l, K^l, N^l]$, $l=1, \ldots, M$ (number of grid cells), where x is the inverse solution, the superscript $T$ denotes transpose. In this work, a deterministic zoned parameterization scheme is adopted to populate K and N in the aquifer. With this scheme, the number of equations to be solved are reduced and the solution becomes: $x^T = [a_1^l, a_2^l, a_3^l, a_4^l, a_5^l, K^m, N^n]$, $l=1, \ldots, M$, $m=1 \ldots, R$ (number of hydraulic conductivity zones), $n=1, \ldots, H$ (number of recharge zones). Other than the imposed parameter zonations, however, no other prior information equations are used in inversion.

In the case of an unconfined aquifer subject to areal recharge to the water table, the flow equation of a locally homogeneous sub-domain ($\Omega i$) is:

$$K\frac{\partial}{\partial x}\left(h(x,y)\frac{\partial h(x,y)}{\partial x}\right) + K\frac{\partial}{\partial y}\left(h(x,y)\frac{\partial h(x,y)}{\partial y}\right) + N(x,y) + Q\delta(x_0, y_0) = 0 \text{ on } \Omega i \tag{48}$$

where N and K are parameters that are also constant in the sub-domain. Similarly, analytical solution of hydraulic head in the sub-domain is:

$$\bar{h}(x,y) = -K\left(a_1 + a_2 x + a_4 xy - \frac{N}{K}(a_5 x^2 + (1-a_5)y^2) + \tag{49}\right.$$

-continued $$\left. \frac{Q}{2\pi K}\ln((x-x_0)^2 + (y-y_0)^2)\right)^{\frac{1}{2}} \text{ on } \Omega i$$

The analytical solutions of the Darcy flux are written as:

$$\bar{q}_x(x,y) = -K\frac{a_2 + a_4 y - a_5 x \frac{2N}{K} + \frac{Q(x-x_0)}{\pi K((x-x_0)^2 + (y-y_0)^2)}}{2\left(a_1 + a_2 x + a_3 y + a_4 xy - \frac{N}{K}(a_5 x^2 + (1-a_5)y^2) + \frac{Q}{2\pi K}\ln((x-x_0)^2 + (y-y_0)^2)\right)^{\frac{1}{2}}} \tag{50}$$

$$\bar{q}_y(x,y) = -K\frac{a_3 + a_4 x - (1-a_5)y \frac{2N}{K} + \frac{Q(y-y_0)}{\pi K((x-x_0)^2 + (y-y_0)^2)}}{2\left(a_1 + a_2 x + a_3 y + a_4 xy - \frac{N}{K}(a_5 x^2 + (1-a_5)y^2) + \frac{Q}{2\pi K}\ln((x-x_0)^2 + (y-y_0)^2)\right)^{\frac{1}{2}}} \tag{51}$$

Similar to the confined aquifer case, both the conductivity and the recharge rate are distributed in the model with a zoned parameterization scheme.

For both confined and unconfined problems, this study first investigates problems without pumping or injection for which subsurface flux measurements must be sampled and provided to inversion as observation data. For these problems, the approximating functions can be obtained by setting Q=0 in Equations (44)-(51). For problems where the underlying parameter variability(s) are unknown, inversion aims to estimate a set of equivalent or average parameters, e.g., equivalent $K_{eq}$ and an average recharge rate ($\tilde{N}$). To estimate these parameters, the parameterization scheme of the inverse method is slightly modified. For example, the measurement data can be sampled from a problem with many hydraulic conductivity and recharge zones, but the solution becomes: $x^T = [a_1^l, a_2^l, a_3^l, a_4^l, a_5^l, K_{eq}, \tilde{N}]$ (K and N are assumed homogeneous in the entire solution domain, thus the estimates are one equivalent conductivity and one average recharge rate), or $x^T = [a_1^l, a_2^l, a_3^l, a_4^l, a_5^l, K1_{eq}, K2_{eq}; \tilde{N}1, \tilde{N}2]$ (two equivalent conductivity zones and two recharge zones are identified), etc.

For the previous problems, this study next investigates situations with pumping and injection wells (in these problems, subsurface flux measurements are not needed). To represent pumping and injection induced changes on aquifer heads, Equations (44)-(51) are implemented in a hybrid formulation where the well rate Q is specified to the well cell only (i.e., inverse grid cell which hosts the well) but is zero outside the well cell. In this formulation, the size of the well cell must be adjusted so it is sufficiently large to accommodate a number of measured heads from nearby observation wells with approximately the same values. This size is also influenced by the closeness of the aquifer boundaries—if the influence from boundary conditions to pumping or injection is significant, the well cell dimension is accordingly reduced but the hydraulic head approximating function is still approximately symmetric inside the cell. On the other hand, if the BC influence to pumping or injection is insignificant, the well cell can encompass a large area. Note that the adoption of the hybrid formulation leads to significant computational savings, as the number of unknown coefficients is reduced compared to that using local grid refinement in order to capture high-gradient flows [27]. In inverting higher dimensional problems, local grid refinement at each well location can lead to significantly larger equation systems, incurring higher computational cost.

For any of the confined or unconfined problems, once the inverse solution is found, i.e., both the estimated parameters and a set of recovered head and flux approximation functions (one set for each inversion grid cell), hydraulic head boundary conditions can be obtained by sampling the appropriate head functions at the boundary locations. Similarly, flux boundary conditions can be obtained by sampling the appropriate flux functions at the boundaries. In this work, all inverted boundary conditions are presented as hydraulic head values.

Solution Techniques

Equations (39) and (40) are written for all the m cell interfaces in the inversion grid; equations (41)-(43) are written at the locations where the measurement data are available. The systems of equation are assembled, which can be under-determined, exact, or over-determined (for the aquifer problems of this study, all systems of equations are over-determined because under-determined problems generally yielded poor solutions). The coefficients of the fundamental solutions are the unknowns, along with the parameters to be estimated. Due to nonlinearity in the fundamental solutions, all equations are nonlinear and are solved with two gradient-based local optimization algorithms, i.e., Levenberg-Marquardt and Trust-Region-Reflective. Both algorithms are implemented in a Matlab nonlinear solver, lsqnonlin, which solves a nonlinear least-squares problem of the form (The Mathworks, 2012):

$$\min_x \|f(x)\|_2^2 = \min_x (f_1(x)^2 + f_2(x)^2 + \ldots + f_n(x)^2) \quad (52)$$

where x is the solution of the system of equations, n is the number of equations. With lsqnonlin, constraints can also be placed on the values of x, e.g., enforcing positive values for K and the recharge rates.

The optimization algorithm requires that initial guess of x be provided. For the confined aquifer cases, the initial guess ($x_0$) was given an arbitrary set of values. For well-posed problems (e.g., measurement data are of sufficient density and accuracy), numerical experiments with different sets of $x_0$ yielded identical results. However, for the unconfined aquifer cases, arbitrary $x_0$ values can lead to non-convergence of the iterative solver. These problems have a greater degree of nonlinearity compared to the confined aquifer problems. Thus, the initial guess ($x_0$) was computed by minimizing equations (41)-(43) with a one-cell inversion grid (the continuity equations were excluded from the system of equations). The values obtained were then used as the initial guess for the full inversion. This approach is similar to fitting an analytical model to an equivalent homogeneous media of the heterogeneous aquifer, and therefore $x_0$ values reflect a set of equivalent parameters. With this treatment, inversion yielded stable results for all the unconfined aquifer problems tested.

In generating $x_0$, the hydraulic conductivity or recharge parameterization needs not be identical to that adopted in full inversion. For example, we can estimate a single conductivity value or a single recharge rate even if the full inversion estimates a number of conductivities and recharge rates. These single initial guesses, in effect, provide a set of rough averages for these parameters. Numerical experimentations indicate that when the problem is well conditioned by data, starting the full inversion with different $x_0$ yields identical outcomes. Another benefit for the reduced parameterization approach is that reasonable $x_0$ values can be generated with few measurement data, which is useful in field reconnaissance situations where initially only limited data are available.

The new inverse method, similar to the objective-function based inversion approaches, may suffer ill posedness when insufficient and/or noisy data are supplied to condition the solution. Thus, (1) solution may not exist; (2) solution may not be unique; (3) solution may be unstable. Generally, the accuracy of the inverse method depends on the location, quantity, and quality (accuracy) of the observation data. Given sufficient and accurate data which yield exact or over-determined systems of equations, the inverse method becomes well-posed, leading to fast, stable, and accurate solutions. In this work, sufficient measurement data (of varying qualities) are provided to inversion, leading to a set of over-determined equations.

Results

The inversion outcome is verified by comparing the estimated parameters (hydraulic conductivities, recharge rates) and the recovered hydraulic head field (including the boundary head) to those of several synthetic "true" models. These synthetic problems are used to generate the "true" observation data under a set of true model BC. These problems are created with detailed finite-difference forward flow simulations by MODFLOW2000, which is implemented in the software Groundwater Vista with a graphic user interface. However, Vista adopts the English units. In the following paragraphs, dimensions for all relevant quantities implicitly assume a consistent set of units (head in ft, K and N are in ft/d, q in ft/d, Q in ft$^3$/d), thus units of some parameters are not labeled. The synthetic problems employ either a regular or irregular computational domain, as explained below.

For the regular-domain problems, seven confined aquifer cases are first investigated. For cases 1 to 6, pumping and injection wells are not used (all wells are observation wells), for which a set of Ks and Ns are estimated. For cases 5 and 6, equivalent $K_{eq}$ and mean $\tilde{N}$ are estimated to evaluate the issues associated with model structure errors. For case 7, a confined problem is solved with one pumping well and one injection well (pumping rates are assumed known to inversion). Next, three unconfined aquifer cases are investigated, without pumping and injection wells. For one of the cases, equivalent parameters are estimated.

For the irregular-domain problems, one confined aquifer problem is inverted first, without and with pumping and injection wells. An unconfined problem is inverted next, without and with wells.

For the selected cases above, stability tests are conducted to evaluate the accuracy of the outcomes under increasing magnitude of the head measurement errors. As the true model is a solution of the finite difference method (FDM), measurements sampled from this solution ("true heads") are considered approximately error-free, but they do contain minor discretization and other solution errors. To impose measurements errors, hydraulic heads computed by the FDM are corrupted by noise: $h^m = h^{FDM} \pm \Delta h$, where $h^m$ is the measured head provided to inversion, $h^{FDM}$ is the head sampled from the FDM, and $\Delta h$ is the measurement error or noise. The highest noise imposed on the true head is ±5% of the total head variation. These variations are fairly large, i.e., $\Delta h$ of ±5% results in a set of head measurements that fluctuate over an interval that is 10% of the total head change in the system. The larger errors are imposed mainly to test stability of the inversion. In this work, we assume that only hydraulic head data are subject to errors. Measurements of Darcy fluxes, when sampled from the FDM model, are not corrupted by noises. For the cases investigating pumping tests, the true well rates are provided to inversion without errors.

Regular Domain

Confined Aquifer Cases

In the first 4 cases, the FD true models (50×50 grid; $L_x$=1000 ft, $L_y$=1000 ft) are a suite of numerical solutions of two-dimensional groundwater flow in a confined aquifer driven by various leakage rates under otherwise similar boundary conditions (FIG. 23). True parameter values of each model are presented in Table 4.

less accurate. In this case, the inverted head profile overestimates the true head profile by ~10% in the low-conductivity K1 zone, but head profile is accurate in the high-conductivity K2 zone. For all the error levels tested, the inversion is stable. FIG. 25 further compares the hydraulic head contours for the three tested error levels. This comparison suggests good to fair accuracy in the head recovery

TABLE 4

Inversion outcomes for cases 1 to 4 (confined aquifer). The estimated K and N parameters are in unit of ft/d.

| True model | Estimated parameters (no error) | Estimated parameters (±1% head error) (±0.1 ft) | Estimated parameters (±5% head error) (±0.5 ft) | Inversese grid | Measured Data[*1] |
|---|---|---|---|---|---|
| case 1 K1 = 1; K2 = 10 <br> N = $10^{-4}$ | K1 = 0.99; K2 = 9.5 <br> N = $9.28 \times 10^{-5}$ | K1 = 0.91; K2 = 8.89 <br> N = $8.6 \times 10^{-5}$ | K1 = 0.6; K2 = 1.84 <br> N = $4 \times 10^{-5}$ | 2 × 2 | 24 h + 1 $q_y$ |
| case 2 K1 = 1; K2 = 10 <br> N1 = $10^{-4}$ <br> N2 = $5 \times 10^{-4}$ | K1 = 1; K2 = 10.04 <br> N1 = $1.01 \times 10^{-4}$ <br> N2 = $5.03 \times 10^{-4}$ | K1 = 0.69; K2 = 6.79 <br> N1 = $9.84 \times 10^{-5}$ <br> N2 = $3.41 \times 10^{-4}$ | K1 = 0.14; K2 = 1.1 <br> N1 = $4.06 \times 10^{-5}$ <br> N2 = $5.05 \times 10^{-3}$ | 2 × 2 | 24 h + 1 $q_y$ |
| case 3 K1 = 0.1 <br> K2 = 1000 <br> N1 = $10^{-4}$ <br> N2 = $10^{-3}$ | K1 = 0.102 <br> K2 = 913.9 <br> N1 = $1.01 \times 10^{-4}$ <br> N2 = $9.9 \times 10^{-4}$ | K1 = 0.095 <br> K2 = 460.12 <br> N1 = $1.12 \times 10^{-4}$ <br> N2 = $5.99 \times 10^{-4}$ | K1 = 0.036 <br> K2 = 19.16 <br> N1 = $7.29 \times 10^{-5}$ <br> N2 = $1.16 \times 10^{-5}$ | 2 × 2 | 24 h + 4 $q_y$ |
| case 4 K1 = 1; K2 = 100 <br> K3 = 10 <br> N1 = $10^{-4}$ <br> N2 = $10^{-3}$ <br> N3 = $5 \times 10^{-4}$ | K1 = 1; K2 = 102.64 <br> K3 = 10.37 <br> N1 = $1.01 \times 10^{-4}$ <br> N2 = $10^{-3}$ <br> N3 = $5.19 \times 10^{-4}$ | K1 = 0.99; K2 = 99.9 <br> K3 = 10.13 <br> N1 = $9.95 \times 10^{-5}$ <br> N2 = $9.12 \times 10^{-4}$ <br> N3 = $4.94 \times 10^{-4}$ | K1 = 0.43; K2 = 0.17 <br> K3 = 0.02 <br> N1 = $5.31 \times 10^{-5}$ <br> N2 = $5.6 \times 10^{-6}$ <br> N3 = $1.25 \times 10^{-6}$ | 2 × 3 | 36 h + 1 $q_y$ |

*1 'h' denotes heads; $q_x$ or $q_y$ denote flux components.

For cases 1 and 2, 24 heads were measured at 24 fictitious observation well locations along a quasi-regular grid. A single flux component ($q_y^o$) was measured in the top leftmost corner of the model. For case 3, the same 24 head measurements were made, but 4 flux components were measured randomly. Compared to cases 1, 2, and 4, where K variation ranges from small to modest (i.e., the highest $K_{max}/K_{min}$ is 100), case 3 investigates strong aquifer K variation with a $K_{max}/K_{min}$ of 10,000. For case 4, 36 heads in a quasi-regular pattern and 1 flux at the top leftmost corner of the model were measured. In this case, more parameters are estimated compared to those of the other cases (FIG. 1c). Accordingly, more measurement data were used and provided to inversion.

For all cases, when error-free head data are used to condition the inverse solutions, the estimated conductivities and recharge rates are close to those of the true models, i.e., an absolute estimation error (i.e., $|K_{true}-K_{est}|$) is ~5% of the true parameter values, with the largest error of ~8%. When observed heads with ±1% measurement error are used, the estimated conductivities and recharge rates are still reasonable, with an absolute relative error (i.e., $|K_{true}-K_{est}|/K_{true} \times$ 100%) up to 14%. When the head error is ±5%, parameter estimation becomes less accurate—the maximum absolute relative error is now up to 90%. However, all cases tested yield stable solutions. It is important to point out that all the inverse solutions are computed with small grids (Table 4). Therefore, the inversion systems of equation are accordingly small, leading to high computation efficiency. Typically, one inversion run takes about 1~3 seconds to complete on a PC laptop.

In case 3, $K_{max}/K_{min}$ tested is 10,000. FIG. 24 presents its computational domain and the comparison between the inverted heads and the true FD heads along a 1D profile which extends from the inlet boundary to the outlet boundary. With a small (2×2) grid, the inverted heads are very accurate throughout this profile. However, when the head measurement error reaches ±5%, the inverted heads become throughout the computational domain. The accuracy degrades with increasing head measurement errors, as expected.

Two additional confined aquifer problems are solved. case 5 has a computational domain, grid size, K values, and observation data sampling locations that are identical to those of case 4. However, in simulating its true model, N is specified zero throughout the model domain. Without any measurement errors, the inversion yields: K1=1, K2=82.8 and K3=7.7, N1=$-1.19 \times 10^{-6}$, N2=$1.92 \times 10^{-5}$ and N3=$-1.57 \times 10^{-7}$. The estimated recharge rates are close to zero, while the conductivities are close to the true values. Clearly, the inversion method is robust and is insensitive to this model structure error, i.e., inverse parameterization complexifies the true parameter field. Also, the inversion outcomes can reveal spurious parameters (i.e., recharge rates) while the simultaneous estimation of the non-spurious parameters (e.g., conductivities) is not affected.

Case 6 has the same true model and observation data as those of case 4, except its conductivity and recharge parameterizations are modified to those of a two-zoned model (see the dashed line in FIG. 23c; in inversion, a 2×2 grid is used, which honors the lateral interface between the two zones.) Clearly, inverse parameterization simplifies the true parameter field, resulting in model structure errors. Given zero measurement errors of the observed data, the estimated conductivities and the recharge rates are: K1=1.13, K2=13.79, N1=$2.08 \times 10^{-4}$ and N2=$1.4 \times 10^{-3}$. These values are fairly close to the analytical equivalent conductivities and recharge rates that are independently computed for the true model: $K1_{eq}$=1.66, $K2_{eq}$=15.6, $\tilde{N}1$=$4.6 \times 10^{-4}$ and $\tilde{N}2$=$7 \times 10^{-4}$. Because the new inverse method is physical-based, the estimated two-zoned parameters are physically meaningful and they reflect equivalent or average parameters. Finally, deviation between the two sets of parameters is believed to be a result of (1) limited measurement data, (2) finite arithmetic in numerical inversion, and (3) inversion is for a finite domain while analytical conductivities are strictly calculated for an infinite domain.

Figure 26A:
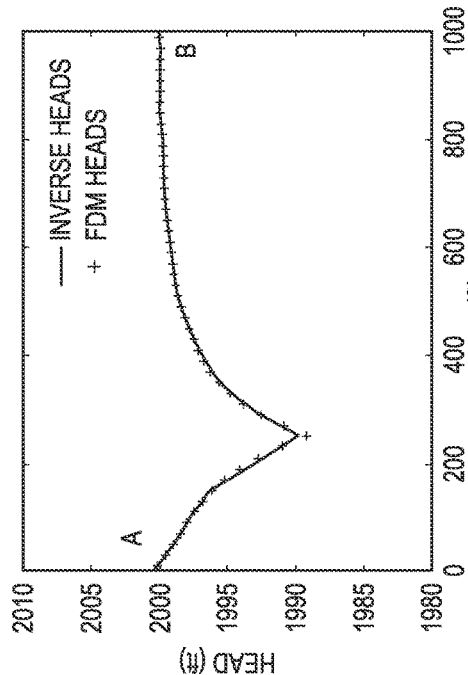
Figure 26B:
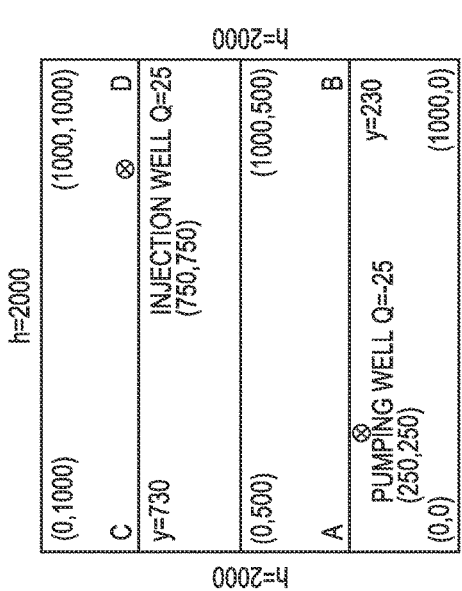
Figure 26C:
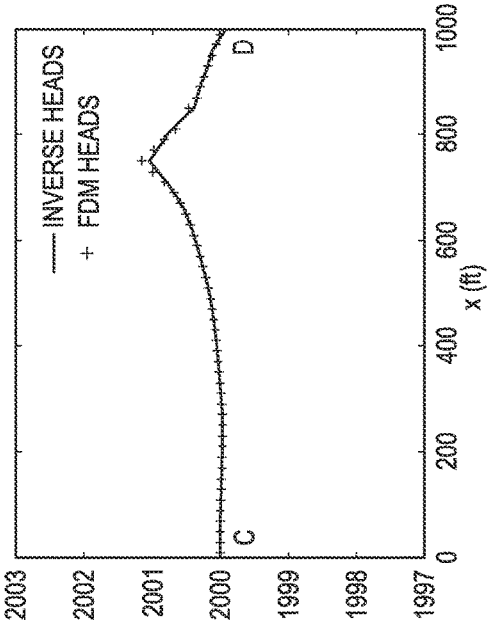

Case 7 has a set of pumping and injection wells that operate at the same rate, i.e., 25 ft³/d. Both wells are placed close to the model boundaries (FIG. 26), and as a result, drawdown at the wells is significantly influenced by the characteristics of the boundary conditions (recharge effect, which can mask the boundary effect, is not modeled). Two sets of true BC are tested: a constant head of 2000 ft is specified to the entire model boundary (FIG. 4, $a$, $b$, $c$); and a similar boundary is specified except the left-hand-side model is no flow (FIG. 4, $e$, $f$, $g$). From the forward model, 144 hydraulic heads are sampled. The inversion outcomes are presented as a set of recovered heads against true FDM heads along two model profiles (AB, CD), both of which are placed close to the wells. For the two sets of BC, the head recovery is excellent for both profiles. Under the first set of BC (specified constant head), asymmetry in the drawdown that is predicted by the forward model at locations close to the boundaries (i.e., the bottom left corner and the top right corner) is captured very well by the inverse solution. Similarly, under the second set of BC (specified constant head and a no-flow), asymmetry in the forward solution is also captured by inversion: due to the no-flow boundary at the left-hand-side of the model, both solutions display lower heads that fall perpendicular to the no-flow boundary—the head values here are lower than the heads on the other side of the well where drawdown is not significantly influenced by the right-hand-side boundary which lies far from the well. Clearly, for problems with wells, the inverse method can account for the effects of different types of boundaries on drawdowns, while many existing methods cannot. For both problems, the estimated parameters are also presented showing good accuracy (Table 5).

TABLE 5

Inversion outcomes for case 7 (confined aquifer). The estimated K and N parameters are in unit of ft/d. BC1 refers to constant specified heads along the entire model boundary; BC2 refers to a similar set of the model boundary except the left-hand-side model is no-flow.

|  | True model | Estimated parameters (no error) | Inverse Grid | Measured Data |
| --- | --- | --- | --- | --- |
| BC1 | K1 = 1 | K1 = 1.08 | 12 × 12 | 144 heads + pumping + injection rates |
|  | K2 = 10 | K2 = 13.4 |  |  |
| BC2 | K1 = 1 | K1 = 1.09 | 12 × 12 | 144 heads + pumping + injection rates |
|  | K2 = 10 | K2 = 12.4 |  |  |

Unconfined Aquifer Cases

The true models are simulated with a 3D FDM (50×50×20) in a domain that is 1000×1000×40 ft³ (FIG. 27). Inversion results of both cases are presented in Table 6.

Figure 28D:
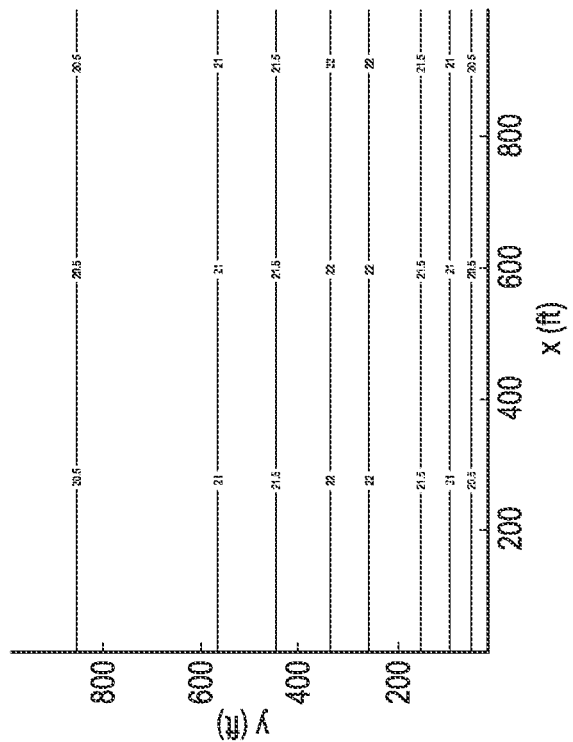
Figure 28C:
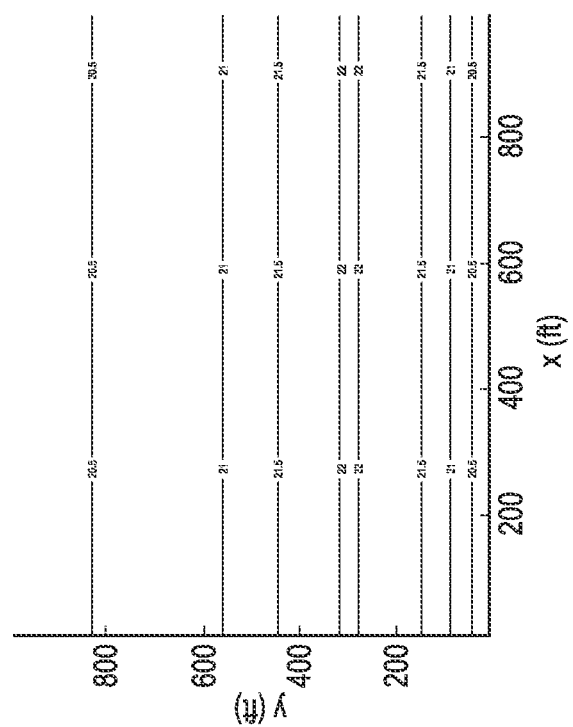

Both cases use a 2D inverse grid of 2×2 cells. Case 1 has a uniform K and a uniform N. The observation data are sampled from 24 observation wells on a horizontal plane at z=10 ft (well pattern is semi-regular). case 2 has two conductivity zones and the same uniform N. The same observation data are sampled. For both cases, inversion results are excellent when the head measurement error is either zero or very small. As expected, accuracy degrades with increasing error magnitude. For case 2, FIG. 28 shows a comparison of the head contours of the true model and the inversion results under increasing measurement errors. The inverse methods are stable in all these problems. The small inversion grid again yields small systems of equations, for which the computational speed is similar to that observed above when inverting the confined aquifer problems.

In addition, model structure error is investigated for another unconfined problem. The true 3D model is similar to FIG. 27, except three different parameter zones are defined where the domain is divided in the y-direction as: (K1=1, N1=2.0×10⁻⁴) with y∈[0, 300], (K2=25, N2=5.0×10⁻³) with y∈[300, 700], and (K3=5, N3=1.0×10⁻³) with y∈[700, 1000]. In the 2D inverse formation, two parameter zones are defined (y∈[0, 500] and y∈[500, 1000]), i.e., simplifying model structure error. A 2×2 inverse grid is used. Based on 24 observed heads and 2 observed flux components sampled from the forward model, the inversion obtains: K1=1.08; K2=7.24; N1=1.0×10⁻³; N2=5.5×10⁻³. In comparison, the equivalent conductivities and the average recharge rates for this 2-zoned problem can be computed analytically as: $K1_{eq}$=1.62; $K2_{eq}$=7.35; Ñ1=2.1×10⁻³; Ñ2=2.6×10⁻³. Again, the comparison is reasonable. The inverse solution also recovers the hydraulic head field which is close to the FDM-computed true head field (not shown).

Irregular Domain

The inverse method is proven accurate and robust when simple computational domains are investigated. In this section, for a confined and then an unconfined aquifer problem, inversion of more complex aquifer geometries and flow patterns is of interest.

Confined Aquifer

Figure 29A:
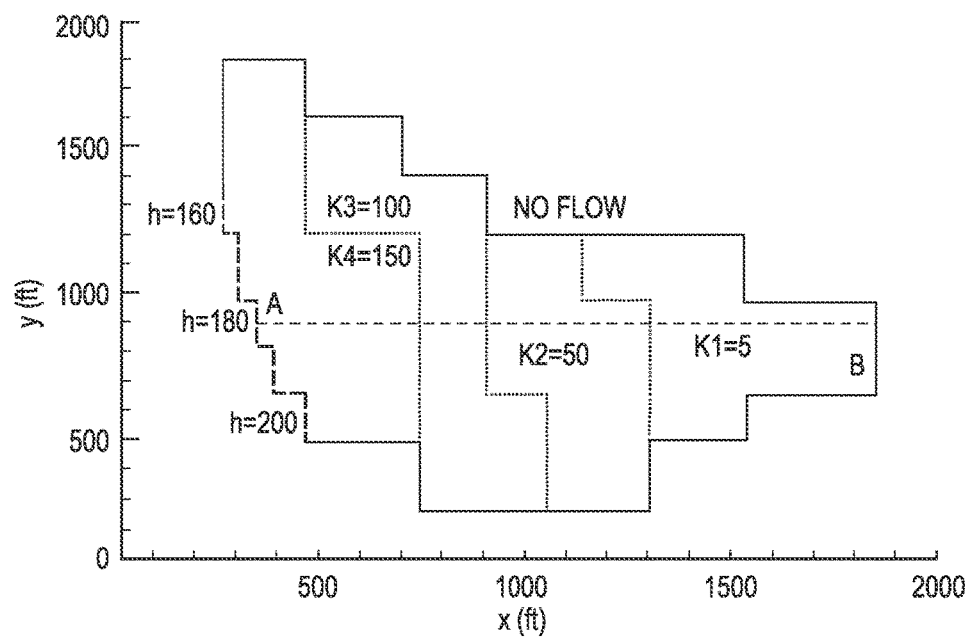
Figure 29B:
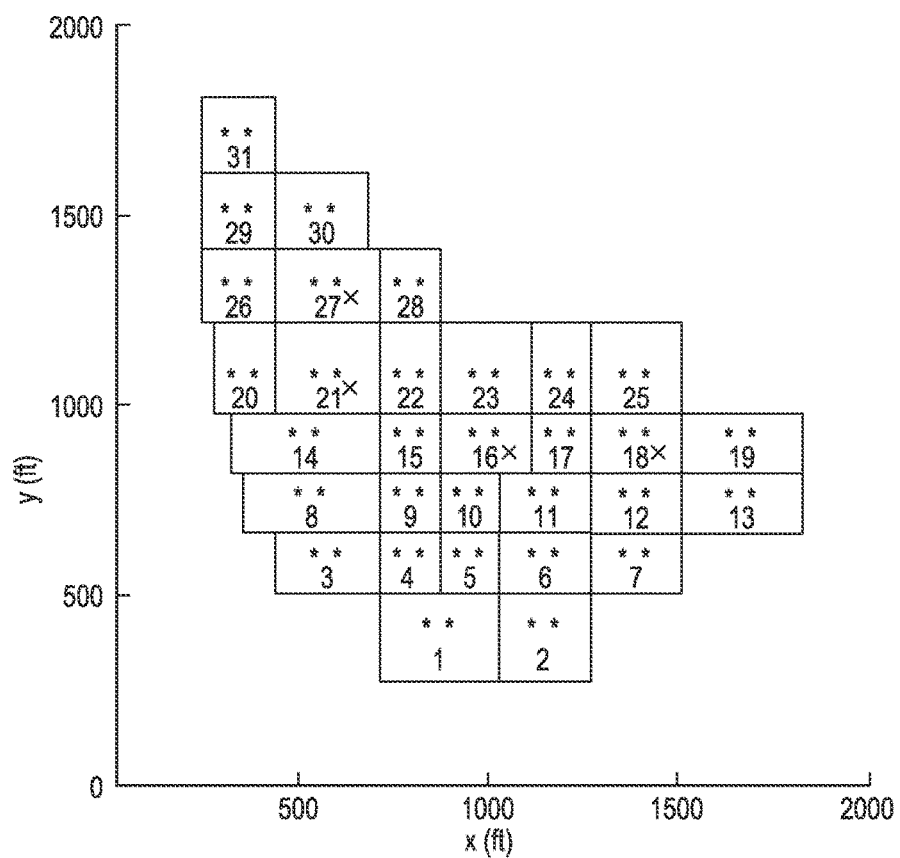

First, a confined problem without pumping and injection wells is investigated. For this problem, the FDM true model is 2D, whose grid, parameters, and associated boundary conditions are shown in FIG. 29a. This model includes 4 conductivity zones and a uniform recharge (or leakage) rate to the top of the aquifer. The true boundary conditions consist of a no-flow boundary (solid line) and a specified head boundary (dashed line; specified head values shown). This parameterization pattern is assumed known in inversion, which uses a fairly coarse grid (FIG. 29b). The head and flux measurement locations at observation wells are also

TABLE 6

Inversion outcomes for cases 1 and 2 (unconfined aquifer). The estimated K and N parameters are in unit of ft/d.

| | True model | Estimated parameters (no error) | Estimated parameters (±1% head error) (±0.1 ft) | Estimated parameters (±5% head error) (±0.5 ft) | Inverse grid | Measured Data[*1] |
| --- | --- | --- | --- | --- | --- | --- |
| case 1 | K = 1 | K = 0.99 | K = 1.16 | K = 23.36 | 2 × 2 | 24 h + 1 $q_y$ |
|  | N = 10⁻⁴ | N = 9.76 × 10⁻⁵ | N = 1.15 × 10⁻⁴ | N = 2.3 × 10⁻³ |  |  |
| case 2 | K1 = 1; K2 = 10 | K1 = 1; K2 = 9.7 | K1 = 0.78; K2 = 7.8 | K1 = 0.21; K2 = 2.1 | 2 × 2 | 24 h + 1 $q_y$ |
|  | N = 10⁻³ | N = 10⁻³ | N = 7.79 × 10⁻⁴ | N = 2.1 × 10⁻⁴ |  |  | shown (FIG. 29b): 62 heads and 4 $q_x$ are sampled. For the true boundary conditions, the FDM head solution is shown in FIG. 29c. For the given measurement data (with ±1% error added), the inverted head field is shown in FIG. 29d. Moreover, head profiles of the FDM model and the inverted solutions (under both error-free and ±1% error) are plotted along profile AB (FIG. 29e). Comparison between the true and inverted head contours or profiles is excellent. Moreover, the estimated parameters are shown in Table 7.

explained above. In this case, the size of well cells at both the pumping and injection wells can be fairly large, i.e., pumping in cell 11, injection in cell 21 (FIG. 30b), without the need to locally refinement the grid which was used in the investigation of the previous non-pumping problem. Despite the increased complexity compared to the same problem inverted above (FIG. 29), both the head recovery (FIG. 30 c, d) and parameter estimation (Table 7) are accurate when measurement errors are small.

TABLE 7

Inversion outcomes of an irregularly shaped confined aquifer, without and with pumping/injection wells. The estimated K and N parameters are in unit of ft/d.

| Head measurement error | Hydraulic Conductivities | | | | Recharge | Number of inversion cells |
| --- | --- | --- | --- | --- | --- | --- |
| | K1 | K2 | K3 | K4 | N | — |
| True model | 5 | 50 | 100 | 150 | $5 \times 10^{-4}$ | — |
| Without pumping/injection 0% (0) | 5.4 | 28.9 | 105.3 | 130.7 | $3.1 \times 10^{-6}$ | 19 |
| Without pumping/injection 0% (0) | 4.7 | 43.4 | 107.1 | 141.4 | $4.1 \times 10^{-4}$ | 31 |
| Without pumping/injection ±1% (±0.4 ft) | 5.5 | 47.1 | 112.6 | 142.8 | $4 \times 10^{-4}$ | 31 |
| With pumping/injection 0% (0) | 5.8 | 58 | 124 | 167 | $5.0 \times 10^{-4}$ | 31 |
| With pumping/injection ±0.25% (±0.1 ft) | 6.1 | 58 | 134 | 169 | $4.7 \times 10^{-4}$ | 31 |

Initially, a coarse inverse grid with 19 cells is used (not shown), which results in up to 22% absolute relative error in K estimation and ~99% absolute relative error in N estimation, given error-free measurements. The inverse grid is then refined to contain 31 cells (FIG. 29b), where model regions with high gradients of the observed heads are refined. Given the same error-free measurements, inversion results improved significantly: ~9% absolute relative error in K estimation and ~18% absolute relative error in N estimation. Again, as was observed for inverting the regular domain problems, increasing head measurement errors lead to reduced inversion accuracy, as expected.

Figure 30A:
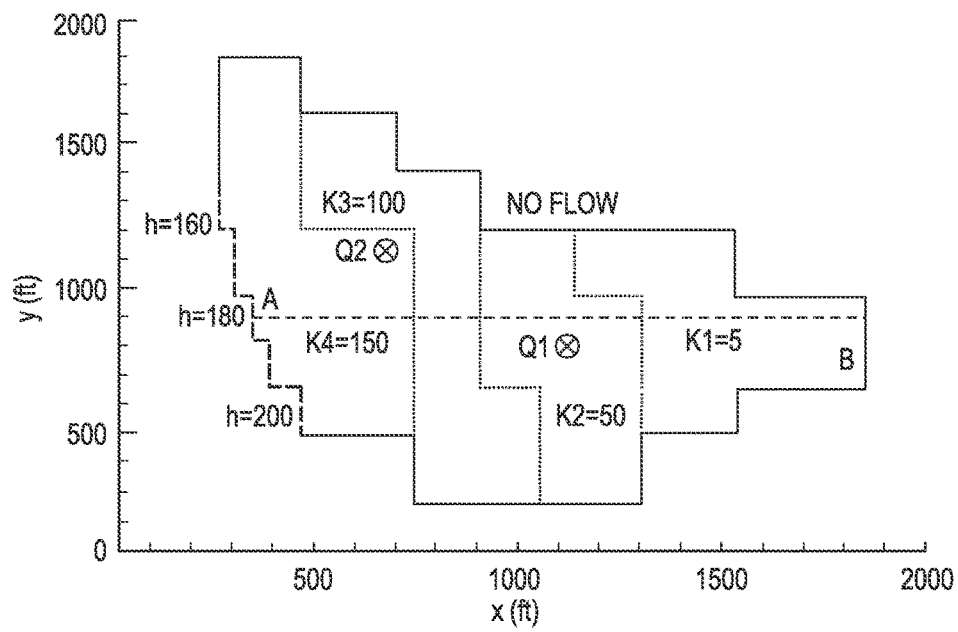
FIGS. 30a-30d illustrate a confined problem with a pair of pumping and injection wells: Q1=−300 (pumping well) at (1100, 740) and Q2=300 (injection well) at (540, 1100). (a) FDM true model with four conductivities (K1=5, K2=50, K3=100, K4=150) and N=0.0005. Location of a profile, AB, is shown at y=860 ft. (b) head contours predicted by the true model; (c) head contours predicted by inversion with 31 cells when head measurement error is ±0.25%. The same contour levels as those of the true model are used. (d) head profiles predicted along AB by the true model and using inversion when measurement errors are increased.
Figure 30B:
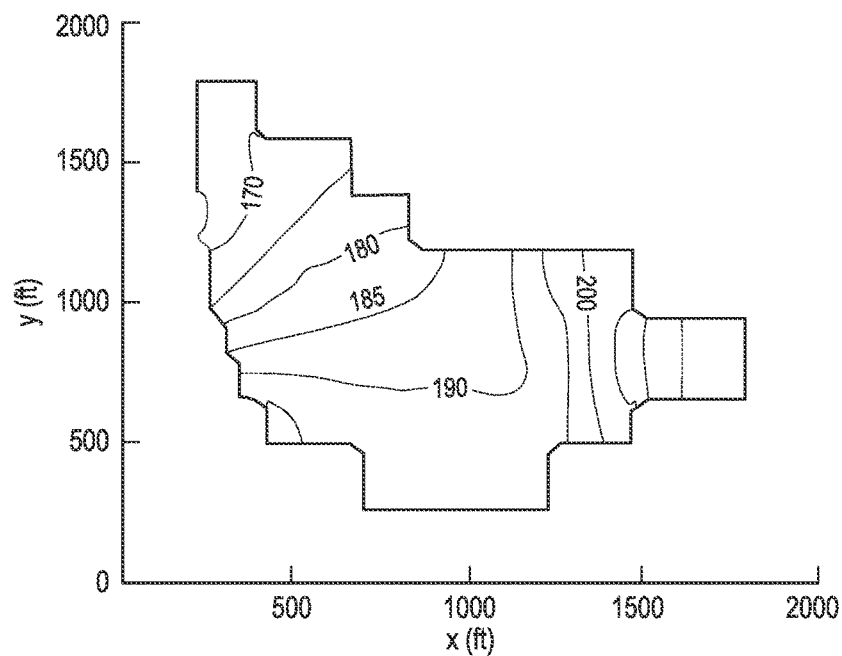
Figure 30C:
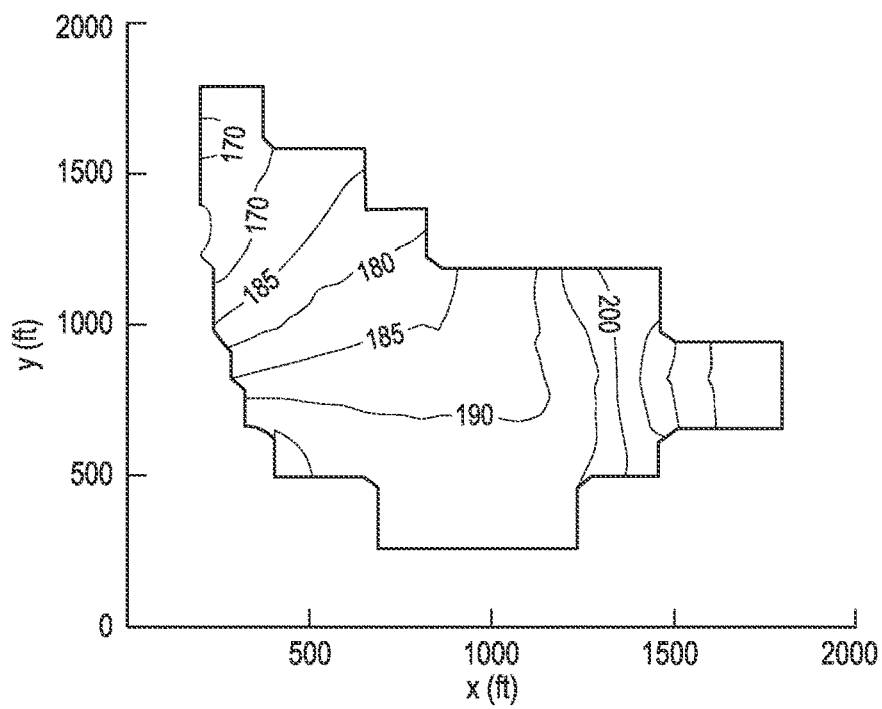
Figure 30D:
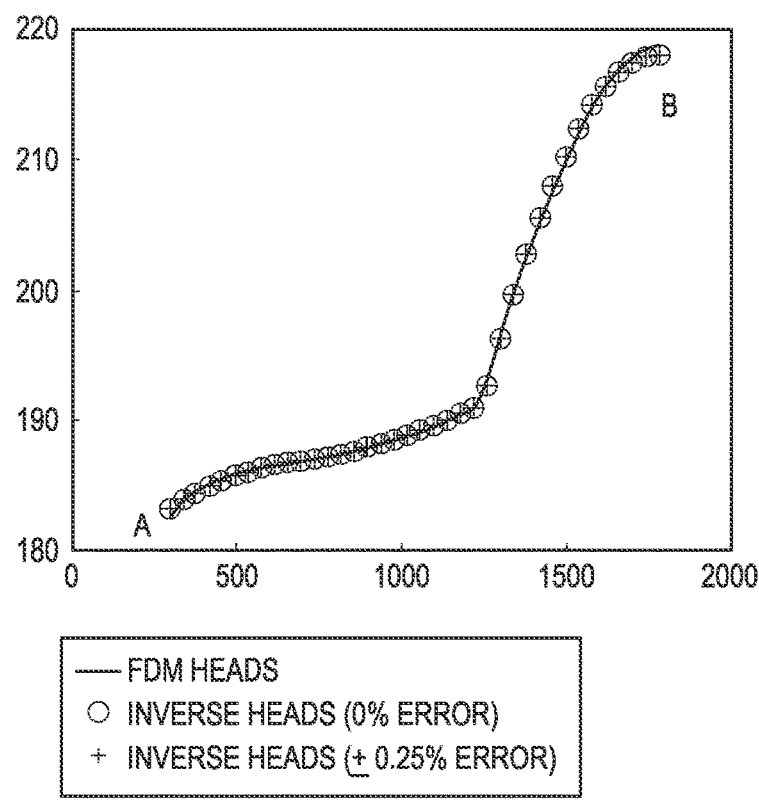
Figure 31A:
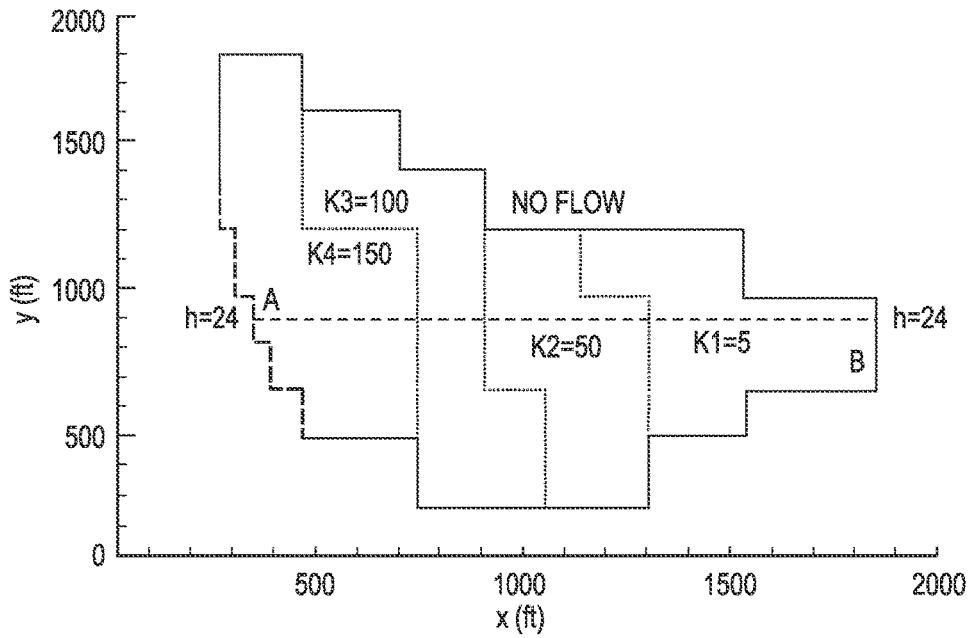
FIGS. 31a-31d illustrates (a) FDM true model with four conductivities (K1=5, K2=50, K3=100, K4=150) and N=0.01. Location of a profile, AB, is shown at y=860 ft. (b) head contours predicted by the true model; (c) head contours predicted by inversion when measurements are error-free; (d) head profiles predicted along AB by the true model and by inversion.
Figure 31B:
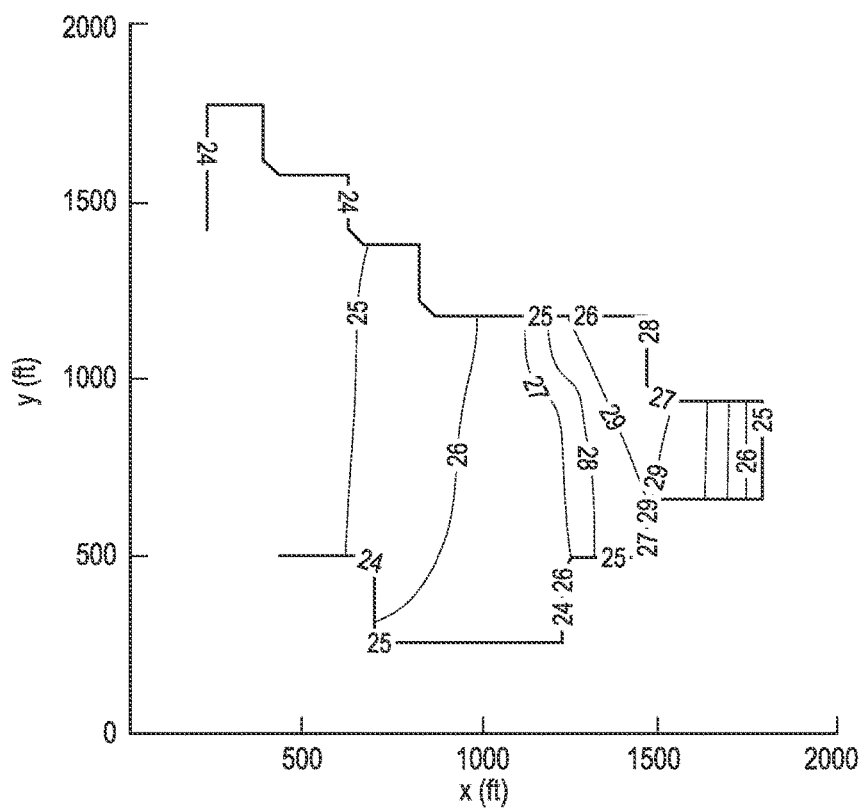
Figure 31C:
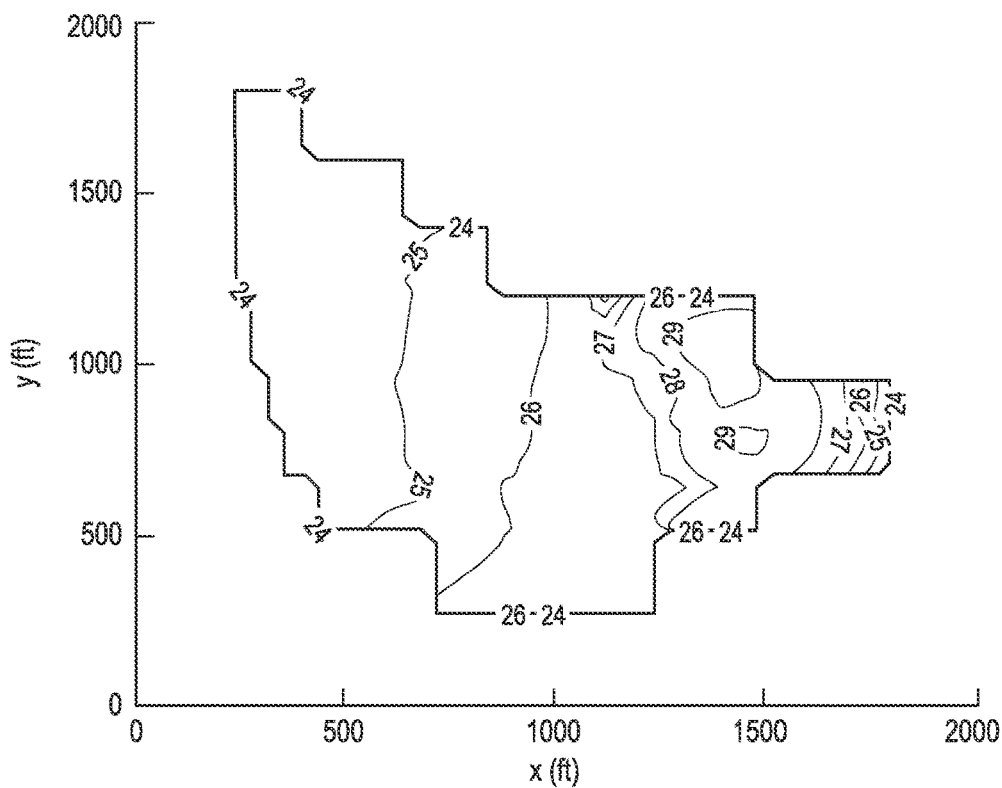
Figure 31D:
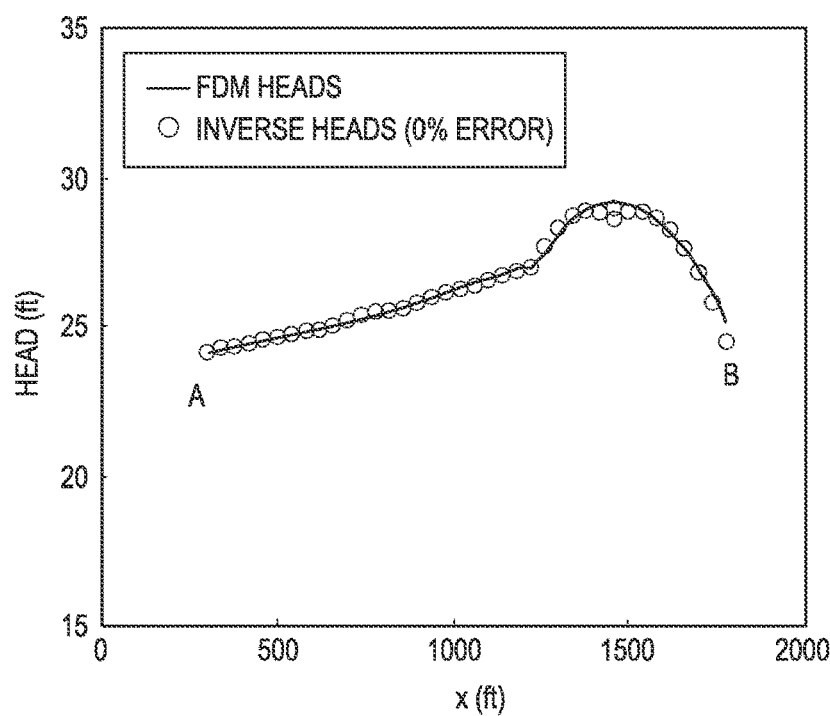
Figure 32A:
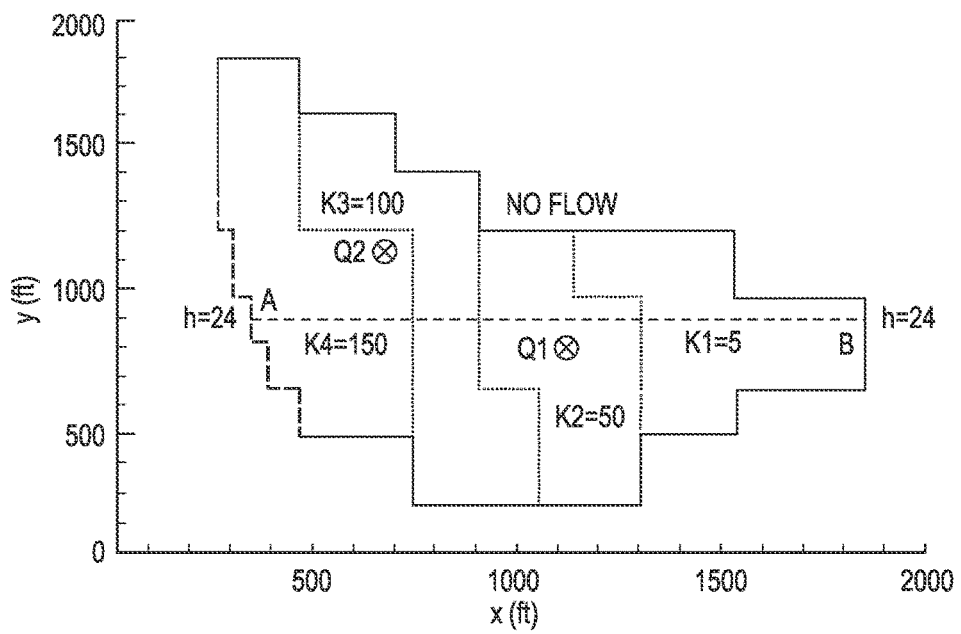
FIGS. 32a-32d illustrates a unconfined problem with a pair of pumping and injection wells: Q1=−500 (pumping well) at (1100, 740) and Q2=500 (injection well) at (540, 1100). (a) FDM true model with four conductivities (K1=5, K2=50, K3=100, K4=150) and N=0.01. Location of a profile, AB, is shown at y=860 ft. (b) head contours predicted by the true model; (c) head contours predicted by inversion with 31 cells when measured heads contain ±0.25% errors. The same contour levels as those of the true model are used. (d) head profiles predicted along AB by the true model and using inversion when measurement errors are increased.
Figure 32B:
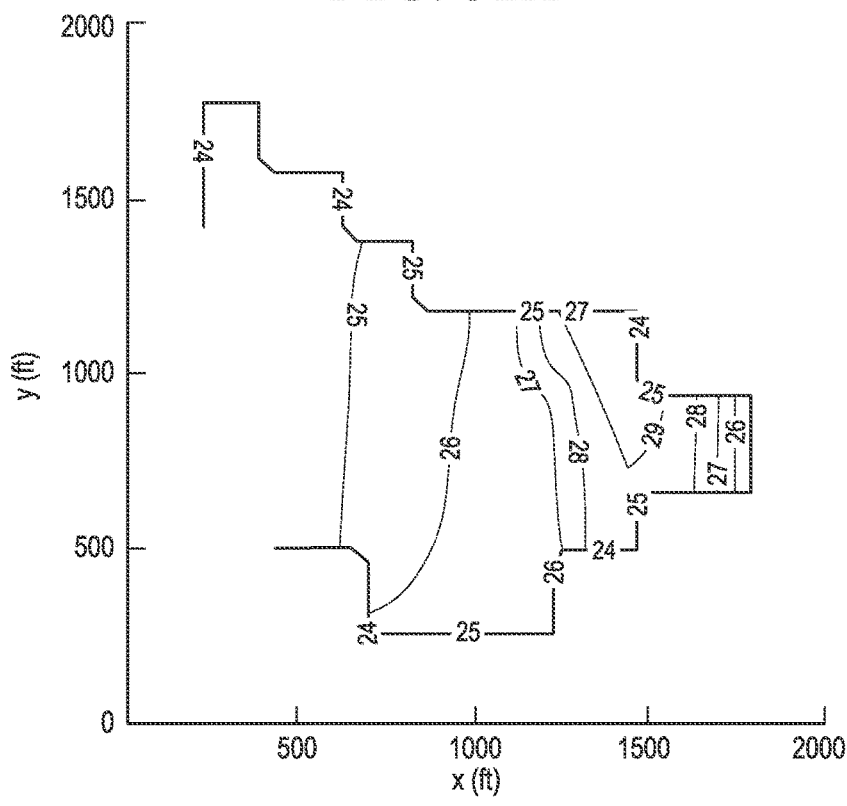
Figure 32C:
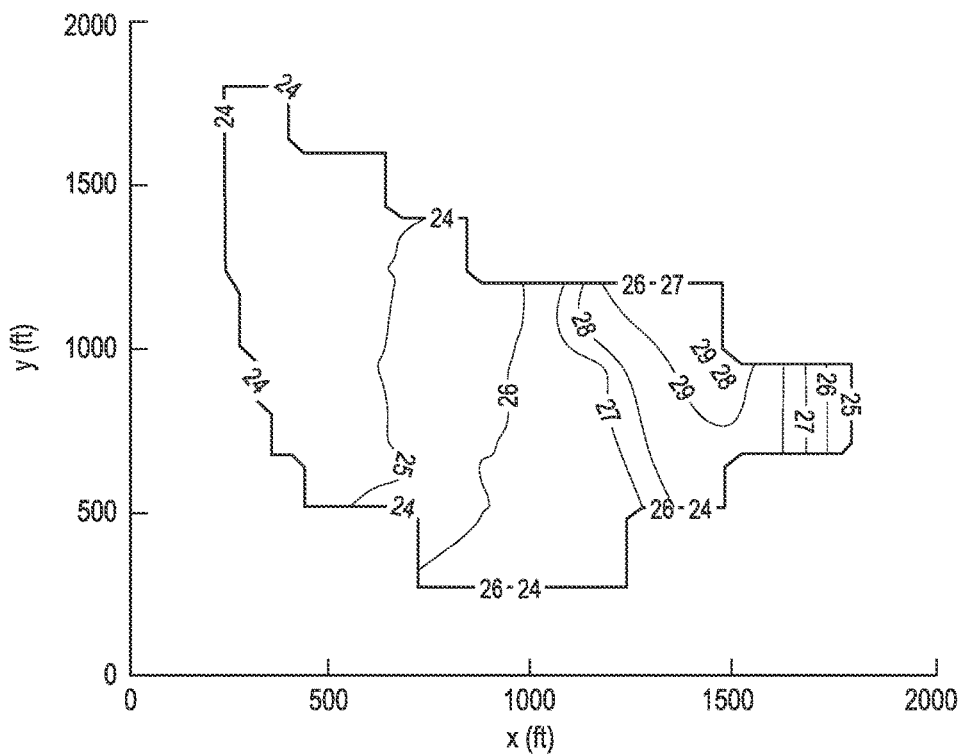
Figure 32D:
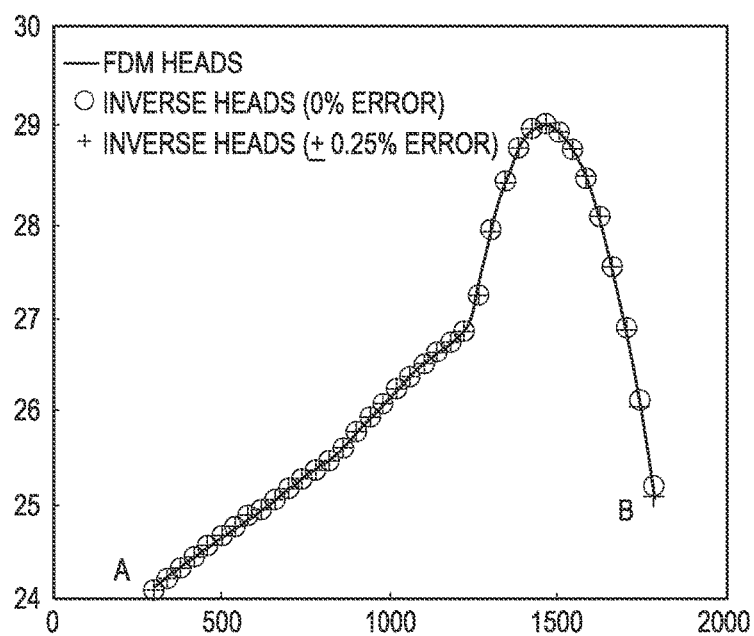

Next, for the same confined problem, a pumping well and an injection well are added (FIG. 30a). As in the problem above, the same set of the 62 observed heads are sampled. Flux measurements are not taken. The two well rates are considered known measurements. Inversion adopts the same 31-cell grid (FIG. 30b). Because of the specification of non-zero recharge rate and the particular boundary conditions adopted (i.e., hydraulic head is more elevated in the southern portion of the model), pumping or injection induced head changes are not significant—the local cone of depression (or the elevated heads near the injector) is not obvious at the wells. However, the effect of recharge and wells are implemented in the hybrid inverse formulation, as Unconfined Aquifer The equation describing unconfined aquifer flow is more nonlinear compared to that of the confined aquifer. It is therefore of interest to compare their estimation accuracy using the inverse method. First of all, under non-pumping conditions, an irregular aquifer with 4 K zones (of the same K values as those of the previous confined aquifer) and a uniform recharge rate to the top of the water table is analyzed (FIG. 9a). The true mode is 3D (50×50×20 grid; 1000×1000×40 ft³); its head contours are shown in FIG. 31b at z=12 ft. As in inverting the previous confined problems, the same 2D inverse grid with 31 cells is used. Location of the measured data is also the same, except they are now sampled at z=12 ft. Without any measurement errors, the inverted heads are close to the true heads, with the exception of minor variations in some local areas. The estimated parameters are close to the true parameters (Table 8).

TABLE 8

Inversion outcomes of an irregularly shaped unconfined aquifer, without and with pumping/injection wells. The estimated K and N parameters are in unit of ft/d.

| Head measurement error | Hydraulic conductivities | | | | Recharge | Number of inversion cells |
| --- | --- | --- | --- | --- | --- | --- |
| | K1 | K2 | K3 | K4 | N | — |
| True model | 5 | 50 | 100 | 150 | 0.01 | — |
| Without pumping/injection 0% (0) | 5.01 | 45.8 | 95.6 | 149.2 | 0.0091 | 31 |
| With pumping/injection (0%) | 5.1 | 48.9 | 101.7 | 148 | 0.0104 | 31 |
| With pumping/injection (±0.25%) | 5.3 | 49.3 | 107.2 | 149.3 | 0.0105 | 31 |

Next, the same observed heads are used in inverting the unconfined problem where a pair of injection and pumping wells is added. Flux measurements are not needed. The same 31-cell grid is used in inversion. Results again yield accurate head recovery (FIGS. 32 c, d) and parameter estimation (Table 8).

Variable Recharge

With the same pumping and injection wells, the irregular-domain confined and unconfined problems with a uniform recharge have been extended to problems where N is also heterogeneous, e.g., high recharge associated with hydrofacies of higher conductivities, and vice versa. Similar solutions are obtained whereas multiple Ks, multiple Ns, and the BC are simultaneously estimated without the need for greatly increasing the number of measurements.

Discussion

By solving a set of problems with pumping and injection wells, we've demonstrated that subsurface flux measurements are not needed for the inverse method to succeed. Also, because pumping rates can be easily measured at the surface, our method has low data requirement that is not much different from that used in interpreting classic pumping tests. For example, in using the Theim solution for parameter estimation, pumping rate in addition to aquifer heads is needed. Under non-pumping conditions, however, subsurface flux measurements are needed for the inversion to succeed, although in aquifer model calibration, such fluxes are not typically used by the existing inverse methods as a form of observation data to match [26]. However, it must be pointed out that the existing methods need to minimize an objective function (typically a model-data misfit), which requires the repeated simulations of the forward model. To do that, boundary conditions must be specified to the model, which usually include the Dirichlet-type BC (e.g., specified heads) and the Neumann-type BC (e.g., specified flux—a popular choice is the no-flux BC). (In transient calibration, initial conditions are also needed. This topic is not explored here.) Therefore, these methods in effect require that inversion be conditioned to a set of "flux measurements" along the Neumann boundary. In other words, by specifying a Neumann-type BC to a BVP in order to minimize an objective function, the calibrated model by the existing methods in effect is "fitted" to these fluxes. The problem with this approach is that such fluxes are not real measurements that are sampled from the aquifer; rather they reflect a conceptual assumption made by the modeler. Because of subsurface uncertainty, if the wrong assumption of these BC is made (e.g., leakage exists along a presumed no-flux boundary), this will result in the so-called "model error" which is difficult to address using objective functions, e.g., various authors have discussed how the objective functions may be modified to account for "model errors" [37]. As demonstrated in Irsa and Zhang [9], because of the unknown BC, objective-function-based inversion can lead to non-uniqueness of both the estimated parameters and flow fields. In our new inverse method, the subsurface fluxes or pumping rates are provided to inversion at the locations where they are measured, which means that they can be anywhere inside the model domain or on the model boundaries. Compared to the objective-function-based approaches, no assumptions about the model BC are made, eliminating the possibility of making the type of "model errors" that can arise due to a wrong BC assumption.

Finally, with the new inverse method (both in this study and in our earlier works), an issue exists with measuring subsurface groundwater fluxes or flow rates which are needed for inverting problems under non-pumping conditions. One way to address this is to conduct downhole flow logging under ambient flow [38, 39]. Another approach can utilize hydrograph separation, although this technique requires that the aquifer intersect streams whose gain/loss can be accurately measured to determine baseflows. In studying groundwater-surface water interactions, various seepage meters can be used to directly measure water fluxes at the sediment interface [40]. Indirect approach can use Darcy's Law to infer subsurface in-situ fluxes based on local K measurements and hydraulic heads sampled in multilevel wells. For example, with the Multilevel Slug Test, a local K can be estimated at each packed-off interval using slug test [41]. If the same interval is subject to multiple head measurements before the slug test under non-pumping condition (i.e., at locations above and beneath this interval), an in-situ groundwater flux can then be inferred. The above discussion suggests that subsurface flow rate or flux measurements can in theory be obtained if the appropriate tests are conducted. However, some of these fluxes are indirect measurements (e.g., those determined by Distributed Temperature Sensing involve inverse modeling of the measured temperatures), and the associated measurement errors may be higher.

In one embodiment, a two-dimensional physical-based inverse method is developed to simultaneously estimate multiple hydraulic conductivities, source/sink strengths, and boundary conditions, for both confined and unconfined aquifers. To address both non-pumping and pumping conditions, a unified theory is proposed by developing a set of hybrid fundamental solutions. Unlike the objective-function-based estimation techniques, this method does not require forward groundwater flow simulations to assess the model-data misfits, thus the knowledge of boundary conditions is not needed. It directly incorporates noisy observed data (hydraulic heads, groundwater fluxes, or well rates) at the measurement locations in a single step, without solving a boundary value problem. For both confined and unconfined problems, the method has been successfully tested on groundwater flow problems with regular and irregular geometries, different heterogeneity patterns, variances of heterogeneity, and measurement errors. Highlights of this study are summarized as follows:

1. Using nonlinear optimization, multiple hydraulic conductivities and recharge rates can be simultaneously inverted for 2D lateral flows in confined and unconfined aquifers that satisfy the Dupuit-Forchheimer assumption.
2. By employing the hybrid formulations, the inverse method can yield well-posed systems of equations that can be solved efficiently with coarse grids, with or without pumping wells. Solutions are also stable when measurement errors are increased, although the estimated parameters become less accurate.
3. Under non-pumping conditions, for both confined and unconfined problems, when error-free observed data are used, the estimated conductivities and recharge rates are accurate within 8% of the true values (estimation errors can be further reduced with higher measurement density). Inversion is also accurate when aquifer conductivity has high variance: the maximum successfully tested $K_{max}/K_{min}$ of a confined aquifer problem is 10,000. The inversion outcomes are therefore insensitive to parameter variability.
4. The inverse method is able to handle model structure errors whereas the inverse formulation simplifies or complexifies the true parameter fields. For problems where the underlying parameter variation is unknown, equivalent conductivities and average recharge rates can be estimated. These parameters are physical-based, due to the fact that they're inferred from the conservation of mass and flux principles as enforced by the inverse method.
5. Under pumping conditions, flux measurements are not needed for the inversion to succeed. Therefore, data requirement of the inverse method is not much different from that of interpreting traditional well tests. With the hybrid formulation, local grid refinement near wells is not needed. Inversion can thus succeed with coarse grids, leading to high computation efficiency. Moreover, the inverse method can also handle problems where different types of boundary conditions as well as areal recharge can exert significant influences on the drawdowns at the wells.

6. Inversion accuracy is not sensitive to the degree of nonlinearity of the flow equation.

Performance of the method for inverting confined and unconfined aquifer problems is similar in terms of the accuracy of the estimated parameters, the recovered head fields, and the solver speed.

The inverse method is based on superposing local analytical solutions of steady-state flow in a confined or unconfined aquifer subject to various source/sink effects. Caution is needed, however, when applying the method to real aquifers, where vertical flow can be significant near barriers such as impervious faults or engineered structures, or where borehole effects at the wells are non-negligible. Future work will investigate three-dimensional flow, extending the techniques of this study to problems with significant vertical flow. By imposing additional prior information equations that describe parameter structures (e.g., auto-covariance functions, cross-correlation with geophysical data, etc.), highly parameterized inversion will also be attempted.

In one embodiment, a method of modeling and calibration of natural aquifers with multiple scales of heterogeneity is a challenging task due to limited subsurface access is shown. While computer modeling plays an essential role in aquifer studies, large uncertainty exists in developing a conceptual model of an aquifer and in calibrating the model for decision making. Due to uncertainties such as a lack of understanding of subsurface processes and a lack of techniques to parameterize the subsurface environment (including hydraulic conductivity, source/sink rate, and aquifer boundary conditions), existing aquifer models often suffer non-uniqueness in calibration, leading to poor predictive capability. A robust calibration methodology is needed that can address the simultaneous estimations of aquifer parameters, processes, and boundary conditions. In this embodiment, we propose a multistage and multiscale approach that addresses subsurface heterogeneity at multiple scales, while reducing uncertainty in estimating the model parameters and model boundary conditions. The key lies in the appropriate development, verification, and synthesis of existing and new techniques of static and dynamic data integration. In particular, based on a given set of observation data, new inversion techniques can be used first to estimate aquifer large-scale effective parameters and smoothed boundary conditions, based on which parameter and boundary condition estimation can be refined at increasing detail using standard or highly parameterized estimation techniques.

Introduction

While computer modeling plays an essential role in hydrogeology, due to uncertainties in describing aquifer parameters, flow and transport processes, and the associated initial and boundary conditions (BC), developing and calibrating a predictive aquifer model is challenging. This issue occurs whenever real aquifers are modeled with incomplete knowledge of system property, state, and dynamics. Reducing all sources of model uncertainty, however, is difficult to accomplish in practice, due to the cost of drilling, sampling, conducting aquifer tests, and the difficulty in portraying/forseeing future aquifer forcings (Hunt, 2010). A balance between the cost of developing a model and model accuracy is clearly desired and there exists a need to (1) identify optimal complexity in representing aquifer processes and parameters for different prediction goals; (2) determine parameters and BC for the optimal model(s) accurately.

To address issues related to (1), hypotheses related to parameter (and process) resolution must be tested. For example, if we wish to predict average aquifer flow, will a model with lower hydraulic conductivity resolution be sufficient, ignoring smaller scale parameter heterogeneities? Our research on hydraulic conductivity upscaling suggests that optimal resolution in representing aquifer heterogeneity likely exists (Zhang et al., 2006). To address issues related to (2), robust and efficient model calibration (or inversion) techniques are needed, which can be facilitated by a new steady-state inverse method that simultaneously estimates model parameters, model source/sink rates, and model BC.

Figure 34D:
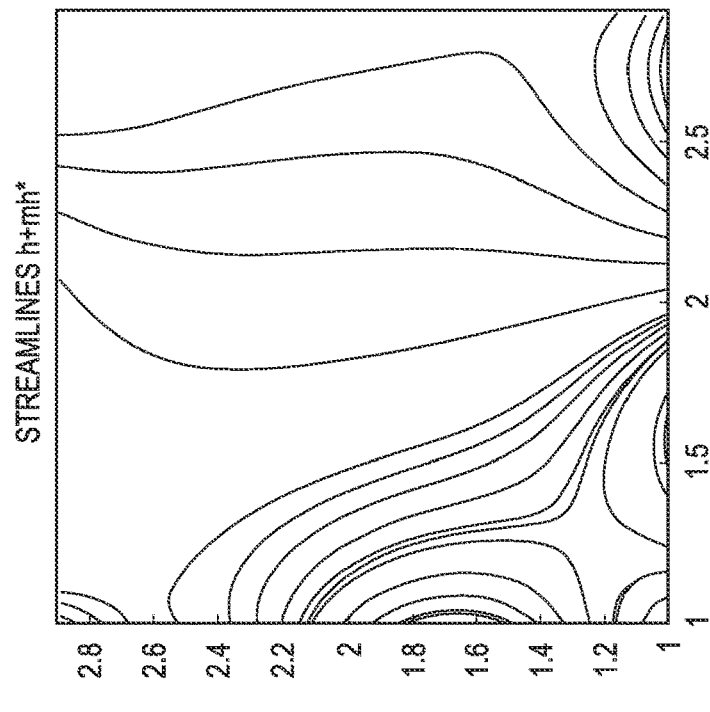
Figure 34C:
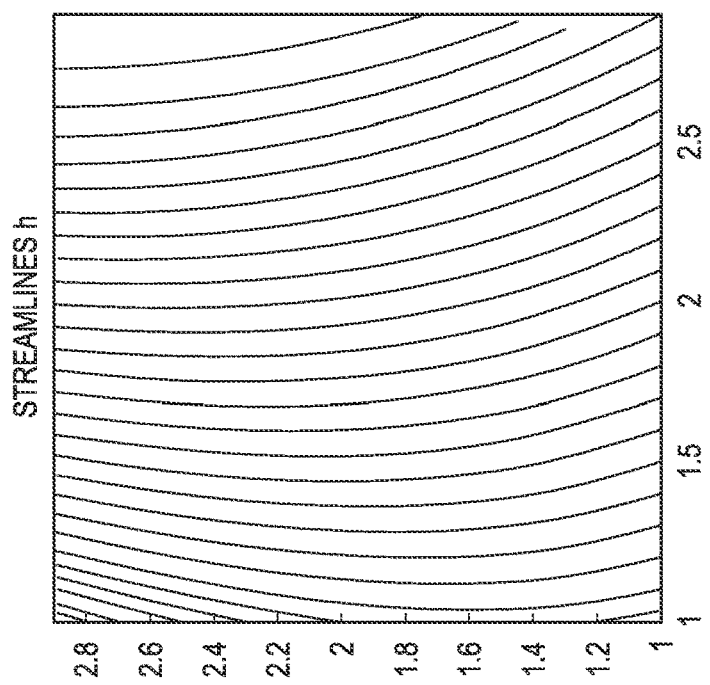
Figure 35A:
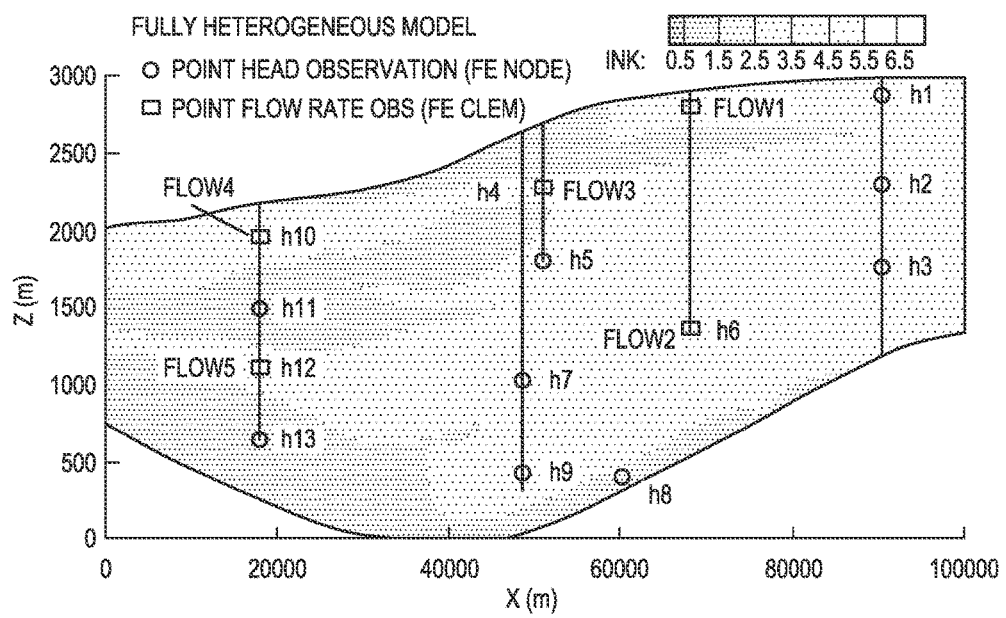
FIGS. 35a-35d illustrates (a) A fully heterogeneous groundtruth model with lnK variation in m/yr. Steady-state groundwater simulation is conducted under a BC of no-flow along the model sides and bottom and a specified sloping potentiometric head along the model top. Observation data (13 head and 5 Darcy flux measurements) are sampled at 5 well locations. (b) A 14-unit model. (c) A 7-unit model. (d) A 2-unit model. Models b, c, and d are alternative conceptual models developed with decreasing amount of site characterization data. They are calibrated using nonlinear regression based on the simulated observations of the groundtruth model.
Figure 35B:
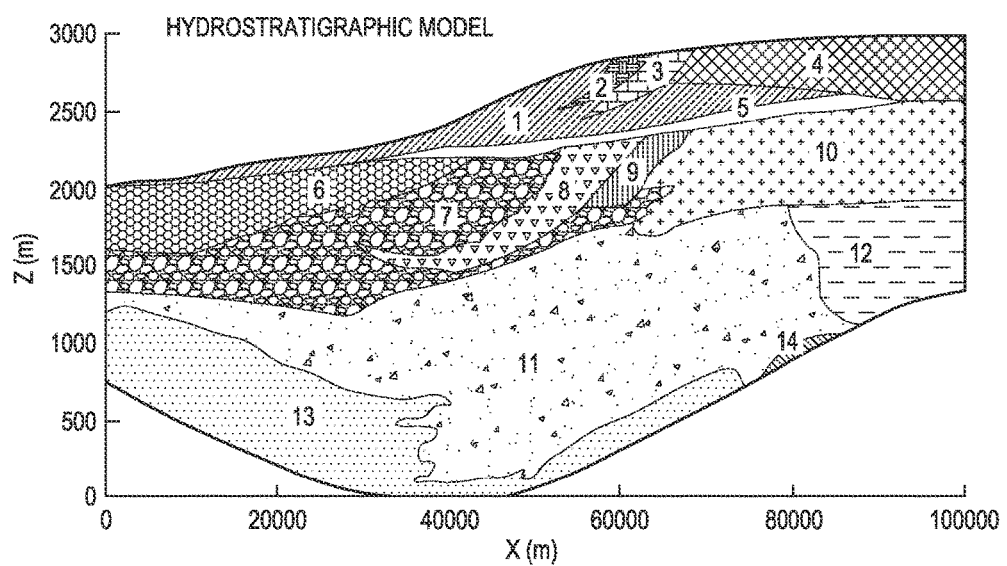
Figure 35C:
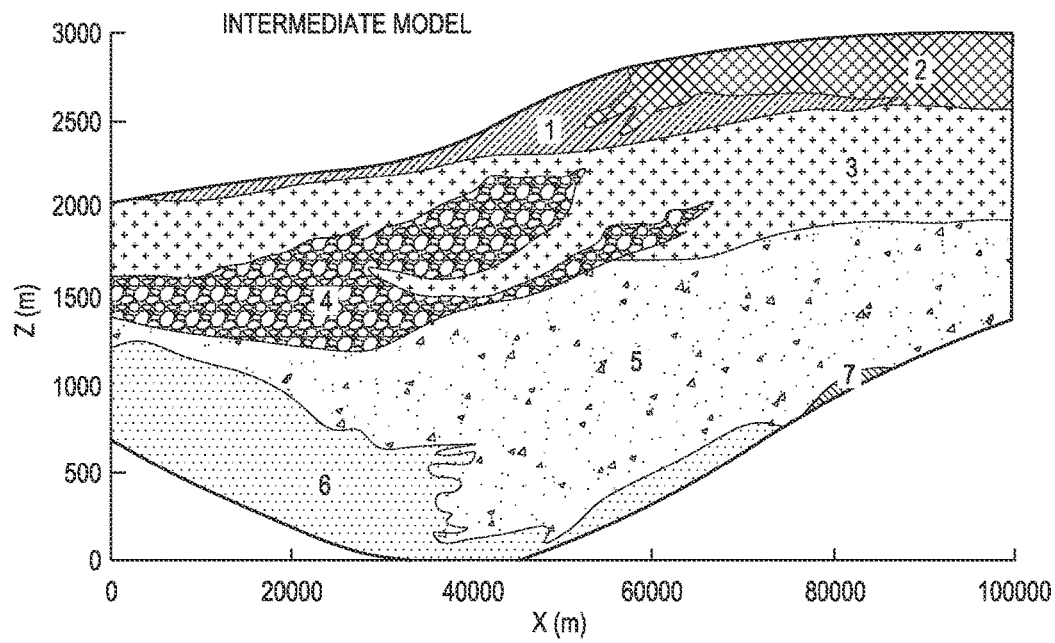
Figure 35D:
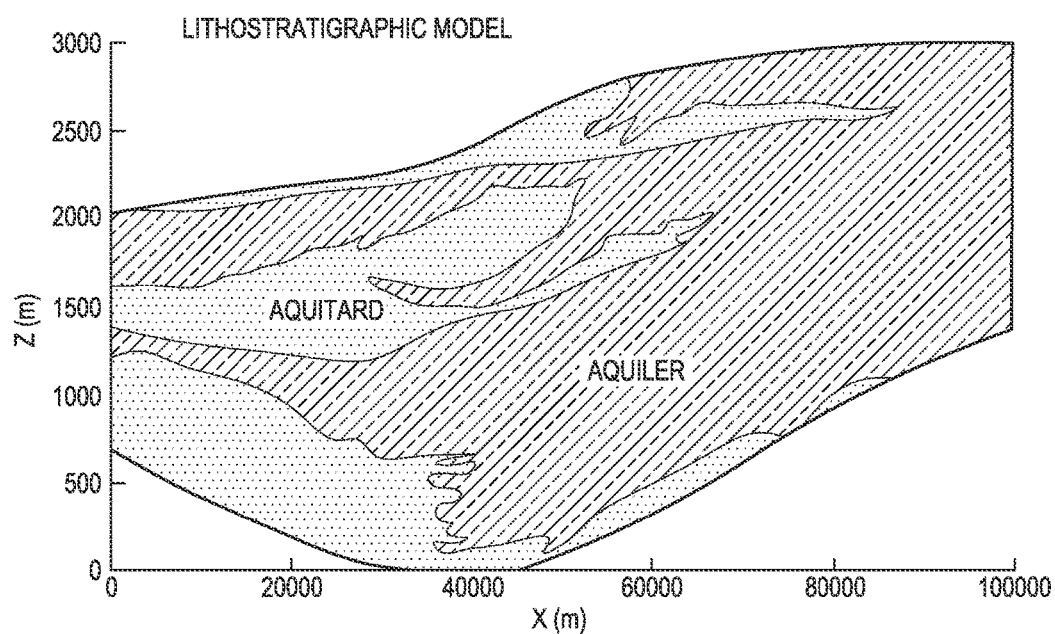

In this embodiment, a promising new direction in hydrogeological modeling is proposed in the form of a multistage and multiscale model building and calibration approach, which aims to account for subsurface heterogeneity at multiple scales, while reducing uncertainty in estimating model parameters and model BC. The key to this approach lies in the appropriate development, verification, and synthesis of the existing and new techniques of static and dynamic data integration. Specifically, for a given set of observation data, direct inversion techniques can be used to estimate long-term (steady-state) aquifer large-scale equivalent conductivities, average source/sink rates, and (smoothed) BC. Based on these initial but lower resolution estimates, grid, parameters, and BC can be refined at increasing detail using standard parameter estimation techniques (FIG. 34).

In one embodiment, groundwater flow modeling is the focus and the problems associated with process uncertainty (i.e., transport modeling) are not addressed. In the following sections, the issues related to model complexity are first presented, before the issue of non-uniqueness in model calibration is discussed. Recent research on developing a new inverse method is summarized, which together with a calibration exercise estimating hydraulic conductivities for multiple conceptual models, supports the proposed multiscale calibration approach.

Modeling and Model Complexity

In developing a hydrogeological site model, initial model is almost always constructed using limited data, including static site characterization data (i.e., aquifer geometry, internal structure, porosity, hydraulic conductivity) and dynamic monitoring data (i.e., water levels, pumping rates, or recharge estimates). In general, a simple conceptual framework model is built first, integrating all available static data. It is then calibrated based on the available site dynamic data, either by trial-and-error, or with the aid of a parameter estimation algorithm. At this stage, the worth and limitation of the data can be explored within a formal sensitivity analysis and inversion framework, which can yield uncertainty measures of the initial set of estimated parameters, while pointing to the type and location of additional data for collection (Hill and Tiedeman, 2007). Such data, often with enhanced information content that can be used to inform parameter estimation, can then lead to the reduction of various model errors and uncertainties (Carrera and Neuman, 1986; Poeter and Hill, 1997; Tiedeman et al., 2003; Saiers et al., 2004). During this process, in addition to the direct hydraulic data, auxiliary data such as temperature, tracer/isotope concentrations, and geophysical measurements can provide complementary or qualitative verifications. This process then leads to a more refined model, which can be subject to further testing, verification, and refinement. Ideally, as additional relevant data are collected, greater insights are gained on system behavior, and the model will become a more accurate representation of the reality. This workflow is often utilized in analyzing aquifer problems, although room for improvement and optimization exists, particularly on the issue of parameter resolution and model complexity, as discussed below.

In aquifer modeling, the need to balance parameterization complexity with the study objectives and quality of the data has been recognized by previous authors (Hunt, 1999). Using a highly parameterized inversion approach integrating many types of data, a smooth and parsimonious hydraulic conductivity (K) field is obtained by Fienen et al. (2009) in delineating aquifer flow paths. Research on K up-scaling suggests that if realistic and sufficient geological resolution is incorporated into a model, hydrostratigraphic models with equivalent conductivities can capture the overall flow field of a heterogeneous synthetic aquifer (reference model), i.e., large-scale head distribution, bulk flow velocity, and flow paths (Zhang et al., 2006; Zhang et al., 2011). The level of complexity in resolving aquifer heterogeneity is also determined by the prediction goal, the hydraulic BC, and the level of acceptable modeling error. For example, as demonstrated by Zhang et al. (2006), under a set of BC that drives steady-state vertical flow, if the aquifer mean flow path is the prediction goal, a 2-unit hydrostratigraphic model does an equally good job of capturing the flow paths of the heterogeneous model as a 14-unit hydrostratigraphic model (see FIG. 9 in Zhang et al., 2006; also, FIG. 3 herein). The 2-unit model is thus of sufficient complexity for making this prediction. Moreover, if the length of the no-flow boundary is extended, both hydrostratigraphic models (2-unit versus 14-unit) are nearly equally accurate in predicting the true hydraulic head field (see FIG. 14 in Zhang et al., 2006). When the length of the no-flow boundary is reduced, however, mean relative error in head prediction increases to 9% for the 2-unit model, but stays low for the 14-unit model at around 3%. Therefore, if a head prediction error of 10% is considered an acceptable level of modeling error, the 2-unit model will be of sufficient complexity; if 5% is acceptable, the 14-unit model is needed.

The above discussion suggests that optimal complexities in describing aquifer parameters for meeting specific prediction goals likely exist, although words of caution are needed in translating these insights modeling the synthetic data to real-world practice: To model a real aquifer, how can we obtain equivalent conductivities without using detailed measurements that are required by most of the upscaling methods? Moreover, the hydrostratigraphic models reported in the previous studies are driven with the true BC of the heterogeneous reference model. In the real world, even if we are able to estimate equivalent conductivities accurately, how can we obtain accurate estimation of the aquifer BC? These questions lead to our second issue: how can optimal flow models be built with reduced uncertainties in model parameters and model BC? To address this, an appropriate integration of the existing and new inverse methodologies will likely provide a way forward. How to determine aquifer BC is an integral element of this integration, which is discussed in detail in the following section.

Model Calibration and Non-Uniqueness

Most of the existing parameter estimation methods assume that aquifer BC is either known or can be determined from model calibration. However, due to limited subsurface access, BC is rarely known at most field sites, while BC calibration may lead to non-uniqueness in the estimated parameters, BC, and flow field (Irsa and Zhang, 2012). We can explain this using a simple example. Detailed mathematical proof was given in Irsa and Zhang (2012) and is not presented here. Suppose that from a two-dimensional homogeneous isotropic steady-state aquifer we sampled 3 hydraulic heads (dots in FIG. 2a) and 1 flow rate along the right hand side of the model, which can be obtained from, for example, separating stream hydrographs. Given these observed data, we can write a simple weighted least-square objective function S(b) describing the model-data mismatch (modified after Equation (3.1a) in Hill and Tiedeman, 2007):

$$S(b) = \sum_{i=1}^{NH} \omega_{h_i}[y_{h_i} - y'_{h_i}(b)]^2 + \sum_{j=1}^{NQ} \omega_{q_j}[y_{q_j} - y'_{q_j}(b)]^2 \qquad (1)$$

where b is the parameter vector to be estimated (e.g., hydraulic conductivity here for the steadystate flow problem), $y_{h_i}$ is the $i^{th}$ observed hydraulic head being matched, $y'_{h_i}(b)$ is the model simulated hydraulic head that corresponds to the $i^{th}$ observed head; $y_{q_j}$ is the $j^{th}$ observed flow rate being matched, $y'_{q_j}(b)$ is the model simulated flow rate that corresponds to the $j^{th}$ observed flow rate, NH is the number of hydraulic head observations, and NQ is the number of flow rate observations, $\omega_{h_i}$ is the weight assigned to the $i^{th}$ head observation, $\omega_{q_j}$ is the weight assigned to the $j^{th}$ flow rate observation. The goal of most parameter estimation methods is to minimize S(b) using optimization techniques, which minimizes the model-data mismatch. With these techniques, parameters are updated during repeated simulations of the forward flow model, which require the specification of the model BC (for transient problems, initial conditions also need to be specified). For this simple problem, say we decide on a set of specified-head BC that vary in a nearly linear manner along the model boundary (the red curve in FIG. 34b). Given these BC, and knowing the hydraulic conductivity, we can analytically generate the flow field (FIG. 34c), which honors both the 3 observed heads and the 1 observed flow rate. On the other hand, we can use a parameter estimation technique to estimate K, specifying the same BC to the forward model (i.e., the flow problem of FIG. 34a discretized and solved with a numerical technique), which is required for the regression iterations. Assuming no measurement errors, the parameter estimation technique will exactly recover the 3 observed heads, 1 observed flow rate, and the state variables, e.g., the streamlines as shown in FIG. 2c. At this point, S(b) is optimized to be zero and the aquifer model is perfectly calibrated for the given set of BC. (A parameter estimation code, if correctly set up, and barring numerical issues that can arise during regression, should ideally recover the analytical solution.) Next, the exercise is repeated by assuming a different set of specified head BC for this problem, e.g., the green curve in FIG. 2b. Given the new BC, for the same K value, we can generate another analytical flow solution (FIG. 34d), which also honors the same 3 observed heads and the 1 observed flow rate. Again, K can be calibrated given the new BC, which will recover the analytical solution when the regression converges at S(b)=0. Another aquifer model is thus perfectly calibrated for the new BC. If we perturb any of the two sets of the BC and repeat this exercise ad infinitum, each time a new BC is assumed, a different flow field will be perfectly calibrated to the same observation data. It has been proven that there exists an infinite number of BCs and flow fields that all satisfy the same observed data (Irsa and Zhang, 2010), leading to zero S(b). Therefore, non-uniqueness in the inversion outcomes can arise due to the unknown model BC.

The above discussion suggests that multiple sets of calibrated parameters and BC can equally satisfy the model calibration criteria (i.e., minimization of an objective function), which may lead to a wrong model being used for prediction and management purposes. In natural aquifers, true BC are typically poorly known. If we make a wrong assumption about the BC, we may obtain a perfectly calibrated flow model using an objective-function-based parameter estimation technique, even if error-free observed data are used and even if there are no model structure errors (in the above example, inverse parameterization is given the true parameterization of the forward model). Indeed, an example of the influence of BC in model calibration is provided in Hunt et al. (1998), where for an aquifer-lake system in Wisconsin, earlier calibration under a set of assumed BC yielded 9 best-fit K zones and 94 best-fit lake-bed conductances. However, a revision of the BC by Hunt et al. (1998) yielded a better calibrated model with only 2 best-fit K zones and 18 lake-bed conductances. Although highly parameterized techniques have been developed to delineate aquifer heterogeneity at greater detail (Zhu and Yeh, 2006), non-uniqueness in parameter estimation may also arise (Bohling and Butler, 2010).

To address the non-uniqueness issue, a new steady-state direct inverse method was developed to simultaneously estimate hydraulic conductivity, state variables, and BC of a confined aquifer, under the condition where source/sink to the aquifer was negligible (Irsa and Zhang, 2012). Unlike the objective-function based approaches, this method does not require forward flow simulations to assess the model-data mismatch, thus knowledge of the BC is not needed. Given sufficient measurement data, the method yielded well-posed systems of equations that can be solved efficiently with linear optimization. The solution was also stable when measurement errors were increased. However, only one K was estimated (the other conductivities were obtained from known conductivity ratios in the form of prior information equations), while source/sink effects were not accounted for (Irsa and Zhang, 2012). As a result, groundwater flux or flow rate observation(s) must be sampled from the subsurface, which limits the applicability of the method. Recently, for both confined and unconfined aquifers, the method has been extended to simultaneously estimate a number of conductivities (Ks) and recharge (or leakage) rates, along with the unknown model BC (Zhang, 2013; Zhang et al., 2013). Interestingly, a single pumping rate, in addition to hydraulic heads, suffices to provide the necessary measurement for inverting multiple Ks and multiple recharge rates.

Because of subsurface uncertainty, the inverse method must also be able to handle model structure errors, i.e., when inverse parameterizations do not reflect the true conditions in the aquifer. With the new method, if the conductivity and recharge variabilities are unknown, inversion yields physically meaningful equivalent conductivities and average recharge rates. Alternatively, if the inverse parameterization contains spurious parameters, inversion can identify such parameters, while the simultaneous estimation of non-spurious parameters is not affected. The new method obviates the well-known issues associated with model "structure error", whereas the inverse formulation either simplifies or complexifies the true parameter fields. Moreover, to investigate uncertainty in inversion, the method can be combined with indicator geostatistics. Uncertainty in the static data (i.e., hydrofacies proportion, variogram, and correlation ranges) can be propagated into the inversion outcomes—a set of realizations of model parameters, flow fields, and BC can be created (Wang et al., 2013). These realizations center on the "true" solution created from an underlying "true" model (i.e., a forward simulation with known parameters and BC), while increased sampling of the static and dynamic data leads to reduced spread in the estimated parameters, flow fields, and BC. Therefore, not only can uncertainty in K pattern be accounted for, issues of data worth and sampling density can be addressed.

The new inverse method is based on a zoned parameterization scheme, i.e., either a deterministic pattern or a stochastic ensemble. The estimated parameters and boundary conditions therefore reflect large-scale spatial averages that are smoothed over local variations. While we plan to extend the method to highly parameterized inversion to account for small scale K variation and its spatial correlation, the inverse method in its current form is more suitable for inverting low-resolution conceptual hydrostratigraphic models. Also, transient data, which can provide additional information for inversion, cannot yet be incorporated into the analysis, while both standard regression techniques and a variety of data assimilation methods, e.g., transient hydraulic tomography or the methods based on the Kalman filter, can utilize such data. (Extension to transient flow is currently being researched, whereas the inversion of drawdowns may be utilized to remove the need to estimate the unknown aquifer initial conditions.) Finally, objective-function based parameter estimation techniques have diversified into handling many types of flow problems, utilizing a variety of observation data, e.g., steady-state or transient hydraulic data, solute concentrations, temperature, water chemistry, isotopes, etc. Spurred by the growth of computing power, improvement in numerical algorithms and solution techniques, and the increased awareness of subsurface uncertainty, these techniques now address problems with a large number of parameters and both parameter and prediction uncertainties can be assessed with flexibility and efficiency (Zimmerman et al., 1998; Wen et al., 2002; Liu and Kitanidis, 2011). Looking forward, can we benefit from the strengths of all these approaches?

Multistage and Multiscale Calibration

Figure 33:
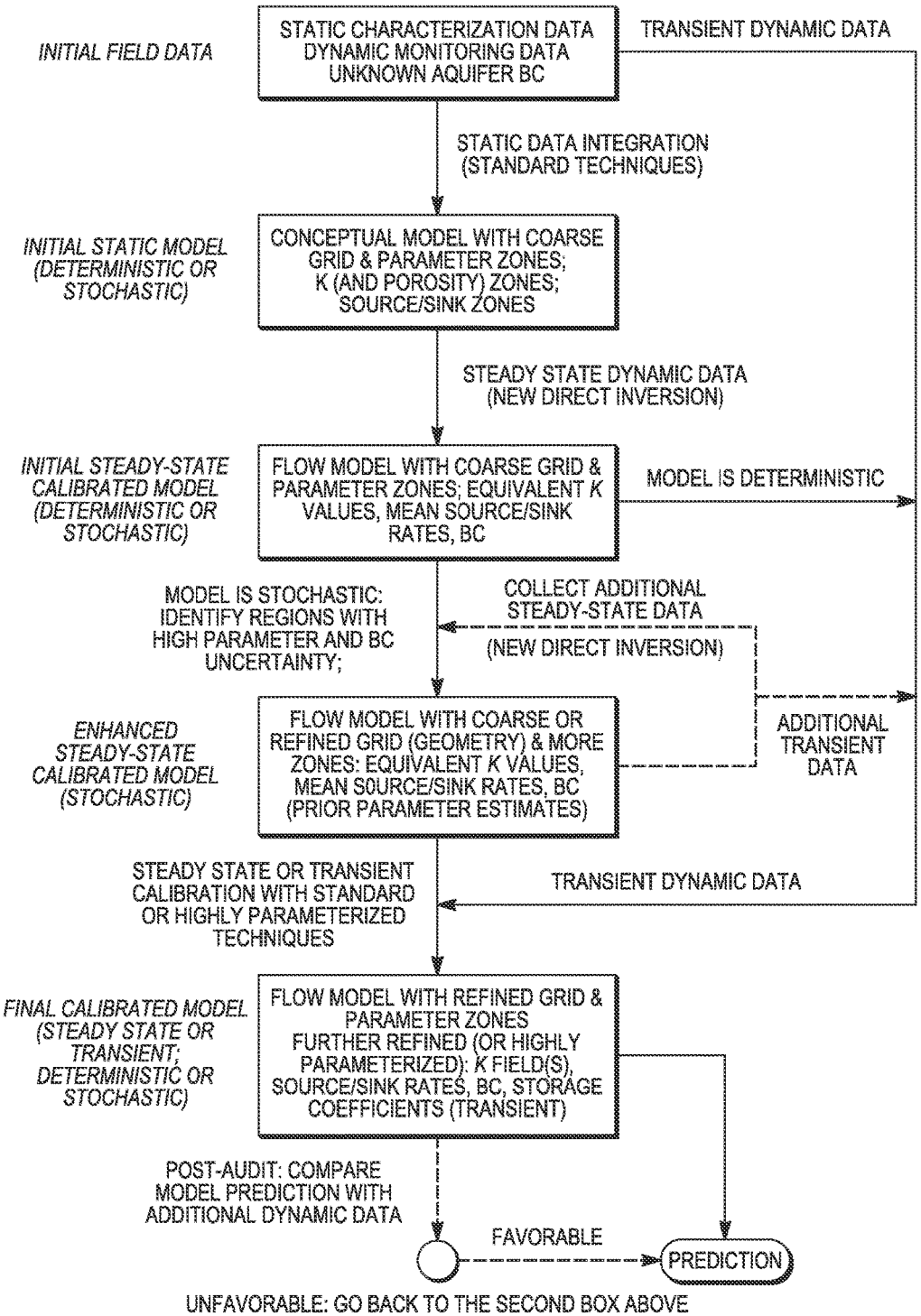
FIG. 33 illustrates a multistage and multiscale calibration method.

Given the state-of-practice in aquifer modeling and the recent advancements in parameter scaling and model inversion, a fruitful direction for further development may lie in a multistage and multiscale integration that can address subsurface heterogeneity at multiple scales, while reducing uncertainty in estimating model parameters and model BC. As illustrated in FIG. 33, direct inversion techniques can be first used to estimate long-term (steady-state) aquifer large-scale effective parameters and smoothed BC, based on which parameter and boundary condition estimation can be refined at increasing detail using the objective-function-based techniques. The proposed approach complements the prevalent modeling workflows: either deterministic or stochastic element can be incorporated, with the later accounting for uncertainties in parameter and BC estimation. This approach is also consistent with the idea, as proposed by previous workers (Anderson and Woessner, 1992; Hunt et al., 1998), of developing a low-resolution "screening model" first prior to building complex and highly resolved models.

The multistage and multiscale integration can be supported by previous research. For example, as revealed by our earlier upscaling studies, as long as the model BC is close to the true BC, equivalent conductivities can lead to accurate bulk flow predictions by the hydrostratigraphic models. The new inverse method, by estimating both large-scale parameters and smoothed BC, can serve this purpose. However, accuracy of the inversion is limited by the type, location, quality, and quantity of the measurement data. For synthetic problems we tested so far, given sufficient data support leading to well-posed inversion problems, the estimated parameters fall within one order (often much better) of the true values. For real-world problems, because measurements will never be exhaustive nor error-free, inversion can only provide physically reasonable but non-exact estimates. One way to remediate this issue is to account for parameter, flow field, and BC uncertainties in inversion, e.g., via a Monte Carlo analysis. For example, histogram of an estimated parameter may suggest a reasonable accuracy (small spread) or otherwise. A variance map of the inverted hydraulic head ensemble fields can indicate locations where additional sampling is needed to reduce the largest hydraulic head estimation uncertainty. In areas of low uncertainty (of both the parameters and head fields), local analysis with a refined grid or parameterization can be carried out further depending on the study objective, e.g., solute transport modeling typically requires more resolved K fields.

The new inverse method, as it stands, could provide a low-cost, low-resolution aquifer characterization tool with which initial conceptual models can be built with coarsened representations of parameter heterogeneity (both of Ks and source/sink rates). Based on the same observed data, such models can be refined using either standard or highly parameterized techniques that can account for sub-hydrostratigraphic, smoothly varying, and possibly correlated heterogeneity, e.g., pilot point or geostatistical inverse techniques. The estimated Ks, recharge rates, as well as the smoothed BC of the low-resolution models can provide the prior estimates for these refinement studies; their values are considered reasonable due to the fact that they're inferred from the conservation of mass and flux principles as enforced by the initial inversion with the steady-state data. With the physically reasonable BC, prior Ks, and source/sink estimates, inversion based on optimizing objective functions will become more well-posed, which then lead to physically reasonable parameter estimates and/or refinements. A multiscale calibration exercise supports this view and is presented in the following section.

An Illustrative Example

To support the view that multistage calibration can yield well-posed problems leading to better estimated parameters, a calibration exercise is presented using a suite of models with decreasing spatial K resolutions: a fully heterogeneous model and 3 hydrostratigraphic models with increasingly fewer K zones (FIG. 35). All models employ the same high-density grid containing 845,298 finite element cells (detail on model creation can be found in Zhang et al., 2006). The heterogeneous model is considered a reference model with which steady-state groundwater flow is simulated under a set of true BC, i.e., no-flow along the model sides and bottom and a specified sloping potentiometric head along the model top creating confined conditions. From this model, a set of simulated observation data is obtained at 5 monitoring wells: 13 hydraulic heads and 5 Darcy fluxes (FIG. 35a). To represent measurement uncertainty, random errors with a Coefficient of Variation of 10% are added to the "observed" data, assuming no spatial correlation among them, i.e., error covariance matrix is diagonal.

Under the condition that the true BC is known, the 3 hydrostratigraphic models are calibrated using nonlinear regression as implemented in UCODE and PEST (both of the standard version and PEST SVD) (Poeter et al., 2005; Doherty, 2005). During regression iterations, all forward simulations with these models are therefore driven by the true BC. A weighted least-squares objective function is used, which consists solely of data misfit terms without imposing regularization nor prior information equations. The optimization algorithms, as implemented in UCODE and PEST, are gradient-based local methods. The horizontal conductivity (Kx) of each unit of the hydrostratigraphic models is set as the calibration target. Prior to calibration, a parameter sensitivity analysis is conducted to identify the units for which Kx can be estimated for the given set of the observation data, following guidelines of Hill and Tiedeman (1997). For the starting parameter guess in inversion, equivalent Kx computed for the same unit is used (see detail on its calculation in Zhang et al., 2006). Both UCODE and PEST are compiled into 64-bit executables on a Linux computer cluster. To enhance computational efficiency, a serial iterative solver (Bramley and Wang, 1995) is implemented in the forward flow models, its results are verified by a direct Gaussian Elimination solver. The iterative solver sped up the simulation time of the forward model by approximately 60 times. For most inversion runs, both UCODE and PEST converged overnight or within a day.

Results of this exercise are presented in Table 9, where both the calibrated Kx and the equivalent Kx are listed for each hydrostratigraphic model.

TABLE 9

Steady-state calibration outcomes of Kx for the units of the three hydrostratigraphic models. The equivalent Kx of the same units, previously computed in Zhang et al. (2006), are listed. Conductivity unit is m/year. Location of these units and their IDs are shown in FIG. 36. Before calibration, a parameter sensitivity analysis was conducted to identify the units for which Kx can be estimated for the given set of the observation data (FIG. 36a).

| Model ID | Unit ID | Equivalent $K_x$ | Calibrated $K_x$ (UCODE) | Calibrated $K_x$ (PEST classic) | Calibrated $K_x$ (PEST SVD) |
|---|---|---|---|---|---|
| Model b | 4 | 330.5 | 345.1 | 349.5 | 300.2 |
|  | 5 | 554.6 | 758.0 | 712.1 | 601.3 |
|  | 6 | 871.0 | 942.8 | 909.2 | 801.0 |
|  | 8 | 583.8 | 626.2 | 625.4 | 501.8 |
|  | 10 | 591.6 | 639.8 | 653.2 | 501.9 |
|  | 11 | 140.4 | 133.2 | 130.3 | 199.8 |
| Model c | 2 | 305.0 | 308.7 | 308.4 | 305.0 |
|  | 3 | 632.4 | 157.9 | 158.0 | 632.4 |
|  | 5 | 162.7 | 127.8 | 127.6 | 162.7 |
| Model d | Aquifer | 324.6 | 121.0 | 120.9 | NA |

Several observations can be made:
1. UCODE and PEST (classic) give consistent results in the estimated Kx values;
2. for the chosen observation data, most of the insensitive parameters belong to low-K units and are not estimated by regression, indicating potential difficulty in estimating K for aquitards;
3. for the 14-unit model (FIG. 3b), regression yields realistic Kx that fluctuates around the equivalent Kx;
4. for the 7-unit model (FIG. 3c), Kx estimated by UCODE and PEST (classic) are less accurate, although PEST SVD converges at the starting parameter values—the equivalent Kx;
5. for the 2-unit model (FIG. 3d), UCODE and PEST (classic) underestimates the aquifer Kx, while PEST SVD fails to converge.

Clearly, parameter estimation is more satisfactory for the 14-unit model than for the 7- and 2-unit models. In this case, an enhanced level of heterogeneity resolution is likely key to the success of inversion. It is of interest to note that PEST SVD failed to calibrate the 2-unit model, which suggests that this particular technique may be able to identify model structure deficiency that the others fail to reveal. However, without a systematic analysis testing different observation data density and location, and possibly, flow directions (i.e., different true BC), this finding could be coincidental.

Importantly, the above example illustrates that even with limited measurement data that are corrupted by noise (FIG. 3a), if the correct BC and good initial Kx (i. e., equivalent Kx) are provided, standard parameter estimation techniques can yield physically reasonable Kx estimates for the hydrostratigraphic model, as long as the model incorporates a sufficient level of K heterogeneity (e.g., the 7-unit model). As demonstrated by the earlier upscaling study (Zhang et al., 2006), these simpler models can create reasonable to good representations of the flow field of the heterogeneous reference model. Moreover, success with the standard methods here suggests that highly parameterized techniques, or those that employ transient data (i.e., data fusion), may also build upon these prior models with coarse parameter resolutions. Such methods can populate finer scale correlated parameters within individual hydrostratigraphic units, therefore smaller scale parameter variation can be captured by analyzing the same data. This problem will be explored in the future.

In modeling real aquifers, a similar multi-scale calibration can be carried out. Based on limited field data, the direct inverse method can provide a set of large-scale parameter and BC estimates for an initial model with low resolutions, e.g., the 2-unit model in the above example. This model (or a suite of models if the direct method is combined with geostatistical simulations) can be subject to additional calibration with UCODE, PEST, or other techniques. In the new calibration, model or data errors may be revealed using fit-dependent statistics, whereas transient data, if available, can be calibrated to help reveal additional parameterization details. This combined analysis may point to deficiency in the model structure (e.g., inversion fails to converge), or if such deficiency is absent, point out locations where the estimation uncertainty is large and where additional static or dynamic data should be collected should resources become available. If additional sampling is carried out, the above workflow can be repeated, which then can result in increased parameterization detail, e.g., the 7- or 14-unit model. Guided by this multistage calibration, model will evolve with increasing parameterization complexity that is supported by the data that are collected specifically to reduce estimation uncertainty. In this process, whenever appropriate, a post-audit analysis should be carried out testing whether an optimal parameterization, including the resolution of model BC, has been achieved for a given set of (post-audit) prediction goals and acceptable model errors.

CONCLUSION

Due to limited subsurface access, modeling and calibration of natural aquifers with multiple scales of heterogeneity is a challenging task and large uncertainty exists in developing a conceptual aquifer model and in uniquely calibrating this model for decision making. Due to uncertainties such as a lack of understanding of subsurface processes and a lack of techniques to parameterize the subsurface environment (including hydraulic conductivity, source/sink rates, and BC), existing aquifer models can suffer non-uniqueness in calibration, leading to poor predictive capability. A robust calibration methodology is needed that can address the simultaneous estimation of aquifer parameters, processes, and boundary conditions.

In one embodiment, we propose a multistage strategy that also addresses subsurface heterogeneity at multiple scales, while reducing uncertainty in estimating model parameters and model BC. The key of this strategy lies in the appropriate development, verification, and synthesis of the existing and new techniques of static and dynamic data integration. In particular, direct inversion techniques can be used first to estimate aquifer large-scale effective parameters and (smoothed) boundary conditions, based on which parameter and boundary condition estimation can be refined at increasing detail using standard or highly parameterized techniques. Both the initial analysis and the refinement stage(s) fit with the existing modeling workflows, whereas simpler models are constructed first, upon which complexity or refinement is added next, with or without collecting additional observation data.

Furthermore, because exhaustive subsurface sampling is impractical, an important question in developing hydrogeological site models is whether or not there exists one or more optimal level(s) of parameterization and process complexity that is sufficient for making accurate predictions. Research suggests that such optimality likely exists in groundwater flow modeling, as hydrostratigraphic models with reduced K heterogeneity resolutions can suffice for making flow predictions. On the other hand, the importance of heterogeneity on solute transport modeling has been increasingly recognized in hydrogeology and related fields. Could a hydrostratigraphic model of sufficient heterogeneity resolution also be capable of making accurate transport predictions? For certain bulk transport performance metrics, our work upscaling dispersivity suggests so (Zhang and Gable, 2008). Transport issues, however, will be addressed later in tandem with the issues of process complexity, i.e., coupling flow and transport. For both flow and transport modeling, our long term goal is to find an optimal modeling approach in terms of process representation, parameter scale, grid resolution, and inversion methodology.

The inventions and methods described herein can be viewed as a whole, or as a number of separate inventions, that can be used independently or mixed and matched as desired. All inventions, steps, processed, devices, and methods described herein can be mixed and matched as desired. All previously described features, functions, or inventions described herein or by reference may be mixed and matched as desired.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of approximating a steady-state flow of groundwater in an aquifer, comprising:
    determining, using computation equipment, an area representation of at least a portion of the aquifer, wherein the determining includes discretizing the area representation into elements, wherein each of the respective element includes a hydraulic head, wherein the determining considers a hydraulic flux of the flow at the respective element being a gradient of the hydraulic head scaled by a hydraulic conductivity to the flow at the respective element, and wherein the determining further considers there being no net change of the hydraulic flux within the respective element; and for each of the respective element, approximating the hydraulic head, the hydraulic flux, and the hydraulic conductivity, wherein the approximating comprises determining a numerical approximation to the hydraulic head, a numerical approximation to the hydraulic flux, and a numerical approximation to the hydraulic conductivity based on an approximate solution to a harmonic function.

2. The method of claim 1, wherein the harmonic function comprises a holomorphic function.

3. The method of claim 1, wherein the approximate solution is a linear or quadratic approximation.

4. The method of claim 1, further comprising, for each boundary between two adjacent elements of the elements, minimizing a residual of one or more of the approximation to the hydraulic head, the approximation to the hydraulic flux, and the approximation to the hydraulic conductivity.

5. The method of claim 4, wherein the residual is scaled by a weighting function.

6. The method of claim 5, wherein the weighting function approximates continuity at the boundary.

7. The method of claim 4, wherein the minimizing comprises minimizing the residual on a set of collocation points, wherein each of the collocation points lies on the boundary.

8. The method of claim 4, wherein the aquifer is heterogeneous, and wherein the minimizing comprises minimizing a residual of an approximation of a normal of the hydraulic flux.

9. The method of claim 1, wherein the aquifer is homogenous.

10. A method of approximating, using computational equipment, a steady-state flow of groundwater in an aquifer, comprising:

discretizing an area representative of at least a portion of the aquifer into elements, wherein each of the respective element includes a hydraulic head, wherein a hydraulic flux of the flow at the respective element is a gradient of the hydraulic head scaled by a hydraulic conductivity to the flow at the respective element, and wherein there is no net change of the hydraulic flux within the respective element;

for each of the respective element, approximating the hydraulic head, the hydraulic flux, and the hydraulic conductivity, wherein the approximating comprises determining an approximation to the hydraulic head, an approximation to the hydraulic flux, and an approximation to the hydraulic conductivity based on an approximate solution to a harmonic function; and minimizing a residual of one or more of the approximation to the hydraulic head, the approximation to the hydraulic flux, and the approximation to the hydraulic conductivity, on a set of collocation points, wherein each of the collocation points lies on a boundary between two adjacent elements of the elements, wherein the residual is scaled by a weighting function, and wherein the weighting function approximates continuity at the boundary.

11. The method of claim 10, wherein the harmonic function comprises a holomorphic function.

12. The method of claim 10, wherein the approximate solution is a linear or quadratic approximation.

13. The method of claim 10, wherein the aquifer is homogenous.

14. The method of claim 10, wherein the aquifer is heterogeneous, and wherein the minimizing comprises minimizing a residual of an approximation of a normal of the hydraulic flux.

15. A method of approximating, a steady-state flow of groundwater in an aquifer, comprising:

determining discretizing an area representative representation of at least a portion of the aquifer, wherein the determining includes discretizing the area representation into elements, wherein each of the respective element includes a hydraulic head, wherein the discretizing considers a hydraulic flux of the flow at the respective element being a gradient of the hydraulic head scaled by a hydraulic conductivity to the flow at the respective element, and wherein the discretizing further considers there being no net change of the hydraulic flux within the respective element;

for each of the respective element, approximating the hydraulic head, the hydraulic flux, and the hydraulic conductivity, wherein the approximating comprises determining an approximation to the hydraulic head, an approximation to the hydraulic flux, and an approximation to the hydraulic conductivity based on an approximate solution to a harmonic function; and for each boundary between two adjacent elements of the elements, minimizing a residual of one or more of the approximation to the hydraulic head, the approximation to the hydraulic flux, and the approximation to the hydraulic conductivity, wherein the minimizing comprises minimizing the residual on a set of collocation points, wherein each of the collocation points lies on the boundary.

16. The method of claim 15, wherein the residual is scaled by a weighting function, wherein the weighting function approximates continuity at the boundary.

17. The method of claim 15, wherein the harmonic function comprises a holomorphic function.

18. The method of claim 15, wherein the approximate solution is a linear or quadratic approximation.

19. The method of claim 15, wherein the aquifer is homogenous.

20. The method of claim 15, wherein the aquifer is heterogeneous, and wherein the minimizing comprises minimizing a residual of an approximation of a normal of the hydraulic flux.

* * * * *